(12) United States Patent  (10) Patent No.: US 7,701,498 B2
Imamura et al.  (45) Date of Patent: Apr. 20, 2010

(54) SOLID-STATE IMAGE PICKUP DEVICE, DRIVE METHOD THEREFOR AND CAMERA

(75) Inventors: Kunihiro Imamura, Kyoto (JP); Toshiya Fujii, Shiga (JP); Shinichi Tashiro, Osaka (JP)

(73) Assignee: Panasonic Corporation, Osaka (JP)

( * ) Notice: Subject to any disclaimer, the term of this patent is extended or adjusted under 35 U.S.C. 154(b) by 1527 days.

(21) Appl. No.: 10/739,305

(22) Filed: Dec. 19, 2003

(65) Prior Publication Data

US 2004/0130642 A1  Jul. 8, 2004

(30) Foreign Application Priority Data

Dec. 20, 2002  (JP) .............................. 2002-370503

(51) Int. Cl.
*H04N 3/14* (2006.01)
*H04N 5/335* (2006.01)

(52) U.S. Cl. .................. 348/305; 348/308; 348/311

(58) Field of Classification Search ........ 348/275, 348/305, 308, 311–324
See application file for complete search history.

(56) References Cited

U.S. PATENT DOCUMENTS

| | | | | |
|---|---|---|---|---|
| 4,336,556 A | * | 6/1982 | Sekine et al. ............... | 348/319 |
| 5,148,210 A | * | 9/1992 | Minaki et al. ............... | 396/110 |
| 5,239,380 A | * | 8/1993 | Yokoyama ................... | 348/319 |
| 5,446,493 A | * | 8/1995 | Endo et al. .................. | 348/320 |
| 5,663,761 A | * | 9/1997 | Fukui .......................... | 348/323 |
| 5,801,850 A | * | 9/1998 | Maki et al. .................. | 358/483 |
| 6,084,659 A | * | 7/2000 | Tulet et al. .................. | 356/5.01 |
| 6,381,007 B2 | * | 4/2002 | Fabre et al. ................. | 356/28.5 |
| 6,423,959 B1 | | 7/2002 | Ikeda et al. | |
| 6,876,388 B1 | * | 4/2005 | Lee et al. .................... | 348/305 |
| 6,992,714 B1 | | 1/2006 | Hashimoto et al. | |

(Continued)

FOREIGN PATENT DOCUMENTS

JP  2000-184385  6/2000

(Continued)

OTHER PUBLICATIONS

Japanese Office Action, with English translation, issued in Japanese Patent Application No. 2003-421151, mailed Sep. 15, 2009.

*Primary Examiner*—Lin Ye
*Assistant Examiner*—Temitope Adeyiga
(74) *Attorney, Agent, or Firm*—McDermott Will & Emery LLP

(57) ABSTRACT

The solid-state image pickup device of the invention includes: a plurality of optoelectronic transducers arranged in an array; a plurality of vertical transfer sections each for reading charges from optoelectronic transducers and vertically transferring the read charges; a horizontal transfer section; a charge detection section for converting the horizontally transferred charges to signal voltages and the like; and a control section. The control section outputs signals so as to obtain either a signal corresponding to the sum of charges from an optoelectronic transducer belonging to one column and belonging to one of alternately selected rows and an optoelectronic transducer belonging to a column adjacent to the one column and belonging to a row other than the alternately selected rows, or a signal corresponding to the sum of charges from optoelectronic transducers belonging to a same column, every predetermined even number of continuous rows of optoelectronic transducers.

21 Claims, 41 Drawing Sheets

U.S. PATENT DOCUMENTS

| | | | |
|---|---|---|---|
| 2001/0010554 A1* | 8/2001 | Yoshida | 348/312 |
| 2001/0043275 A1* | 11/2001 | Hirota et al. | 348/312 |
| 2002/0030749 A1* | 3/2002 | Nakamura et al. | 348/220 |
| 2002/0041333 A1* | 4/2002 | Suzuki et al. | 348/311 |
| 2004/0130642 A1* | 7/2004 | Imamura et al. | 348/311 |

FOREIGN PATENT DOCUMENTS

| | | |
|---|---|---|
| JP | 2000-324504 A | 11/2000 |
| JP | 2000-358250 | 12/2000 |
| JP | 2001-085664 | 3/2001 |
| JP | 2001-292376 | 10/2001 |

* cited by examiner

DEVIATION BY 0.5 PIXELS

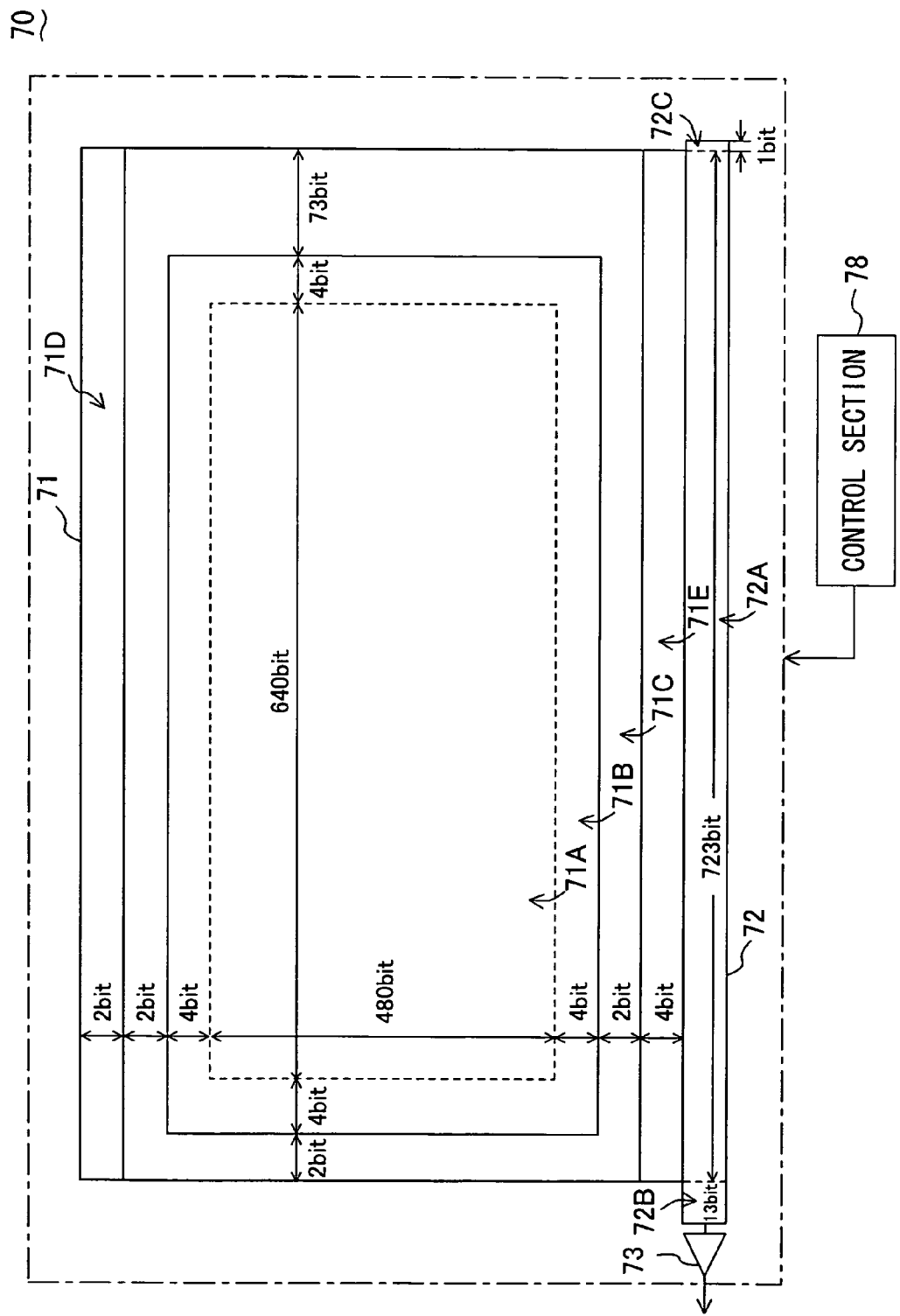

GA2

DEVIATION BY 0.5 PIXELS

GB2

SOLID-STATE IMAGE PICKUP DEVICE, DRIVE METHOD THEREFOR AND CAMERA

BACKGROUND OF THE INVENTION

The present invention relates to a solid-state image pickup device and a camera using the same.

With increase of requests for higher image quality and higher-level functions of a camera using a solid-state image pickup device such as a charge-coupled device (CCD) (note that the "camera" as used herein only refers to such a camera using a solid-state image pickup device), the number of pixels of the device is becoming larger. Many of recent-model cameras are equipped with a monitor such as a liquid crystal display for monitoring an object to be imaged.

To monitor an object to be imaged reliably, the frame rate should not be so low. As the monitor, a liquid crystal TV display is often used, and in this case, signals similar to those for normal TV display must be supplied. However, a solid-state image pickup device having a large number of pixels requires a comparatively long time to read all signals from pixels, and therefore cannot output signals at a frame rate of normal TV signals necessary for the monitor. To solve this problem, such a camera is provided with a mode (generally called a monitor mode) in which the number of pixels in the vertical direction, for example, is reduced to enable high-speed readout of signals.

For the monitor mode, adopted generally are a method of simply thinning image data on a solid-state image pickup device and reading the thinned data, a method of mixing only data of the same color and a combination of these methods. Also, Japanese Laid-Open Patent Publication No. 2000-324504 discloses a method for driving a solid-state image pickup device having a large number of pixels and a complementary color filter provided for optoelectronic transducers, in which high-speed, high-sensitivity and high-quality readout is realized.

The color filter used for a solid-state image pickup device is roughly classified into a filter using the primary colors and a filter using complementary colors. It is therefore necessary to construct image processing systems for the primary color filter and the complementary color filter separately.

The configuration and operation of a conventional solid-state image pickup device will be described. FIG. 38 is a plan view showing the configuration of a conventional solid-state image pickup device. The solid-state image pickup device of FIG. 38 includes: a horizontal transfer section 92 driven with two-phase drive pulses H1 and H2; a charge detection section 93; vertical transfer sections 94 driven with six-phase drive pulses V1 to V6; and photodiodes 95. One photodiode 95 corresponds to one pixel. In FIG. 38, only eight pixels vertically and four pixels horizontally are shown for simplification.

FIG. 39 is a cross-sectional view of the horizontal transfer section 92 in FIG. 38, showing a cross section in parallel with the direction of charge transfer in the horizontal transfer section 92. Referring to FIG. 39, the horizontal transfer section 92 includes a p-well B1, an n-type diffusion layer B2, n⁻-type diffusion layers B3 and electrodes B11 to B14.

The n-type diffusion layer B2, formed on the p-well B1, serves as a transfer channel of the horizontal transfer section 92. The n⁻-type diffusion layers B3, lower in impurity density than the n-type diffusion layer B2, are formed in the n-type diffusion layer B2. The electrodes B11 to B14, driven with the two-phase drive pulses H1 and H2, are formed on the n-type diffusion layer B2 and the n⁻-type diffusion layers B3. Charges are transferred leftward as is viewed from FIG. 39 inside the n-type diffusion layer B2, to be detected by the charge detection section 93.

FIG. 40 is a timing chart showing the drive pulses applied to the horizontal transfer section 92 in FIG. 38. The drive pulse H1 is applied to the electrodes B11 and B12 of the horizontal transfer section 92, and the drive pulse H2 is applied to the electrodes B13 and B14 thereof, to enable signal charges in the horizontal transfer section 92 to be transferred in the signal charge transfer direction indicated in FIG. 39.

FIG. 41 is a timing chart showing the waveforms of signals for driving the conventional solid-state image pickup device of FIG. 38. In the conventional solid-state image pickup device, a read pulse having a high voltage (about 15 V) is applied to electrodes (V1, V3, V5 and V6 in FIG. 38) of the vertical transfer sections 94, to read charges from the photodiodes 95 into the vertical transfer sections 94. Also, drive pulses having a voltage lower than the read pulse are applied to the electrodes (V1 to V6 in FIG. 38) of the vertical transfer sections 94, to enable simultaneous transfer of charges corresponding to one row to the horizontal transfer section 92 in one horizontal scanning period.

The charges transferred to the horizontal transfer section 92 are carried to the charge detection section 93 with a clock of about 24.5 MHz, and the charge detection section 93 converts the charges to imaging signals and outputs the results.

A camera provided with the conventional solid-state image pickup device as described above performs processing for pixel reduction such as mixing signal charges read from two pixels each in the vertical transfer sections or thinning the number of rows to a half in a memory outside the solid-state image pickup device, and outputs the resultant image to a monitor such as a liquid crystal display.

However, in the conventional solid-state image pickup device in which signal charges from one row are transferred vertically in one horizontal scanning period, the transfer processing time is long when the number of pixels is large. Even if charges from two pixels are mixed together in the vertical transfer section, it takes long time to output signal charges corresponding to the entire screen, and thus it is impossible to output a sufficient number of frames per unit time.

In addition, in display of a so-called monitor image on a monitor, it is necessary to convert the output signals to interlaced signals and change the frame rate using a memory and the like because the frame rate is low in the conventional solid-state image pickup device. Even if the scanning mode is converted using a memory and the like, display of moving images smooth in motion in real time is unattainable.

In the case that pixels are simply thinned so that 2R-G and 2B-G lines are output line-sequentially by a general drive method for a solid-state image pickup device for realizing the monitor mode described above, equal sampling intervals are not obtainable due to the pattern of a general color filter formed on the solid-state image pickup device, resulting in considerable degradation in image quality and sensitivity. In the case of adopting a method of mixing data of the same color so that 2R-G and 2B-G lines are output line-sequentially, also, the sampling intervals are not equal between a given horizontal line and the next horizontal line, resulting in degradation in image quality.

In the drive method disclosed in Japanese Laid-Open Patent Publication No. 2000-324504 described above, n times of vertical transfer is performed during a horizontal blanking interval in each horizontal scanning period, and at least one time of forward or backward transfer is performed at a time point between the n times of vertical transfer. Therefore, in a general primary color filter array, it is difficult to perform high-speed, high-sensitivity and high-quality readout. If this drive method is adopted for an interlaced scan CCD, the gate structure of the CCD will become very complicate, and thus the number of signals required for the control will increase.

Conventionally, in design of systems of cameras and the like, development is made separately for a system using a solid-state image pickup device having a complementary color filter and a system using a solid-state image pickup device having a primary color filter. It is very inefficient to develop image processing systems separately like this to comply with the respective characteristics of the complementary color filter and the primary color filter. This conventionally makes it difficult to shorten the time required for development of cameras and the like.

SUMMARY OF THE INVENTION

An object of the present invention is providing a solid-state image pickup device that realizes high-speed readout of imaging signals with neither sacrificing the sensitivity nor largely degrading the resolution.

Another object of the present invention is providing a camera that can use any of a solid-state image pickup device having a complementary color filter and a solid-state image pickup device having a primary color filter.

Specifically, the solid-state image pickup device of the present invention includes: a plurality of optoelectronic transducers arranged in an array; a plurality of vertical transfer sections each for reading charges from optoelectronic transducers belonging to a corresponding column among the plurality of optoelectronic transducers according to a charge read signal and vertically transferring the read charges vertically according to a vertical transfer signal; a horizontal transfer section for horizontally transferring the charges transferred from the vertical transfer sections according to a horizontal transfer signal; a charge detection section for converting the charges horizontally transferred from the horizontal transfer section to signal voltages or signal currents and outputting the result; and a control section, wherein the control section outputs the charge read signal, the vertical transfer signal and the horizontal transfer signal so as to obtain either a signal corresponding to the sum of charges from an optoelectronic transducer belonging to one column and belonging to one of alternately selected rows and an optoelectronic transducer belonging to a column adjacent to the one column and belonging to a row other than the alternately selected rows among the plurality of optoelectronic transducers, or a signal corresponding to the sum of charges from optoelectronic transducers belonging to a same column among the plurality of optoelectronic transducers, every predetermined even number of continuous rows.

According to the invention described above, either a signal corresponding to the sum of charges from optoelectronic transducers selected zigzag or obliquely from two columns or a signal corresponding to the sum of charges from optoelectronic transducers selected linearly in a same column can be obtained every predetermined even number of continuous rows. Therefore, imaging signals can be read at high speed with neither sacrificing the sensitivity nor largely degrading the resolution.

Preferably, the control section outputs the charge read signal in a predetermined horizontal scanning period, and thereafter the control section performs either one of first transfer operation of outputting the vertical transfer signal for permitting each of the plurality of vertical transfer sections to perform vertical transfer toward the horizontal transfer section by the predetermined even number of rows in each horizontal blanking interval, and outputting the horizontal transfer signal for permitting the horizontal transfer section to perform horizontal transfer in a direction toward the charge detection section and the opposite direction alternately by one column every time the vertical transfer is performed by one row; and second transfer operation of outputting the vertical transfer signal for permitting each of the plurality of vertical transfer sections to perform vertical transfer toward the horizontal transfer section by the predetermined even number of rows in each horizontal blanking interval, depending on the horizontal blanking interval.

According to the invention described above, signal charges from a predetermined even number ($n1$) of optoelectronic transducers can be added (mixed) in the horizontal transfer section. This reduces the number of times of readout of all charges in the horizontal transfer section to $1/n1$, compared with the case of reading signal charges from all optoelectronic transducers individually, and thus can greatly shorten the time required for readout of signal charges obtained in the solid-state image pickup device. Accordingly, even a solid-state image pickup device having a large number of pixels can output imaging signals at a sufficiently high frame rate. Also, with no thinning performed during readout of signal charges, the sensitivity is kept from being degraded, and also the resolution of the resultant image is prevented from being largely degraded.

Preferably, the control section performs the first and second transfer operations alternately every horizontal blanking interval.

Preferably, in the solid-state image pickup device described above, as the first transfer operation, the control section outputs the horizontal transfer signal so that the horizontal transfer section performs horizontal transfer by one column in a first direction that is either the direction toward the charge detection section or the opposite direction after the vertical transfer is performed by at least one row, then performs horizontal transfer by one column in a second direction opposite to the first direction after the vertical transfer is next performed by one row, and then performs horizontal transfer by one column in the first direction after the vertical transfer is further performed by one row.

According to the invention described above, signal charges from four optoelectronic transducers can be added in the horizontal transfer section.

In the solid-state image pickup device described above, the control section preferably reverses the direction of the horizontal transfer in the first transfer operation every field.

According to the invention described above, the pattern of the positions of the optoelectronic transducers from which charges are added together can be changed every field.

In the solid-state image pickup device described above, preferably, in a predetermined horizontal scanning period, the control section outputs the vertical transfer signal for permitting each of the plurality of vertical transfer sections to perform vertical transfer toward the horizontal transfer section by the predetermined even number of rows, and also outputs the charge read signal for permitting each of the plurality of vertical transfer sections to read a charge from an optoelectronic transducer belonging to one row among the plurality of optoelectronic transducers and once the read charge is vertically transferred toward the horizontal transfer section by two rows, read a charge from an optoelectronic transducer belonging to a row corresponding to the position of the transferred charge among the plurality of optoelectronic transducers, to mix the newly read charge with the transferred charge, and permitting each of the plurality of vertical transfer sections to read a charge from an optoelectronic transducer belonging to a row adjacent to the one row among the plurality of optoelectronic transducers and once the read charge is vertically transferred toward the horizontal transfer section by two rows, read a charge from an optoelectronic transducer belonging to a row corresponding to the position of the transferred charge among the plurality of optoelectronic transducers, to mix the newly read charge with the transferred charge, and thereafter the control section performs either one of first transfer operation of outputting the vertical transfer signal for permitting each of the plurality of vertical transfer sections to perform vertical transfer toward the horizontal transfer section by the predetermined even number of rows in each horizontal blanking interval, and outputting the horizontal transfer signal for permitting the horizontal transfer section to perform horizontal transfer by one column while the vertical transfer is performed; and second transfer operation of outputting the vertical transfer signal for permitting each of the plurality of vertical transfer sections to perform vertical transfer toward the horizontal transfer section by the predetermined even number of rows in each horizontal blanking interval, depending on the horizontal blanking interval.

According to the invention described above, in an interlaced scan solid-state image pickup device, signal charges from a plurality of optoelectronic transducers belonging to a same column can be added in a vertical transfer section. The signal charges added in the vertical transfer section are further added to other signal charges in the horizontal transfer section. Therefore, the sum of signal charges of a predetermined even number (n1) of optoelectronic transducers can be obtained at each stage of the horizontal transfer section. This reduces the number of times of readout of all charges in the horizontal transfer section to 1/n1, compared with the case of reading signal charges from all optoelectronic transducers individually, and thus can greatly shorten the time required for readout of signal charges obtained in the solid-state image pickup device. Accordingly, even a solid-state image pickup device having a large number of pixels can output imaging signals at a sufficiently high frame rate. Also, with no thinning performed during readout of signal charges, the sensitivity is kept from being degraded, and also the resolution of the resultant image is prevented from being largely degraded.

Preferably, in the predetermined horizontal scanning period, the control section outputs the charge read signal so that each of the plurality of vertical transfer sections reads a first charge from an optoelectronic transducer belonging to a first row among the plurality of optoelectronic transducers and once the read charge is vertically transferred toward the horizontal transfer section by two rows, reads a second charge from an optoelectronic transducer belonging to a second row located closer to the horizontal transfer section than the first row by two rows among the plurality of optoelectronic transducers, to mix the first and second charges, and so that each of the plurality of vertical transfer sections reads a third charge from an optoelectronic transducer belonging to a third row located between the first and second rows among the plurality of optoelectronic transducers and once the read charge is vertically transferred toward the horizontal transfer section by two rows, reads a fourth charge from an optoelectronic transducer belonging to a fourth row located closer to the horizontal transfer section than the third row by two rows among the plurality of optoelectronic transducers, to mix the third and fourth charges.

According to the invention described above, it is possible to obtain two sums of signal charges each from two optoelectronic transducers in a vertical transfer section and thereafter add these sums in a horizontal transfer section.

Preferably, the control section outputs the charge read signal so that each of the plurality of vertical transfer sections reads the third charge after the first and second charges are read.

Preferably, the control section outputs the charge read signal so that each of the plurality of vertical transfer sections reads the first charge after the third charge is read and before the fourth charge is read.

Preferably, each of the plurality of vertical transfer sections includes two electrodes for each row.

Preferably, the control section uses sets of the predetermined even number of continuous rows deviated by a half of the number of rows every field.

According to the invention described above, the pattern of the positions of the optoelectronic transducers from which charges are added together can be changed every field.

Preferably, the solid-state image pickup device further includes a color filter having filter elements corresponding to the respective optoelectronic transducers.

Preferably, the color filter is a Bayer color filter

According to the invention described above, in addition to the readout of added charges from optoelectronic transducers, charges from optoelectronic transducers can be read individually. Therefore, imaging signals with high resolution, which are suitable for taking a still image, can be obtained.

Preferably, the control section can also output the vertical transfer signal so that each of the plurality of vertical transfer sections performs vertical transfer by one row in each horizontal blanking interval.

According to the invention described above, the output is (R (red) component+B (blue) component) or (Gr (green in a R-containing column) component+Gb (green in a B-containing column) component) in the case of obtaining the sum of charges from optoelectronic transducers selected zigzag, while the output is (R component+Gr component) or (B component+Gb component) in the case of obtaining the sum of charges from optoelectronic transducers belonging to a same column. In other words, this solid-state image pickup device, which has a primary color filter, can output complementary colors.

Preferably, the solid-state image pickup device further includes a signal processing section for processing the output of the charge detection section as primary color signals during still-image readout and as complementary color signals during moving-image readout, wherein the color filter has primary color filter elements.

Preferably, the solid-state image pickup device further includes a signal generation section for multiplying color signals obtained as signals output from the charge detection section by respective predetermined coefficients, obtaining the sum of the multiplied values, and outputting the result.

According to the invention described above, it is possible to process both the complementary signals obtained by adding charges from optoelectronic transducers and the primary signals obtained by reading charges from all optoelectronic transducers individually.

Preferably, the control section generates the vertical transfer signal or the horizontal transfer signal based on a signal input from outside.

Preferably, the solid-state image pickup device further includes an address correction section for adding a given signal output from the charge detection section and a signal output before or after the given signal by one pixel and outputting the result.

According to the invention described above, a signal corresponding to the sum of charges from optoelectronic transducers selected zigzag from two columns and a signal corresponding to the sum of charges from optoelectronic transducers selected linearly in a same column agree with each other in horizontal coordinate.

Preferably, the solid-state image pickup device further includes a gain correction section for correcting the level of a given signal output from the charge detection section according to the number of pixels related to the given signal and outputting the result.

According to the invention described above, the signal level is prevented from changing every horizontal scanning period even when signals are obtained based on different numbers of optoelectronic transducers every horizontal scanning period.

Alternatively, the solid-state image pickup device of the present invention includes: a pixel section having a plurality of optoelectronic transducers arranged in an array; a row address selection section for designating a row of the optoelectronic transducers; and a column address selection section for designating a column of the optoelectronic transducers, wherein the pixel section performs either one of first operation of obtaining a signal corresponding to the sum of outputs of an optoelectronic transducer belonging to one column and belonging to one of alternately selected rows and an optoelectronic transducer belonging to a column adjacent to the one column and belonging to a row other than the alternately selected rows, among the plurality of optoelectronic transducers, and second operation of obtaining a signal corresponding to the sum of outputs of optoelectronic transducers belonging to a same column among the plurality of optoelectronic transducers, every predetermined even number of continuous rows, and outputs the resultant signal under instructions from the row address selection section and the column address selection section.

According to the invention described above, in a metal oxide semiconductor (MOS) image pickup device in which a signal is read by designating a row and a column, the outputs of optoelectronic transducers are first summed and then read. Therefore, imaging signals can be read at high speed with neither sacrificing the sensitivity nor largely degrading the resolution.

Preferably, the pixel section performs the first and second operations alternately every horizontal blanking interval.

Preferably, the pixel section obtains a signal corresponding to the sum of outputs of optoelectronic transducers in the first and third rows and one column and optoelectronic transducers in the second and fourth rows and a column adjacent to the one column, as the first operation, every four continuous rows.

Preferably, the pixel section uses either of the two columns adjacent to the one column as the column adjacent to the one column alternately every field.

Preferably, the pixel section uses sets of the predetermined even number of continuous rows deviated by a half of the number of rows every field.

Preferably, the solid-state image pickup device further includes a color filter having filter elements corresponding to the respective optoelectronic transducers.

Preferably, the color filter is a Bayer color filter

Preferably, the pixel section can also output signals read from the plurality of optoelectronic transducers with no operation performed among the signals.

Preferably, the solid-state image pickup device further includes a signal processing section for processing the output of the pixel section as primary color signals during still-image readout and as complementary color signals during moving-image readout, wherein the color filter has primary color filter elements.

Preferably, the solid-state image pickup device further includes a signal generation section for multiplying color signals obtained as signals output from the pixel section by respective predetermined coefficients, obtaining the sum of the multiplied values, and outputting the result.

Preferably, the first and second operations are performed based on a signal input from outside.

Preferably, the solid-state image pickup device further includes an address correction section for adding a given input signal and a signal input before or after the given signal by one pixel and outputting the result.

Preferably, the solid-state image pickup device further includes a gain correction section for correcting the level of a given signal output from the pixel section according to the number of pixels related to the given signal and outputting the result.

Preferably, the pixel section performs operation of obtaining a signal corresponding to the sum of outputs of an optoelectronic transducer belonging to one column and belonging to a first row and an optoelectronic transducer belonging to a column adjacent to the one column and belonging to a second row adjacent to the first row every two continuous-rows of the optoelectronic transducers, as the first operation.

According to the invention described above, even a solid-state image pickup device having a comparatively small effective pixel region can read imaging signals at high speed without degrading the image quality, and can obtain a signal suitable for monitors of the National Television System Committee (NTSC) system, the phase alternation by line (PAL) system and the like.

Alternatively, the solid-state image pickup device of the present invention includes: a plurality of optoelectronic transducers arranged in an array, each corresponding to any of a plurality of colors including the three kinds of primary colors; a color filter having filter elements corresponding to the respective optoelectronic transducers; a plurality of vertical transfer sections each for reading charges from optoelectronic transducers belonging to a corresponding column among the plurality of optoelectronic transducers according to a charge read signal and vertically transferring the read charges according to a vertical transfer signal; a horizontal transfer section for horizontally transferring the charges transferred from the vertical transfer sections according to a horizontal transfer signal; a charge detection section for converting the charges horizontally transferred from the horizontal transfer section to signal voltages or signal currents and outputting the result; and a control section for outputting the charge read signal, the vertical transfer signal and the horizontal transfer signal so as to obtain a signal corresponding to the sum of charges from each at least two optoelectronic transducers corresponding to two different colors including a primary color or one primary color among the plurality of colors.

According to the invention described above, it is possible to obtain a signal corresponding to the sum of charges from each at least two optoelectronic transducers corresponding to two different colors including a primary color or one primary color among the plurality of colors. Therefore, imaging signals can be read at high speed with neither sacrificing the sensitivity nor largely degrading the resolution.

Preferably, the control section outputs the charge read signal, the vertical transfer signal and the horizontal transfer signal so as to obtain: a signal corresponding to the sum of charges from each at least two optoelectronic transducers corresponding to any of a plurality of combinations of two different colors among the three kinds of primary colors for a portion of the plurality of optoelectronic transducers; and a signal corresponding to the sum of charges from each at least two optoelectronic transducers corresponding to one color among the three kinds of primary colors for another portion of the plurality of optoelectronic transducers.

Preferably, the signal obtained to correspond to any of the plurality of combinations of two different colors among the three kinds of primary colors corresponds to any of complementary colors to the three kinds of primary colors.

According to the invention described above, signals representing complementary colors can be obtained in a system having optoelectronic transducers corresponding to the primary colors. Therefore, a system for processing complementary color signals can be effectively used.

Preferably, the color filter is a Bayer color filter.

The camera of the present invention includes: the solid-state image pickup device described above; and a monitor for displaying a signal output from the solid-state image pickup device.

According to the invention described above, an image higher in quality compared with the case of thinning pixels and also higher in frame rate can be displayed on a monitor.

The drive method for a solid-state image pickup device of the present invention is a drive method for a solid-state image pickup device including: a plurality of optoelectronic transducers arranged in an array; a plurality of vertical transfer sections each for reading charges from optoelectronic transducers belonging to a corresponding column among the plurality of optoelectronic transducers and vertically transferring the read charges; a horizontal transfer section for horizontally transferring the charges transferred from the vertical transfer sections; and a charge detection section for converting the charges horizontally transferred from the horizontal transfer section to signal voltages or signal currents and outputting the result, the drive method including conducting either one of: obtaining a signal corresponding to the sum of charges from an optoelectronic transducer belonging to one column and belonging to one of alternately selected rows and an optoelectronic transducer belonging to a column adjacent to the one column and belonging to a row other than the alternately selected rows, among the plurality of optoelectronic transducers; and obtaining a signal corresponding to the sum of charges from optoelectronic transducers belonging to a same column among the plurality of optoelectronic transducers, every predetermined even number of continuous rows of the optoelectronic transducers.

Preferably, the drive method described above includes the steps of: reading charges from the plurality of optoelectronic transducers in a predetermined horizontal scanning period, as a read step; performing vertical transfer toward the horizontal transfer section by the predetermined even number of rows in each horizontal blanking interval, and performing horizontal transfer in a direction toward the charge detection section and the opposite direction alternately by one column every time the vertical transfer is performed by one row, as a first transfer step; and performing vertical transfer toward the horizontal transfer section by the predetermined even number of rows in each horizontal blanking interval, as a second transfer step, wherein after the read step, either the first transfer step or the second transfer step is performed depending on the horizontal blanking interval.

Preferably, the drive method described above includes the steps of: performing vertical transfer toward the horizontal transfer section by the predetermined even number of rows, and during performing the vertical transfer, reading a charge from an optoelectronic transducer belonging to one row among the plurality of optoelectronic transducers, and once the vertical transfer is performed toward the horizontal transfer section by two rows, reading a charge from an optoelectronic transducer belonging to a row corresponding to the positions of the transferred charge among the plurality of optoelectronic transducers, to mix the newly read charge with the transferred charge, and also reading a charge from an optoelectronic transducer belonging to a row adjacent to the one row among the plurality of optoelectronic transducers, and once the vertical transfer is performed toward the horizontal transfer section by two rows, reading a charge from an optoelectronic transducer belonging to a row corresponding to the position of the transferred charge among the plurality of optoelectronic transducers, to mix the newly read charge with the transferred charge, in a predetermined horizontal scanning period, as a read step; performing vertical transfer toward the horizontal transfer section by the predetermined even number of rows in each horizontal blanking interval, and performing horizontal transfer by one column while the vertical transfer is performed, as a first transfer step; and performing vertical transfer toward the horizontal transfer section by the predetermined even number of rows in each horizontal blanking interval, as a second transfer step, wherein after the read step, either the first transfer step or the second transfer step is performed depending on the horizontal blanking interval.

Alternatively, the drive method for a solid-state image pickup device of the present invention is a drive method for a solid-state image pickup device including: a pixel section having a plurality of optoelectronic transducers arranged in an array; a row address selection section for designating a row of the optoelectronic transducers; and a column address selection section for designating a column of the optoelectronic transducers, the drive method including the steps of: obtaining a signal corresponding to the sum of outputs of an optoelectronic transducer belonging to one column and belonging to one of alternately selected rows and an optoelectronic transducer belonging to a column adjacent to the one column and belonging to a row other than the alternately selected rows, among the plurality of optoelectronic transducers, in a predetermined even number of continuous rows of the optoelectronic transducers, as a first step; obtaining a signal corresponding to the sum of outputs of optoelectronic transducers belonging to a same column among the plurality of optoelectronic transducers in a predetermined even number of continuous rows of the optoelectronic transducers, as a second step; and outputting the resultant signal under instructions from the row address selection section and the column address selection section, as an output step, wherein either the first step or the second step is performed, and thereafter the output step is performed.

Alternatively, the drive method for a solid-state image pickup device of the present invention is a drive method for a solid-state image pickup device having a plurality of optoelectronic transducers arranged in an array, each corresponding to any of a plurality of colors including the three kinds of primary colors, the method including the steps of: reading charges from the plurality of optoelectronic transducers, as a read step; and subjecting the read charges to vertical transfer, horizontal transfer and conversion of the transferred charges to signal voltages or signal currents, as a transfer step, wherein the transfer step obtains a signal corresponding to the sum of charges from each at least two optoelectronic transducers corresponding to two different colors including a primary color or one primary color among the plurality of colors.

According to the invention described above, it is possible to obtain a signal corresponding to the sum of charges from each at least two optoelectronic transducers corresponding to two different colors including a primary color or one primary color among the plurality of colors. Therefore, imaging signals can be read at high speed with neither sacrificing the sensitivity nor largely degrading the resolution.

Preferably, the transfer step obtains: a signal corresponding to the sum of charges from each at least two optoelectronic transducers corresponding to any of a plurality of combinations of two different colors among the three kinds of primary colors for a portion of the plurality of optoelectronic transducers; and a signal corresponding to the sum of charges from each at least two optoelectronic transducers corresponding to one color among the three kinds of primary colors for another portion of the plurality of optoelectronic transducers.

Preferably, a signal obtained to correspond to any of the plurality of combinations of two different colors among the three kinds of primary colors corresponds to any of complementary colors to the three kinds of primary colors.

According to the invention described above, signals representing complementary colors can be obtained in a system having optoelectronic transducers corresponding to the primary colors. Therefore, a system for processing complementary color signals can be effectively used.

Preferably, the colors to which the respective optoelectronic transducers correspond are arranged in a Bayer color filter array pattern.

BRIEF DESCRIPTION OF THE DRAWINGS

FIG. 31 is an illustration showing a configuration of a CCD sensor of Embodiment 4 of the present invention.

DESCRIPTION OF THE PREFERRED EMBODIMENTS

Hereinafter, preferred embodiments of the present invention will be described with reference to the accompanying drawings. In the following description, the horizontal scanning period refers to a period that starts at the start of a horizontal blanking interval and ends at the start of the next horizontal blanking interval.

Embodiment 1

In Embodiment 1, a progressive scan CCD sensor will be described as a solid-state image pickup device.

Figure 1:
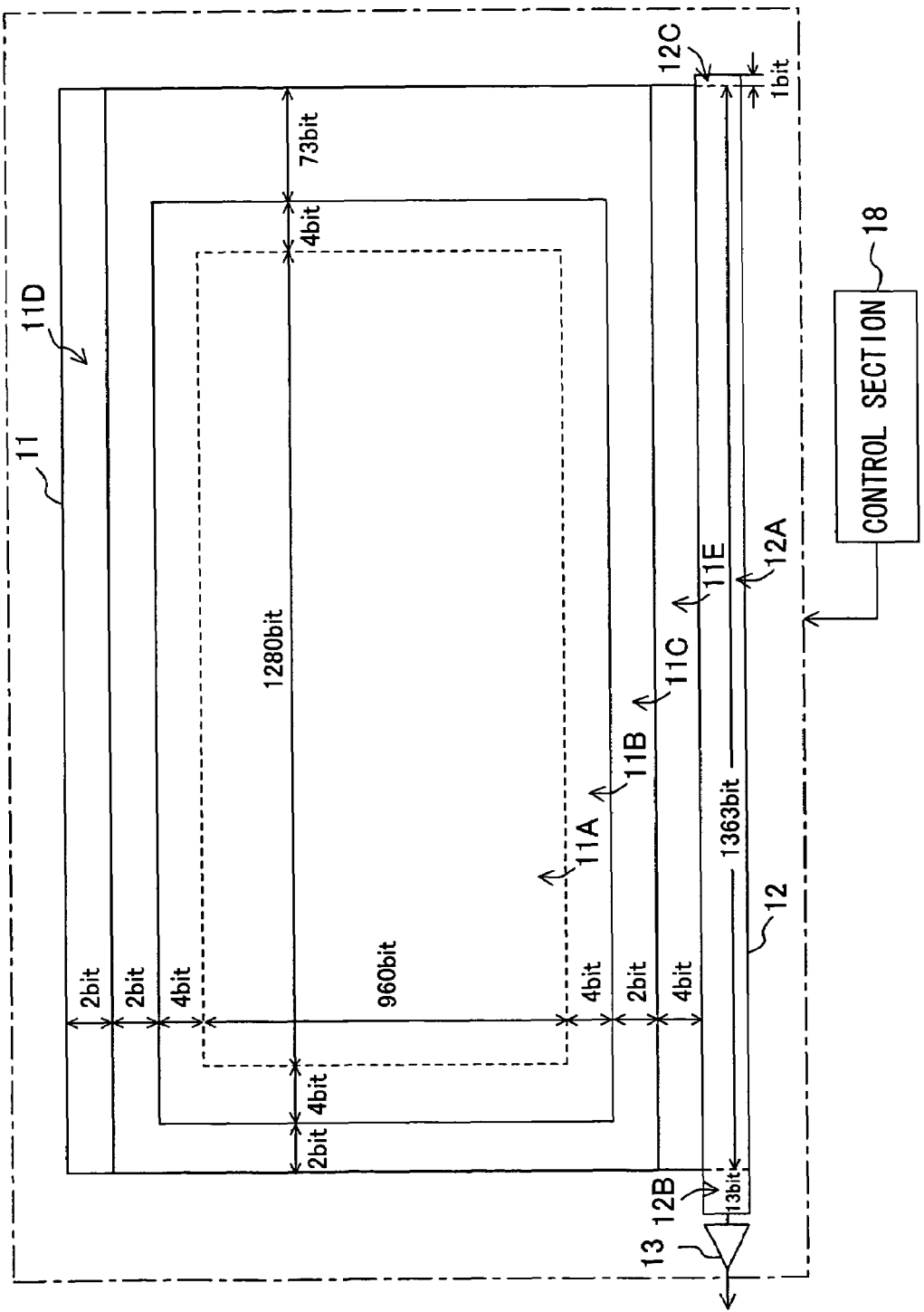
FIG. 1 is an illustration showing a configuration of a CCD sensor of Embodiment 1 of the present invention.

FIG. 1 is an illustration showing a configuration of a CCD sensor 10 of Embodiment 1 of the present invention. The CCD sensor 10 of FIG. 1 includes a pixel section 11, a horizontal transfer section 12, a charge detection section 13, vertical transfer sections (not shown in FIG. 1) and a control section 18. The CCD sensor 10 adopts an all pixel simultaneous independent readout scheme.

The pixel section 11 includes an effective pixel region 11A, a transient region 11B, an optical black region 11C and vertical dummy regions 11D and 11E. The effective pixel region 11A has photodiodes as optoelectronic transducers arranged in an array of 1280 (horizontal)×960 (vertical). One photodiode constitutes one pixel. Hereinafter, a horizontal line of pixels refers to a row, and a vertical line of pixels refers to a column.

The transient region 11B, which surrounds the effective pixel region 11A, has four rows of pixels each on the upper and lower sides and four columns of pixels each on the right and left sides. The optical black region 11C, which surrounds the transient region 11B, has two rows of pixels each on the upper and lower sides, two columns of pixels on the left side, and 73 columns of pixels on the right side. The vertical dummy region 11D having two rows of pixels and the vertical dummy region 11E having four rows of pixels are on the upper and lower sides, respectively, of the optical black region 11C.

As shown in FIG. 1, the horizontal transfer section 12 includes a horizontal effective bit region 12A having 1363 columns, and a horizontal dummy region 12B having 13 columns and a horizontal dummy region 12C having one column located on the sides of the horizontal effective bit region 12A closer to and farther from the charge detection section 13, respectively.

Figure 2:
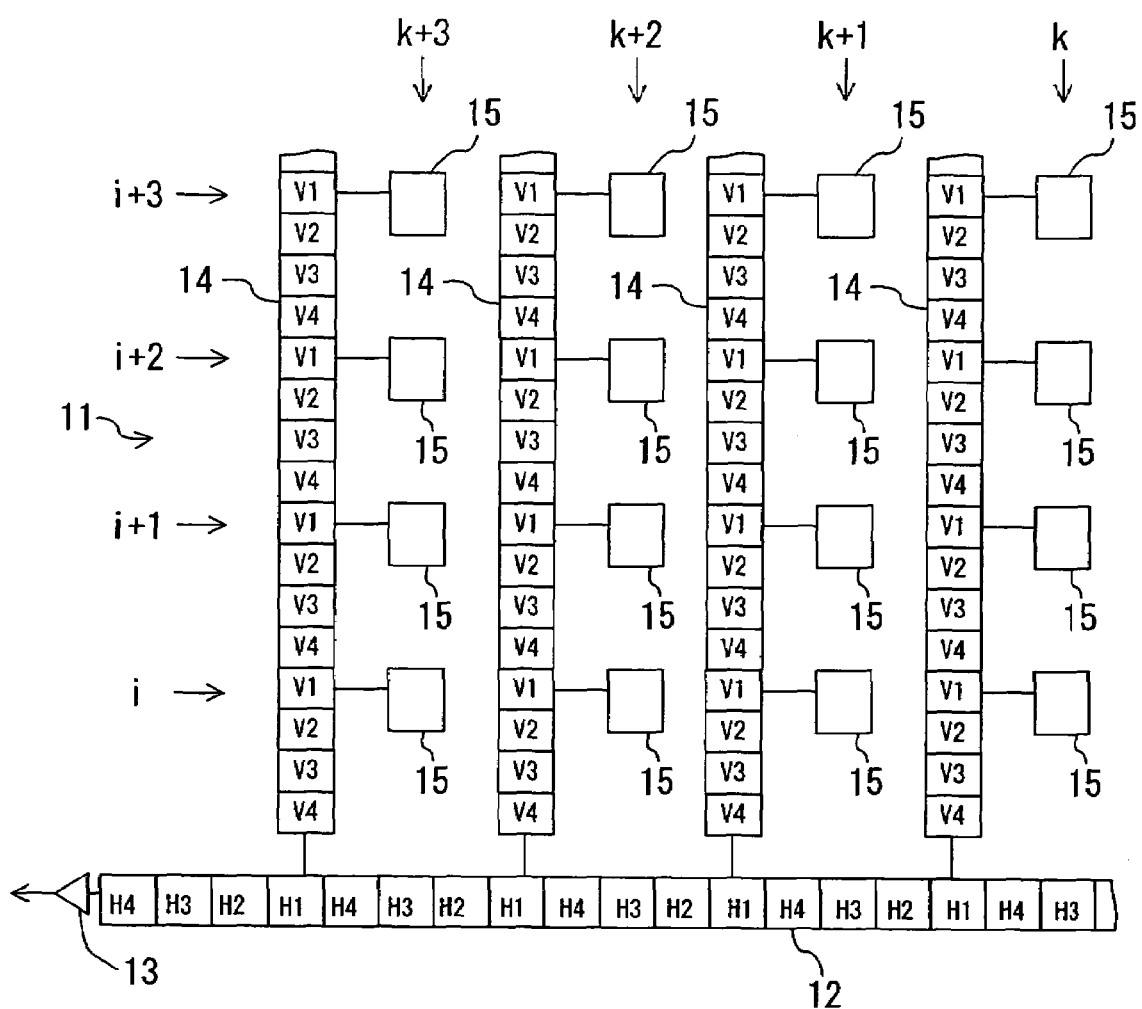
FIG. 2 is a plan view of a configuration of the CCD sensor of FIG. 1.

FIG. 2 is a plan view of a configuration of the CCD sensor 10 of FIG. 1. As shown in FIG. 2, the pixel section 11 of the CCD sensor 10 includes photodiodes 15 arranged in an array. The CCD sensor 10 has vertical transfer sections 14 placed for the respective columns of pixels, and the photodiodes 15 are connected to the corresponding vertical transfer sections 14.

Each of the vertical transfer sections 14 has four electrodes, to which four-phase drive pulses V1, V2, V3 and V4 are applied, to correspond to each photodiode 15. The horizontal transfer section 12 has four electrodes, to which four-phase drive pulses H1, H2, H3 and H4 are applied, to correspond to each vertical transfer section 14 (that is, each column of pixels).

The control section 18 in FIG. 1 outputs the drive pulses V1 to V4 to the vertical transfer sections 14 as a charge read signal and vertical transfer signals, and outputs the drive pulses H1 to H4 to the horizontal transfer section 12 as horizontal transfer signals. The control section 18 also outputs other control signals as required.

In FIG. 2, only a portion of the pixel section corresponding to 4 rows×4 columns of pixels in the i-th to (i+3)th rows and the k-th to (k+3)th columns (i and k are integers) is shown for simplification. Actually, the vertical transfer sections 14 of the same number as the number of columns of photodiodes 15 are placed. In the following description, the row of pixels closest to the horizontal transfer section 12 is referred to as the first row, although any other row may be referred to as the first row. Also, in the following description, the first row in every set of four continuous rows is referred to as the i-th row.

Signal charges are obtained by photoelectric conversion and accumulated in the photodiodes 15 of the pixels in the pixel section 11. Each of the vertical transfer sections 14 reads such signal charges from photodiodes 15 of the corresponding column according to the charge read signal output from the control section 18. Subsequently, the vertical transfer section 14 transfers the read signal charges vertically toward the horizontal transfer section 12 according to the vertical transfer signals output from the control section 18. The horizontal transfer section 12 transfers the signal charges transferred from the vertical transfer sections 14 horizontally according to the horizontal transfer signals output from the control section 18, to be output to the charge detection section 13.

Figure 3:
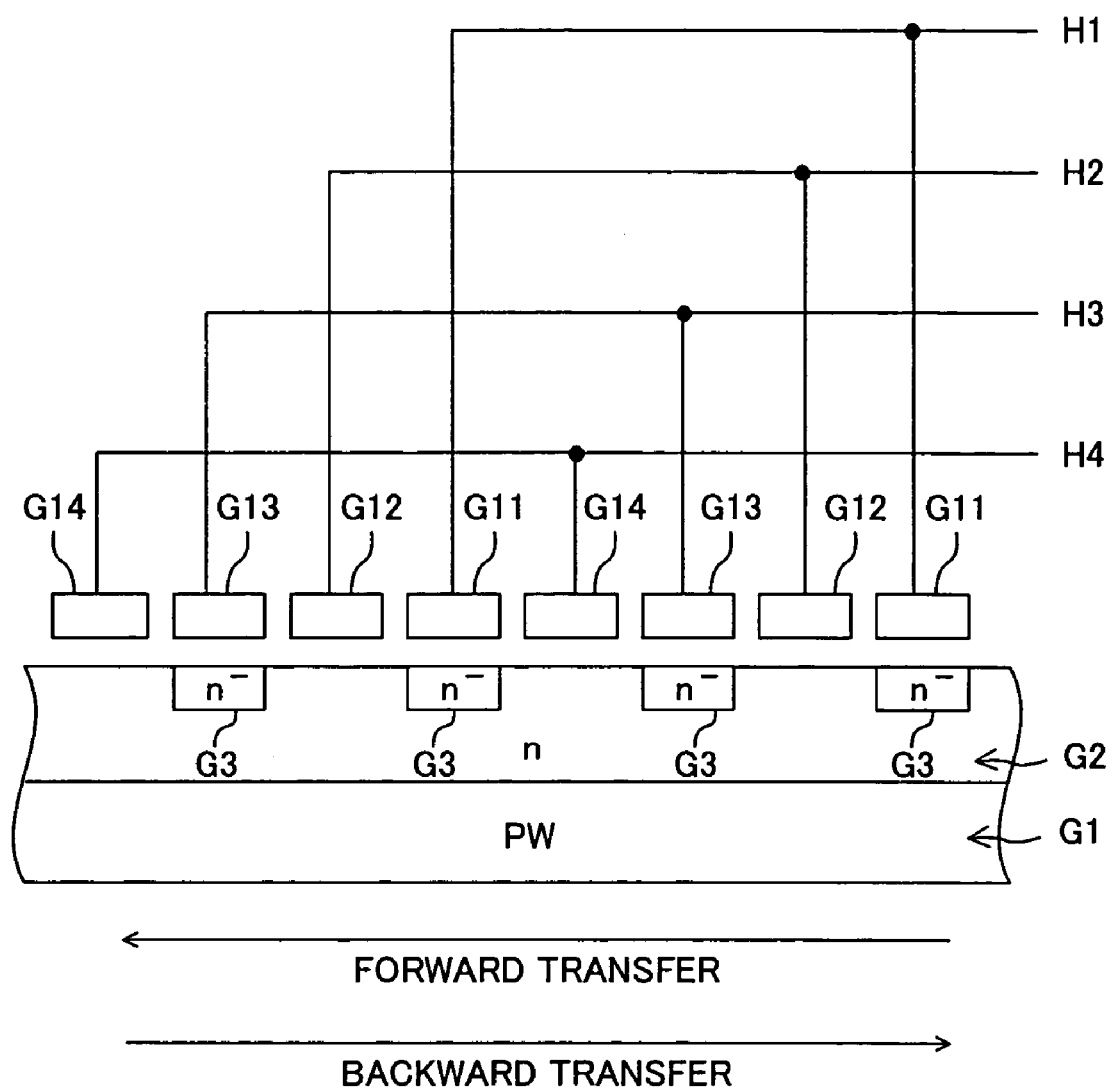
FIG. 3 is a cross-sectional view of a horizontal transfer section in FIG. 2.

FIG. 3 is a cross-sectional view of the horizontal transfer section 12 in FIG. 2, showing a cross section of the horizontal transfer section 12 cut in parallel with the charge transfer direction. In FIG. 3, the arrow of forward transfer indicates the direction of transfer of charges toward the charge detection section 13, and the arrow of backward transfer indicates the direction of transfer of charges toward the side opposite to the charge detection section 13.

As shown in FIG. 3, the horizontal transfer section 12 includes an n-type diffusion layer G2 formed on a p-well G1. The n-type diffusion layer G2 serves as a transfer channel of the horizontal transfer section 12. $N^-$-type diffusion layers G3, lower in impurity density than the n-type diffusion layer G2, are formed in the n-type diffusion layer G2. Electrodes G11, G12, G13 and G14 are formed on the n-type diffusion layer G2 and the $n^-$-type diffusion layers G3, where the electrodes G11 and G13 are formed on the $n^-$-type diffusion layers G3 and the electrodes G12 and G14 are formed on the n-type diffusion layer G2. The four-phase drive pulses H1 to H4 are applied to the electrodes G11 to G14, respectively.

Figure 4:
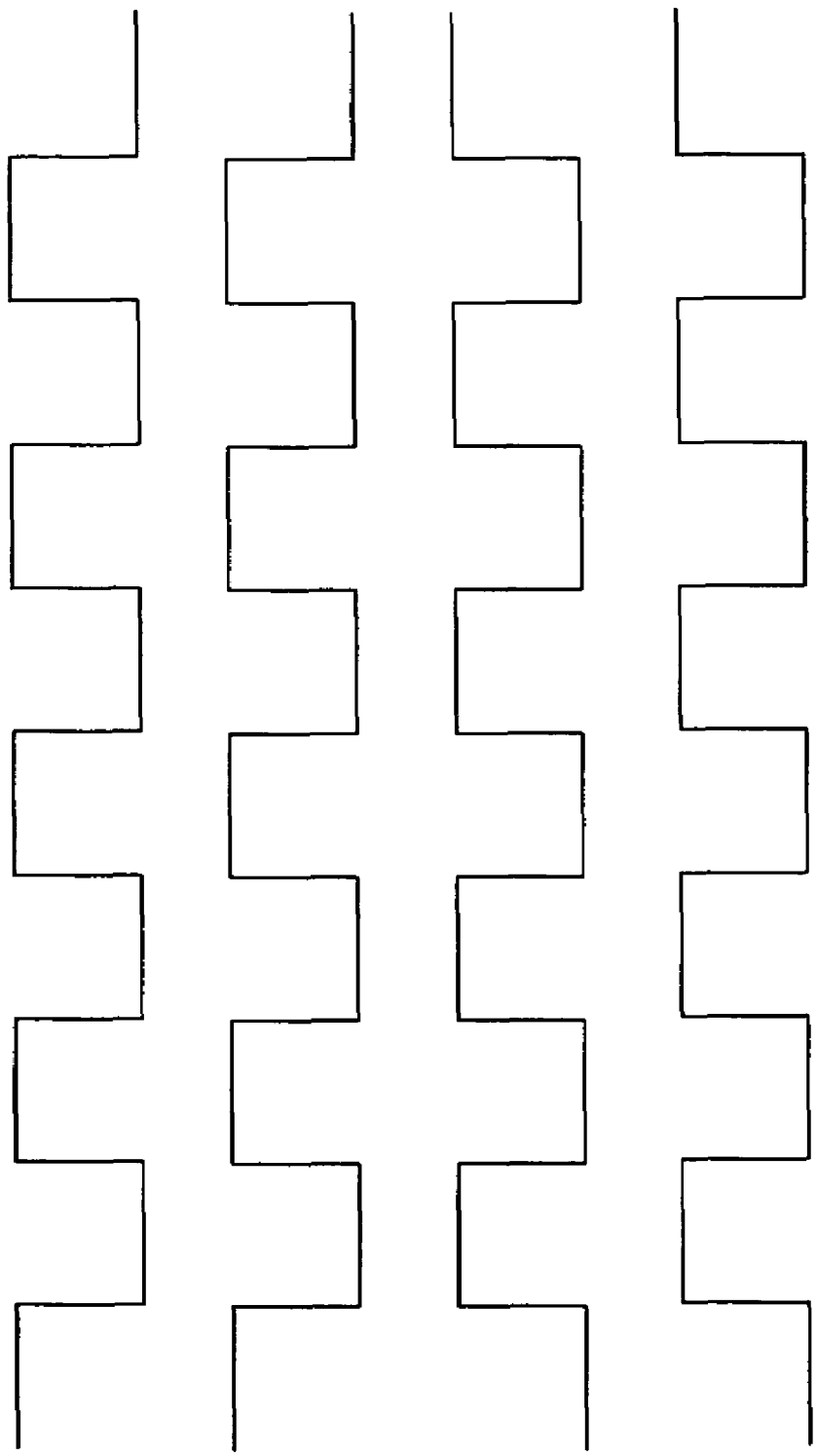
FIG. 4 is a timing chart of drive pulses applied to electrodes of the horizontal transfer section of FIG. 3 when forward transfer is performed.

FIG. 4 is a timing chart of the drive pulses applied to the electrodes G11 to G14 of the horizontal transfer section 12 of FIG. 3 when forward transfer is performed. As shown in FIG. 4, the drive pulses H1 and H2 are of the same phase while the drive pulses H3 and H4 are of the phase reverse to the phase of the drive pulses H1 and H2, to thereby enable forward transfer.

Figure 5:
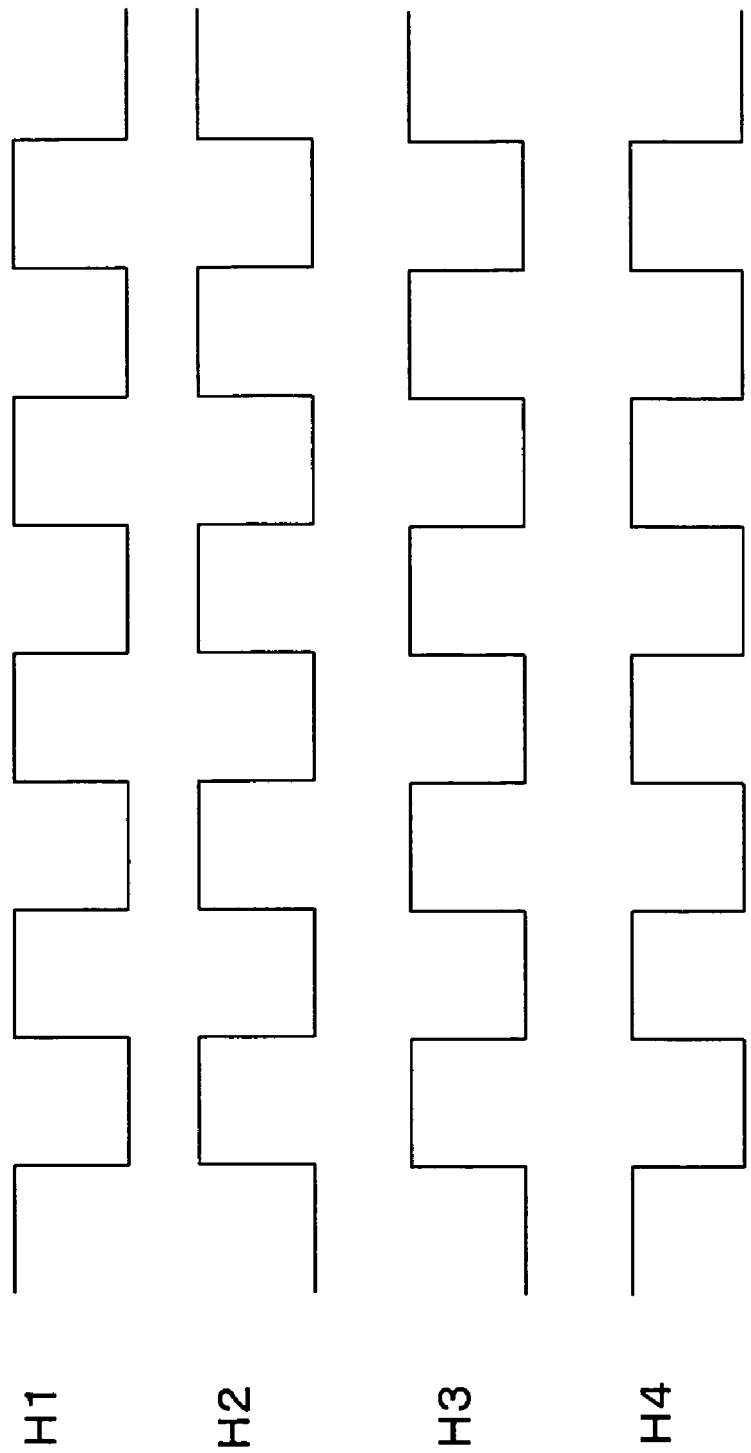
FIG. 5 is a timing chart of drive pulses applied to electrodes of the horizontal transfer section of FIG. 3 when backward transfer is performed.

FIG. 5 is a timing chart of the drive pulses applied to the electrodes G11 to G14 of the horizontal transfer section 12 of FIG. 3 when backward transfer is performed. As shown in FIG. 5, the drive pulses H1 and H4 are of the same phase while the drive pulses H2 and H3 are of the phase reverse to the phase of the drive pulses H1 and H4, to thereby enable backward transfer.

The operation of the CCD sensor 10 in an all pixel independent readout mode will be described. First, the control section 18 applies a high voltage (about 15 V) read pulse (charge read signal) to the vertical transfer sections 14 as the drive pulse V1, to read charges from the photodiodes 15 into the vertical transfer sections 14. Subsequently, the control section 18 applies transfer pulses (vertical transfer signals) having a voltage lower than the read pulse to the vertical transfer sections 14 as the drive pulses V1 to V4, to transfer charges read from photodiodes 15 of one row in the pixel section 11 into the horizontal transfer section 12 simultaneously in each horizontal scanning period. The control section 18 applies a clock of about 24.5 MHz to the horizontal transfer section 12 as the drive pulses H1 to H4, to transfer the charges transferred into the horizontal transfer section 12 in the forward direction. The charge detection section 13, receiving the charges transferred from the horizontal transfer section 12, converts the charges to signal voltages or signal currents to be output as imaging signals. The frame rate of this output is about 1/15 second, for example.

Figure 6:
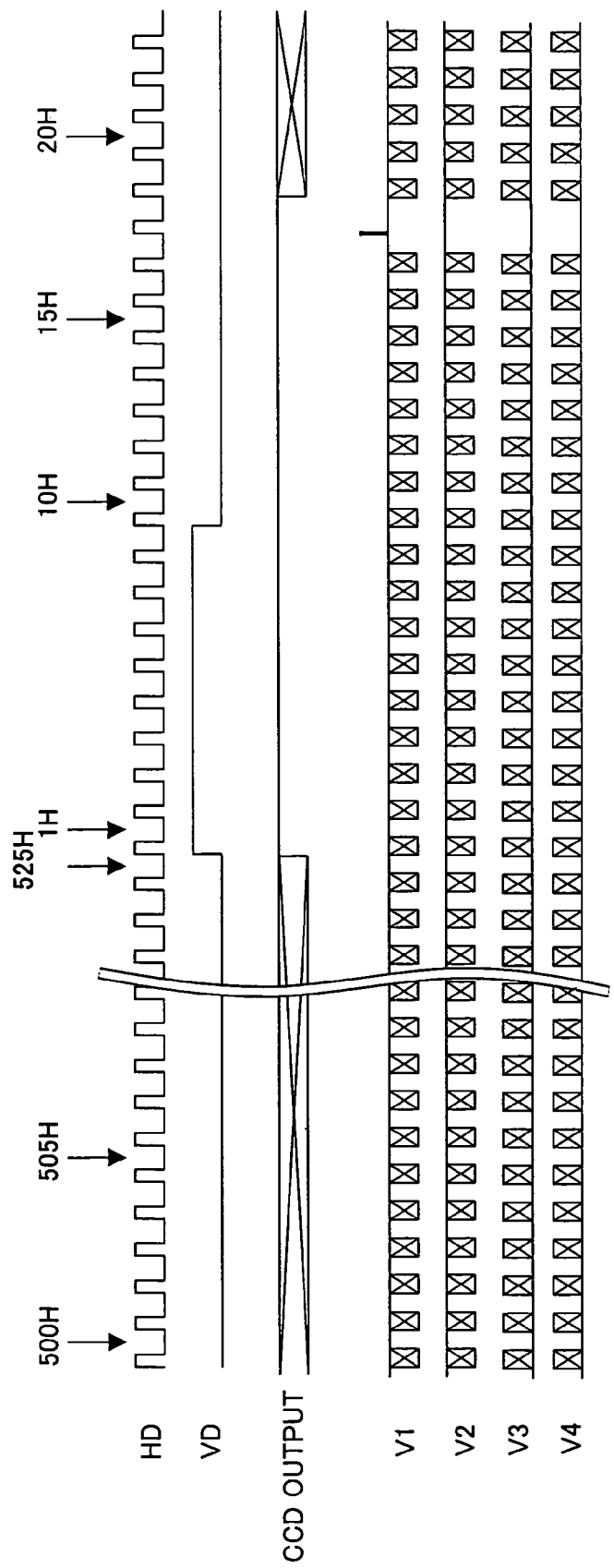
FIG. 6 is a timing chart of signals in odd fields in the CDD sensor of FIG. 1.
Figure 7:
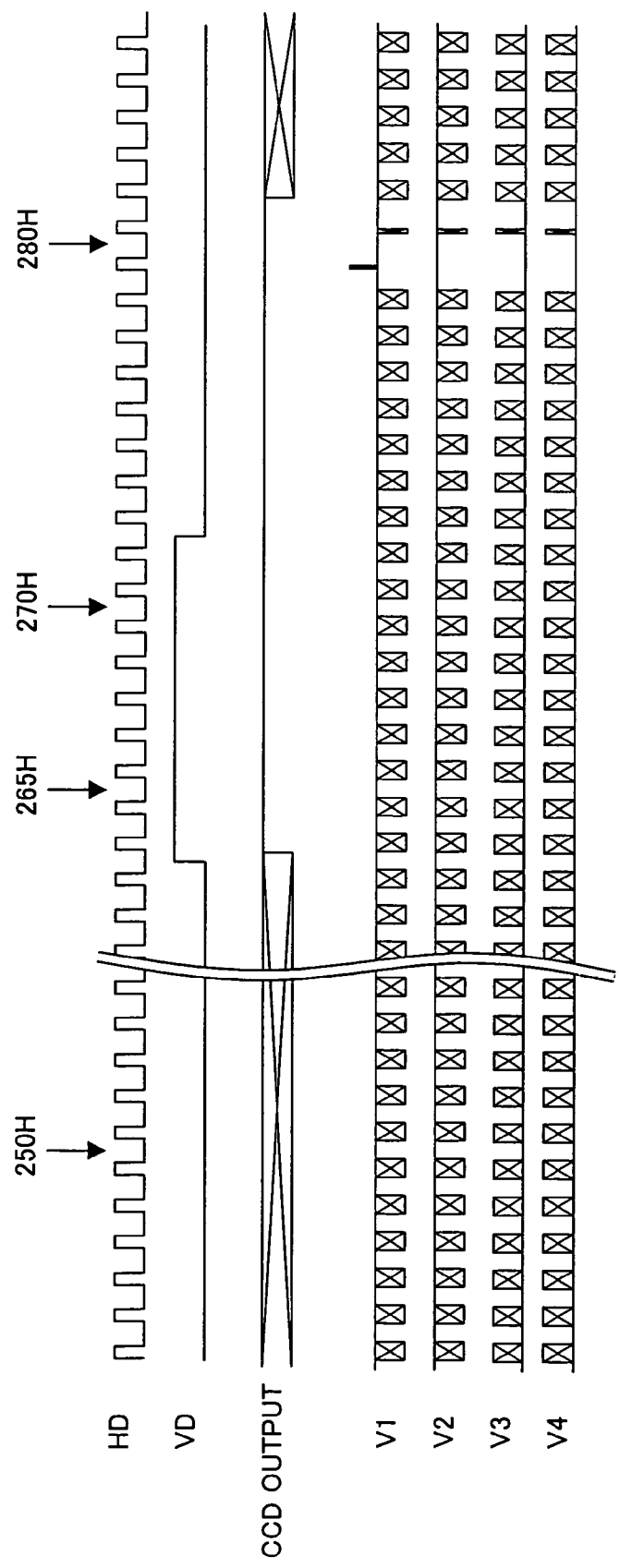
FIG. 7 is a timing chart of signals in even fields in the CDD sensor of FIG. 1.

The operation of the CCD sensor 10 in a pixel mixture readout mode will be described. In this embodiment, the pixel mixture refers to accumulating charges from photodiodes of some pixels to obtain the sum of the charges. In the following description, assume that imaging signals obtained from the CCD sensor 10 are displayed on a monitor of the National Television System Committee (NTSC) system. FIG. 6 is a timing chart of signals in the odd fields in the CCD sensor 10. FIG. 7 is a timing chart of signals in the even fields in the CCD sensor 10.

In FIGS. 6 and 7, HD and VD refer to a horizontal sync signal and a vertical sync signal, respectively. The numbers with the suffix "H" are serial numbers of the horizontal scanning periods in one frame in the NTSC system. The four-phase drive pulses V1 to V4 are signals applied to the electrodes of the vertical transfer sections 14. Note that in the drawings to follow, the mark "x" represents that the level of the signal changes a plurality of times.

Figure 8:
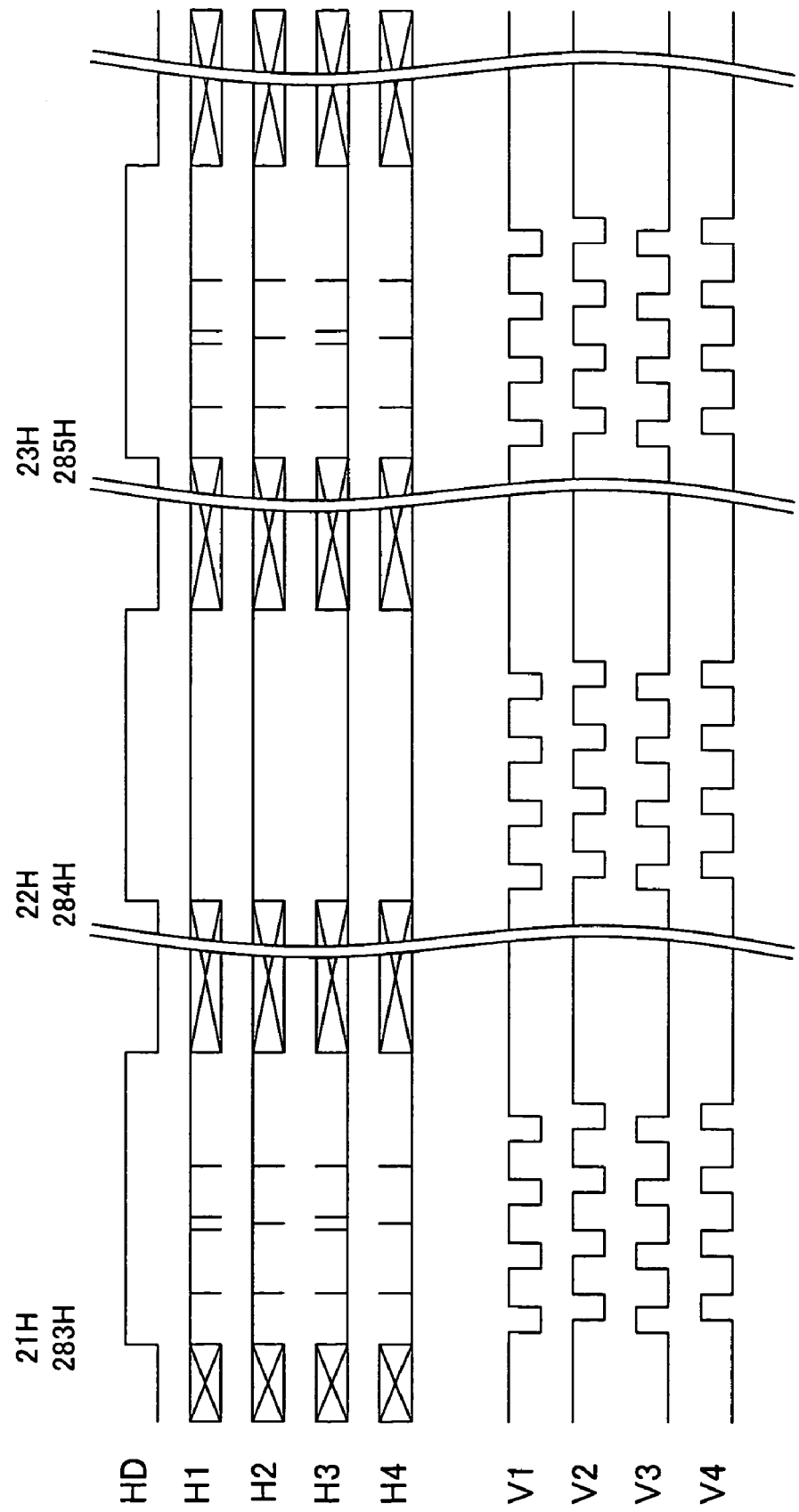
FIG. 8 is a partial enlarged timing chart of FIG. 7.

FIG. 8 is a partial enlarged timing chart of FIGS. 6 and 7, showing the drive pulses H1 to H4 applied to the horizontal transfer section 12 and the drive pulses V1 to V4 applied to the vertical transfer sections 14 in the horizontal scanning periods 21H to 23H or 283H to 285H.

Figure 9:
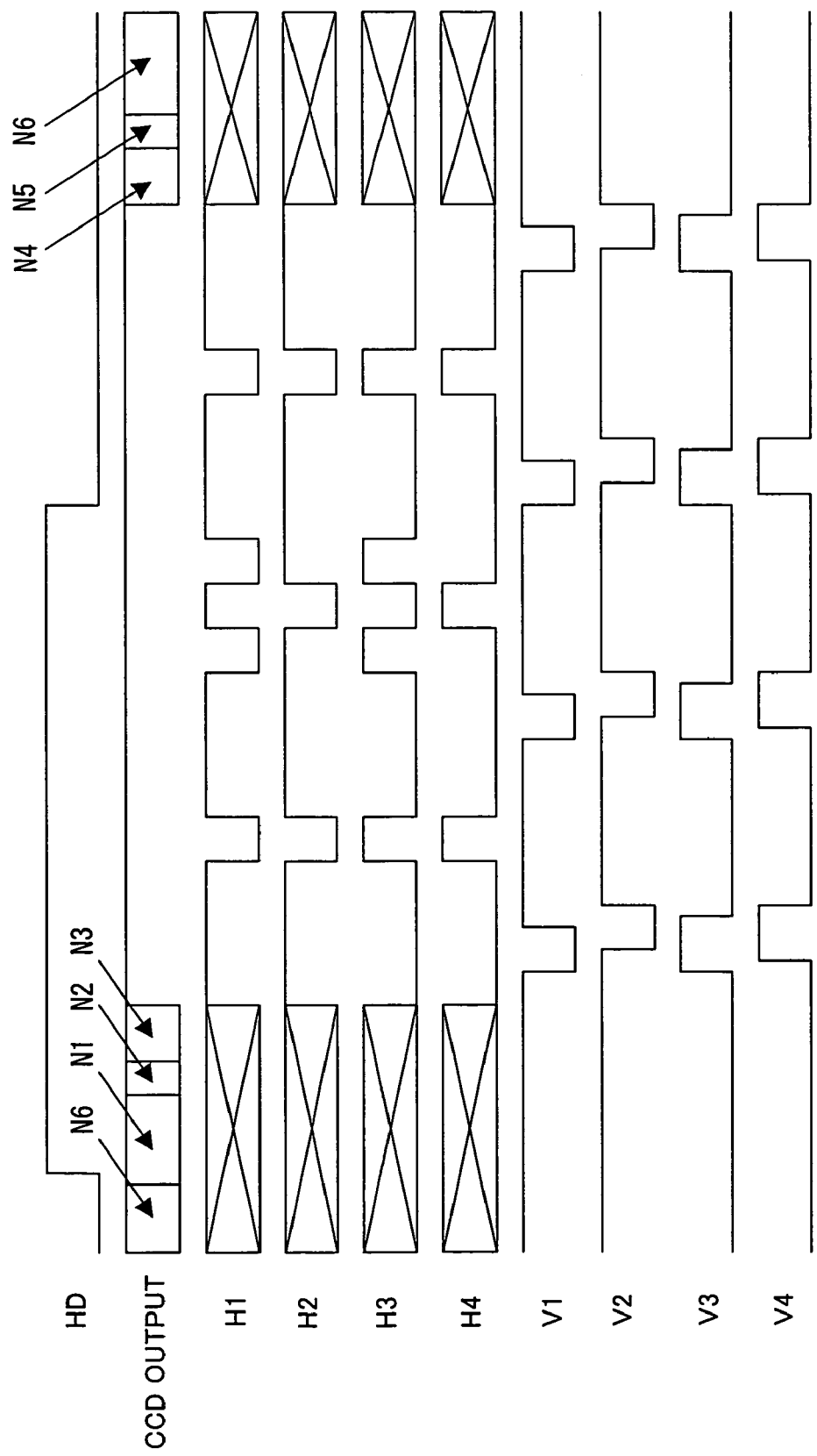
FIG. 9 is a timing chart showing the waveforms of signals in odd-numbered horizontal scanning periods.
Figure 10:
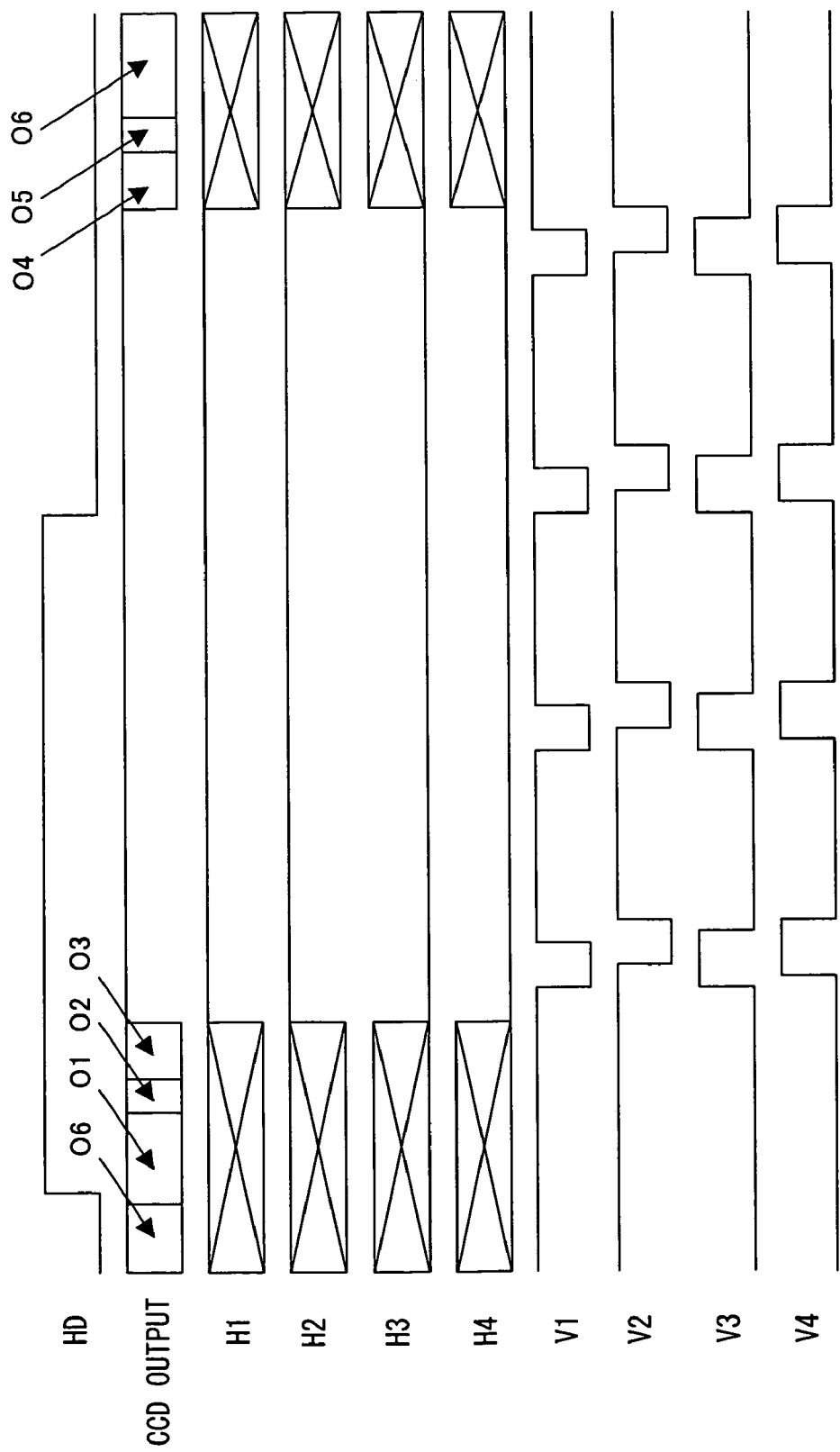
FIG. 10 is a timing chart showing the waveforms of signals in even-numbered horizontal scanning periods.

FIG. 9 is a timing chart showing the waveforms of the signals in an odd-numbered horizontal scanning period in FIG. 8. FIG. 10 is a timing chart showing the waveforms of the signals in the even-numbered horizontal scanning period in FIG. 8. FIGS. 9 and 10 also show a signal output from the charge detection section 13 as the CCD output.

First, the operation of the CCD sensor 10 in the odd fields will be described. As shown in FIG. 6, the control section 18 applies a read pulse to the vertical transfer sections 14 as the drive pulse V1 in the horizontal scanning period 18H. With application of the read pulse, charges in all the photodiodes 15 are read into the vertical transfer sections 14. In the next horizontal scanning period 19H and the periods thereafter, the control section 18 applies transfer pulses (vertical transfer signals) to the vertical transfer sections 14 as the drive pulses V1 to V4 four times each during each horizontal blanking interval (horizontal retrace blanking interval). With application of these transfer pulses, the charges from the photodiodes 15 are transferred vertically toward the horizontal transfer section 12 by four rows in each horizontal scanning period.

In the odd-numbered horizontal scanning periods, the control section 18 performs the transfer operation in the following manner. As shown in FIG. 9, in addition to the vertical transfer by four rows, the control section 18 applies the drive pulses H1 to H4 for forward transfer shown in FIG. 4 to the horizontal transfer section 12 at a time point between the first and second transfer pulses among the four-time transfer pulses applied to the vertical transfer sections 14 during each horizontal blanking interval. This causes transfer of signal charges in the horizontal transfer section 12 toward the charge detection section 13 by one stage (that is, by one column).

The control section 18 then applies the drive pulses H1 to H4 for backward transfer shown in FIG. 5 to the horizontal transfer section 12 at a time point between the second and third transfer pulses among the four-time transfer pulses applied to the vertical transfer sections 14. This causes transfer of signal charges in the horizontal transfer section 12 toward the side opposite to the charge detection section 13 by one stage.

The control section 18 further applies the drive pulses H1 to H4 for forward transfer shown in FIG. 4 to the horizontal transfer section 12 at a time point between the third and fourth transfer pulses among the four-time transfer pulses applied to the vertical transfer sections 14. This causes transfer of signal charges in the horizontal transfer section 12 toward the charge detection section 13 by one stage.

The above operation results in mixing of the charge read from the pixel in the i-th row and the k-th column, the charge read from the pixel in the (i+1)th row and the (k+1)th column, the charge read from the pixel in the (i+2)th row and the k-th column, and the charge read from the pixel in the (i+3)th row and the (k+1)th column at each stage of the horizontal transfer section 12. That is, charges from four photodiodes selected zigzag are added together. The mixed signal charges are sequentially transferred in the horizontal transfer section 12 in the effective period other than the horizontal blanking interval of each horizontal scanning period, to be output to the charge detection section 13.

In FIG. 9, an output N1 represents a signal obtained by converting signal charges of 73 bits read from the photodiodes 15 of the 73 columns in the optical black region 11C on the side farther from the charge detection section 13 in FIG. 1. An output N2 represents a signal obtained from signal charges of one bit in the horizontal dummy region 12C of the horizontal transfer section 12. An output N3 represents a signal corresponding to two bits for null transfer.

An output N4 represents a signal obtained from signal charges of 13 bits in the horizontal dummy region 12B of the horizontal transfer section 12 closer to the charge detection section 13. An output N5 represents a signal obtained from signal charges of two bits read from the photodiodes 15 of the two columns in the optical black region 11C on the side closer to the charge detection section 13. An output N6 represents a signal obtained from signal charges of a total of 1288 bits, that is, eight bits in the transient region 11B and 1280 bits read from the photodiodes 15 of the 1280 columns in the effective pixel region 11A.

As described above, the CCD sensor 10 adds signal charges read from pixels in four rows each sequentially starting from the side of the pixel section 11 closer to the horizontal transfer section 12, and outputs the added charges as the CCD output in each horizontal scanning period subsequent to the horizontal scanning period 18H in which the read pulse is applied.

Specifically, the CCD sensor 10 outputs signal charges read from four rows in the vertical dummy region 11E in the horizontal scanning period 19H, and then outputs signal charges read from a total of four rows including two rows in the optical black region 11C and the first two rows in the transient region 11B closer to the horizontal transfer section 12 in the horizontal scanning period 20H. The CCD sensor 10 further outputs signal charges read from a total of four rows, the remaining two rows in the transient region 11B and the first and second rows in the effective pixel region 11A counted from the side closer to the horizontal transfer section 12, in the horizontal scanning period 21H, and then outputs signal charges read from four rows, the third to sixth rows in the effective pixel region 11A counted from the side closer to the horizontal transfer section 12, in the horizontal scanning period 22H. In the horizontal scanning period 23H and the periods thereafter, signal charges from the seventh row and the rows thereafter are output by four rows in each horizontal scanning period.

In the even-numbered horizontal scanning periods, the control section 18 performs the transfer operation in the following manner. As shown in FIG. 10, the control section 18 performs the vertical transfer by four rows as in the odd-numbered horizontal scanning periods. However, the control section 18 does not apply the drive pulses H1 to H4 for forward or backward transfer to the horizontal transfer section 12 in the horizontal blanking interval during which the four-time transfer pulses are applied to the vertical transfer sections 14. Therefore, no forward or backward horizontal transfer of charges is made in the horizontal transfer section 12.

Accordingly, at each stage of the horizontal transfer section 12, charges read from four pixels in the i-th to (i+3)th rows and the k-th column are mixed or added. The mixed signal charges are sequentially transferred in the horizontal transfer section 12 in the horizontal effective period, to be output to the charge detection section 13.

As described above, the control section 18 outputs the drive pulses V1 to V4 and H1 to H4 so as to obtain either a signal corresponding to the sum of charges read from four pixels in the i-th row and the k-th column, in the (i+1)th row and the (k+1)th column, in the (i+2)th row and the k-th column, and in the (i+3)th row and the (k+1)th column selected zigzag, or a signal corresponding to the sum of charges read from four pixels in the i-th to (i+3)th rows and the k-th column selected linearly, every continuous four rows, depending on whether the horizontal blanking interval is odd-numbered or even-numbered.

Next, the operation of the CCD sensor 10 in the even fields will be described. As shown in FIG. 7, by applying a read pulse to the vertical transfer sections 14 as the drive pulse V1 in the horizontal scanning period 280H, charges in all the photodiodes 15 are read into the vertical transfer sections 14. In the next horizontal scanning period 2811H, transfer pulses are applied to the vertical transfer sections 14 as the drive pulses V1 to V4 two times each during the horizontal blanking interval. With application of these transfer pulses, the charges read from the photodiodes 15 are transferred vertically toward the horizontal transfer section 12 by two rows.

The operation of the CCD sensor 10 in the next horizontal scanning period 282H and the periods thereafter is substantially the same as that in the odd fields in both the odd-numbered and even-numbered horizontal scanning periods. Outputs O1, O2, O3, O4, O5 and O6 in FIG. 10 respectively represent signals as described above in relation to the outputs N1 to N6 in FIG. 9.

In the even fields, the horizontal transfer section 12 outputs signal charges read from only two rows in the vertical dummy region 11E to the charge detection section 13 in the horizontal scanning period 281H, the period next to the horizontal scanning period 280H in which the read pulse is applied. In the horizontal scanning period 282H and the periods thereafter, the horizontal transfer section 12 outputs signal charges read from four rows in each horizontal scanning period. As a result, the combination of four rows of photodiodes 15 from which signal charges are output in one horizontal scanning period is deviated by two rows between the odd fields and the even fields.

Specifically, the CCD sensor 10 outputs signal charges read from a total of four rows, the remaining two rows in the vertical dummy region 11E and two rows in the optical black region 11C, in the horizontal scanning period 282H, and then outputs signal charges read from four rows in the transient region 11B on the side closer to the horizontal transfer section 12 in the horizontal scanning period 283H. The CCD sensor 10 further outputs signal charges read from the first to fourth rows in the effective pixel region 11A counted from the side closer to the horizontal transfer section 12 in the horizontal scanning period 284H. In the horizontal scanning period 285H and the periods thereafter, signal charges from the fifth row and the rows thereafter in the effective pixel region 11A are output by four rows in each horizontal scanning period.

The operations for the odd fields and the even fields described above are repeated alternately, to thereby obtain 4-pixel mixed CCD sensor outputs as real-time video interlaced signals of the NTSC system.

Figure 11:
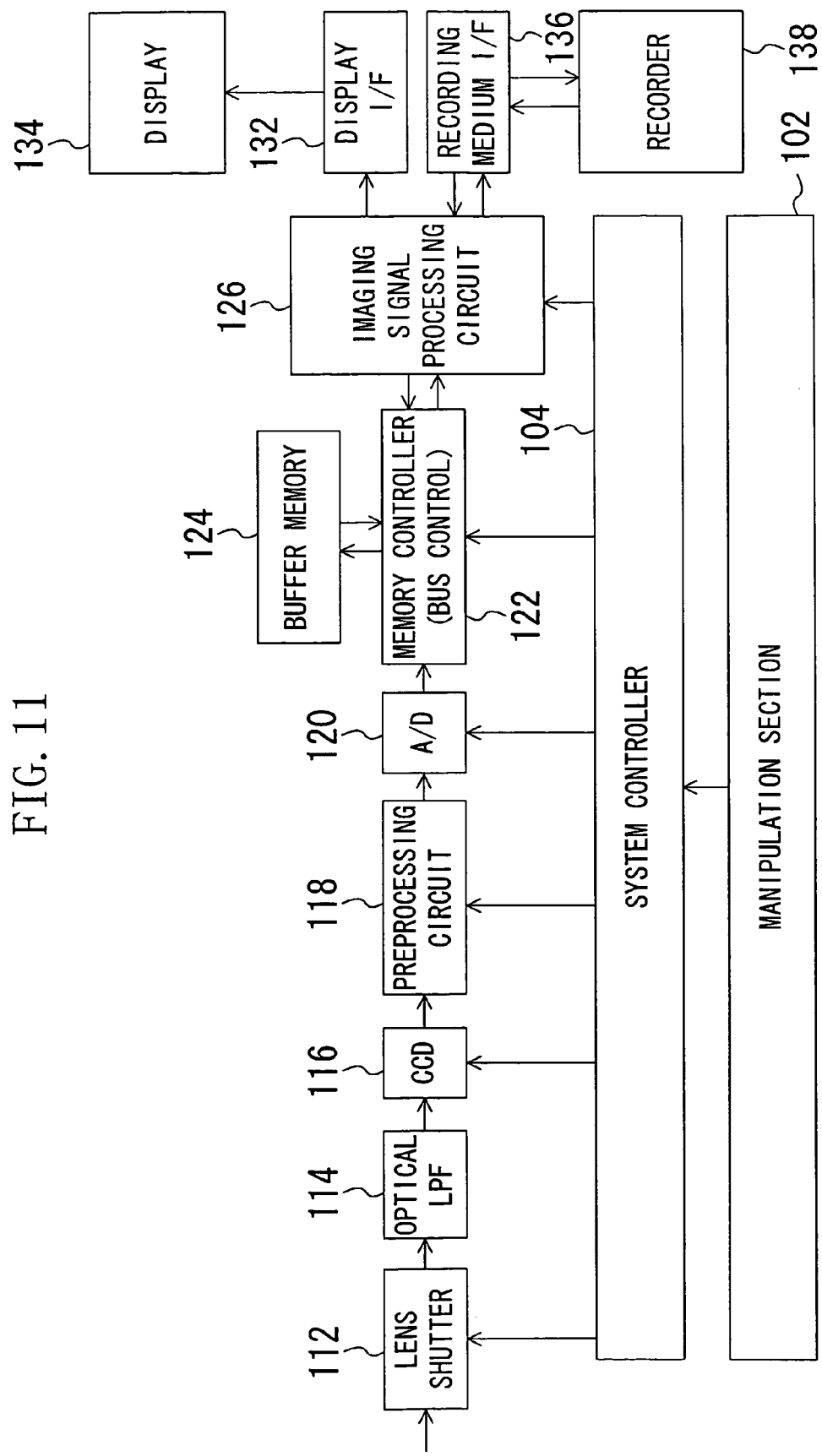
FIG. 11 is a block diagram of a configuration of a digital still camera using the CCD sensor of FIG. 1.

Hereinafter, a configuration of a digital still camera will be described. FIG. 11 is a block diagram of a configuration of a digital still camera using the CCD sensor 10 of FIG. 1. The digital still camera of FIG. 11 includes a manipulation section 102, a system controller 104, a lens shutter 112, an optical low-pass filter (LPF) 114, a CCD sensor 116, a preprocessing circuit 118, an analog-to-digital (A/D) converter 120, a memory controller 122, a buffer memory 124, an imaging signal processing circuit 126, a display interface 132, a display 134, a recording medium interface 136 and a recorder 138.

The lens shutter 112, which has a stop function and a shutter function, adjusts the amount of light incident on the CCD sensor 116 through a lens. The CCD sensor 116 is a solid-state image pickup device for converting an optical image of an object to an electric signal, and is substantially the same as the CCD sensor 10 of FIG. 1. The CCD sensor 116 adopts the all pixel independent readout scheme in which signal charges in all pixels are read independently. Note that photodiodes of the CCD sensor 116 are coated with a color filter.

The preprocessing circuit 118 includes a correlated double sampling (CDS) circuit for removing noise from an electric signal output from the CCD sensor 116 and an amplifier. The preprocessing circuit 118 performs preprocessing such as CDS and AGC for the output of the CCD sensor 116 and outputs the result. The A/D converter 120 converts the analog signals output from the preprocessing circuit 118 to digital signals. The memory controller 122 controls a bus through which the A/D converted signals are sent and the buffer memory 124 under an instruction from the system controller 104. The buffer memory 124 temporarily stores the A/D converted signals.

The display interface 132 is an interface for displaying an image with the display 134. The display 134, which is a liquid crystal display or a TV display, for example, is used as a monitor for checking an image and data shot output from the CCD sensor 116. The recording medium interface 136 is an interface for storing data with the recorder 138. The recorder 138 records data in a recording medium such as a memory card and a hard disk.

The manipulation section 102 accepts manipulation from outside. The system controller 104 generates signals for controlling the CCD sensor 116, and also controls the lens shutter 112, the preprocessing circuit 118, the A/D converter 120, the memory controller 122 and the imaging signal processing circuit 126.

Figure 12:
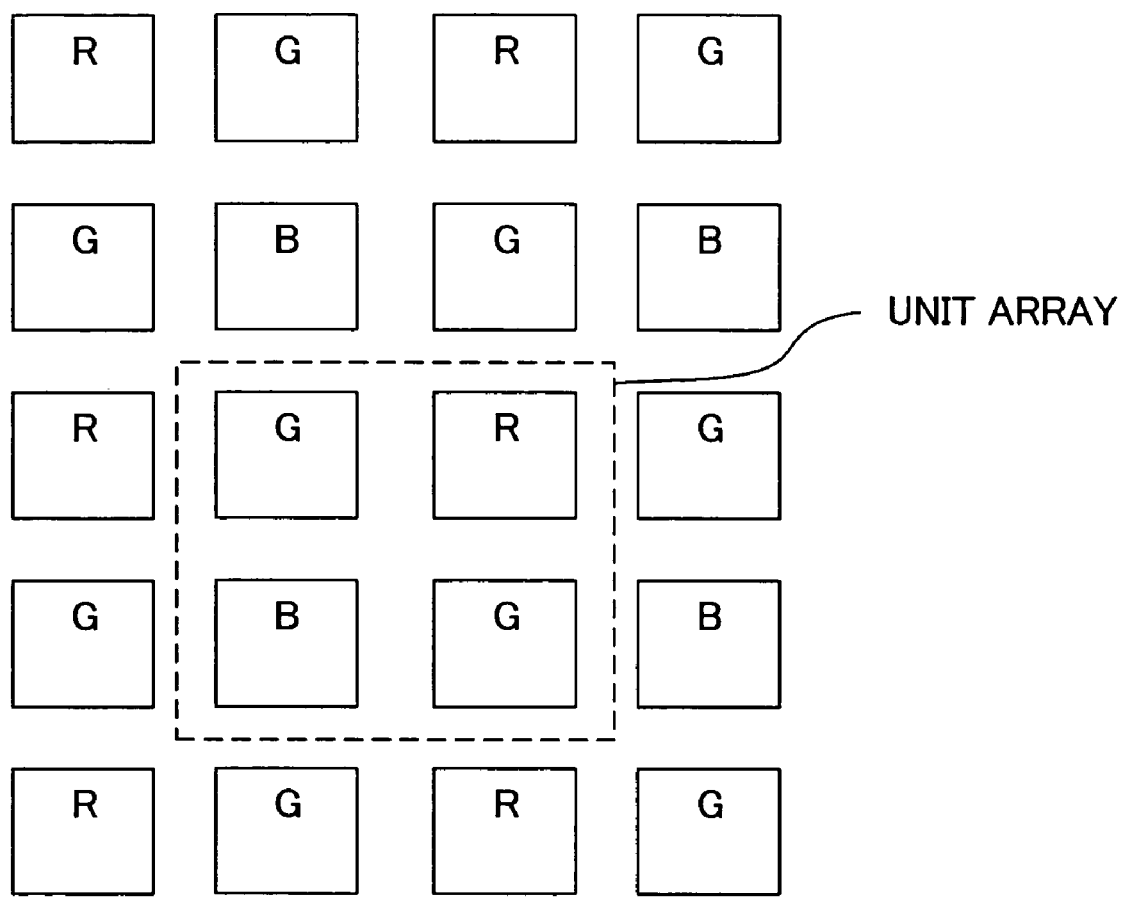
FIG. 12 is an illustration showing an array of colors of a color filter.

Next, the case that the CCD sensor 10 is a color CCD sensor having a color filter will be described. FIG. 12 is an illustration showing an array of colors of a color filter. As shown in FIG. 12, the color filter is a primary color filter composed of red (R), green (G) and blue (B) three color filter elements, in which unit arrays of 2 rows×2 columns are arranged in the row and column directions by an arbitrary number.

The array of R, G, B three colors in FIG. 12 constitutes a so-called Bayer array. Specifically, in the unit array in FIG. 12, the column on the left includes G and B color filter elements arranged in this order from above and the column on the right includes R and G color filter elements arranged in this order from above, as is viewed from FIG. 12. The respective color filter elements are placed to have one-to-one correspondence with the photodiodes 15 in the pixel section 11.

Figure 13:
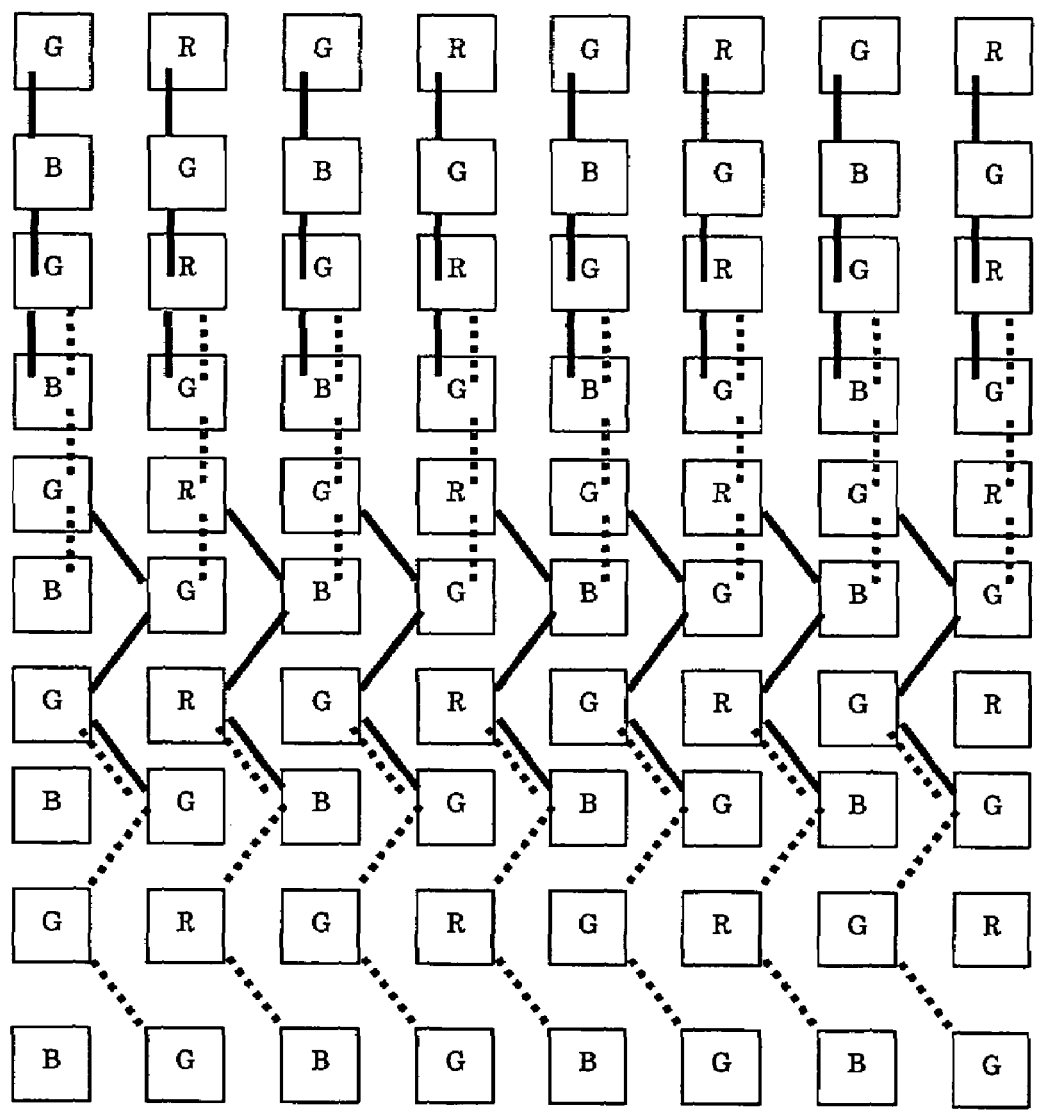
FIG. 13 is an illustration showing pixel mixture in the case of use of the primary color filter of FIG. 12.

FIG. 13 is an illustration showing pixel mixture in the case of use of the primary color filter shown in FIG. 12. In the following description, assume that the bottom row in the pixel array in FIG. 13 is the first row.

In the odd fields, signal charges from sets of four pixels connected by the dotted lines in FIG. 13 are mixed and output. Assume that signal charges from pixels in the first to fourth rows are output in a given odd-numbered horizontal scanning period. In this case, the signal charge from the pixel in the first row and the k-th column, the signal charge from the pixel in the second row and the (k+1)th column, the signal charge from the pixel in the third row and the k-th column and the signal charge from the pixel in the fourth row and the (k+1)th column are mixed. As a result, signals including the color component G and signals including the color components R and B are output dot-sequentially as the output of the CCD sensor 10.

In the even-numbered horizontal scanning period next to the given odd-numbered horizontal scanning period, signal charges from pixels in the fifth to eighth rows are output. In this case, the signal charges from the four pixels in the fifth to eighth rows and the k-th column are mixed. As a result, signals including the color components G and B and signals including the color components G and R are output dot-sequentially as the output of the CCD sensor 10.

In the even fields, signal charges from sets of four pixels connected by the solid lines in FIG. 13 are mixed and output. Signal charges from four rows each, in the combination shifted by two rows vertically from that in the odd fields described above, are output in the respective horizontal scanning periods.

Specifically, in a given odd-numbered horizontal scanning period, signal charges from pixels in the third to sixth rows are output. In this case, the signal charge from the pixel in the third row and the k-th column, the signal charge from the pixel in the fourth row and the (k+1)th column, the signal charge from the pixel in the fifth row and the k-th column and the signal charge from the pixel in the sixth row and the (k+1)th column are mixed. As a result, signals including the color component G and signals including the color components R and B are output dot-sequentially as the output of the CCD sensor 10.

In the even-numbered horizontal scanning period next to the given odd-numbered horizontal scanning period, signal charges from pixels in the seventh to tenth rows are output. In this case, the signal charges from the four pixels in the seventh to tenth rows and the k-th column are mixed. As a result, signals including the color components G and B and signals including the color components G and R are output dot-sequentially as the output of the CCD sensor 10.

In relation to the above, the following equations are established:

$$R+G=YE \quad (1)$$

$$B+G=CY \quad (2)$$

$$R+B=MG \quad (3)$$

$$G+G=G \quad (4)$$

where YE, CY and MG respectively denote yellow, cyan and magenta as complementary color components.

From the above, it is found that the color signal components output in the odd-numbered horizontal scanning periods are G and MG in both the odd and even fields, and the color signal components output in the even-numbered horizontal scanning periods are YE and CY in both the odd and even fields. To state differently, the CCD sensor 10 using a primary color filter as shown in FIG. 12 outputs signals as those that will be output if a complementary color filter is used. This indicates that a system for complementary color signal processing can also be used. In addition, from these signals representing the complementary colors, two kinds of color-difference signals (2R-G) and (2B-G) can be obtained every other row by conducting color separation processing.

As described above, the CCD sensor 10 of this embodiment, which has a primary color filter as shown in FIG. 12, can provide color-difference line-sequential interlaced color signals by mixing charges from four pixels.

As described above, in this embodiment, the number of pixels in the vertical direction of an image that is represented by signals output from the CCD sensor 10 can be reduced without thinning the pixels (discarding charges in some pixels without being read), to roughly match with the number of scanning lines of a monitor. In this way, even when the number of pixels of the CCD sensor 10 is large, signals for the monitor can be obtained with neither degrading the sensitivity nor largely degrading the resolution.

In addition, with a camera configuration including the CCD sensor 10 and a monitor allowing real-time video display, it is possible to display the output of the CCD sensor 10 on the monitor as it is even though the number of rows of pixels of the CCD sensor 10 exceeds the number of scanning lines of the monitor, without the necessity of performing complicated image processing using a field memory and the like. Thus, a camera capable of displaying moving images in real time without degrading the sensitivity and the S/N ratio can be provided.

Figure 14A:
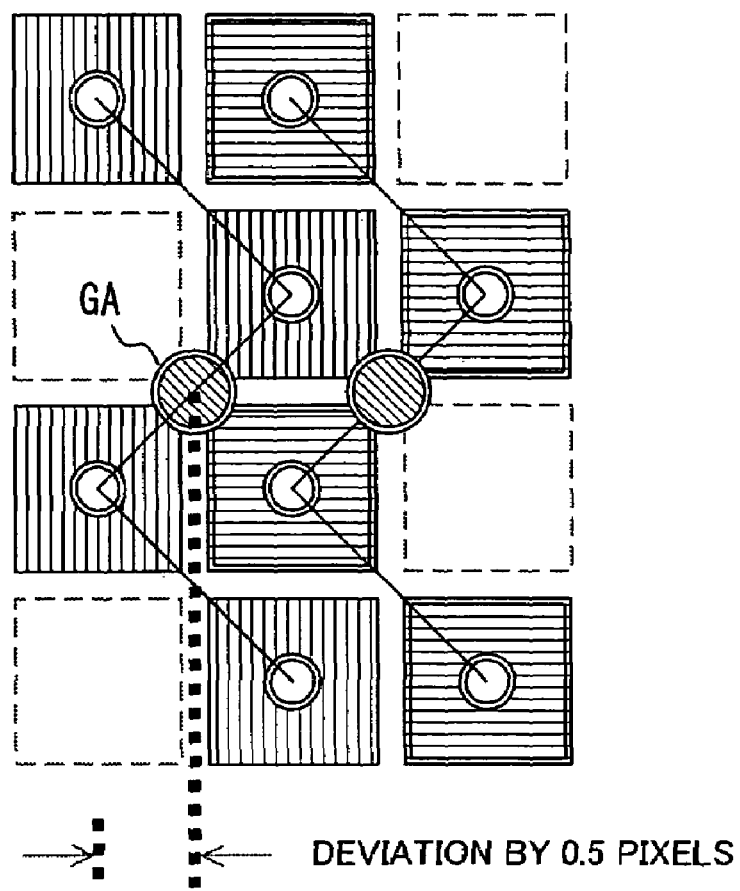
FIG. 14A is an illustration showing a pixel mixture pattern, together with the center of gravity of pixels mixed, observed when horizontal transfer is performed during vertical transfer of charges to be mixed.
Figure 14B:
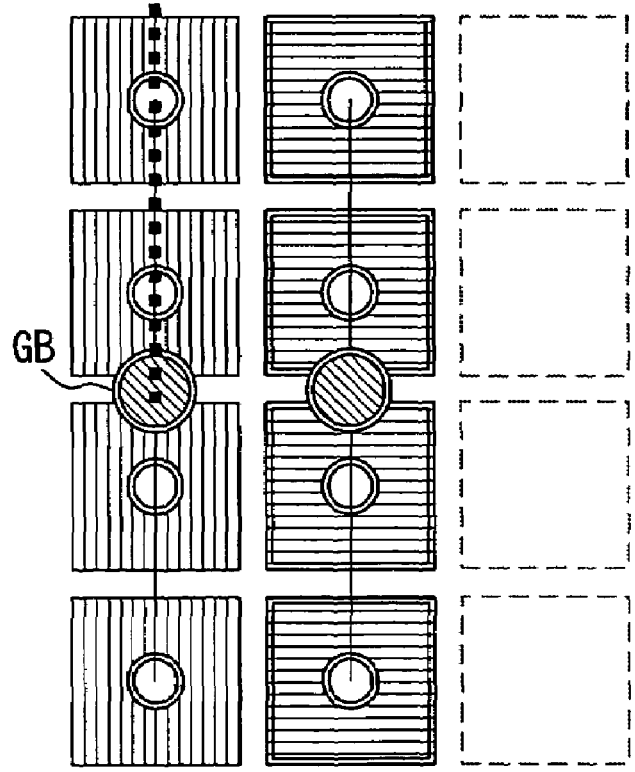
FIG. 14B is an illustration showing a pixel mixture pattern, together with the center of gravity of pixels mixed, observed when no horizontal transfer is performed during vertical transfer of charges to be mixed.
Figure 15:
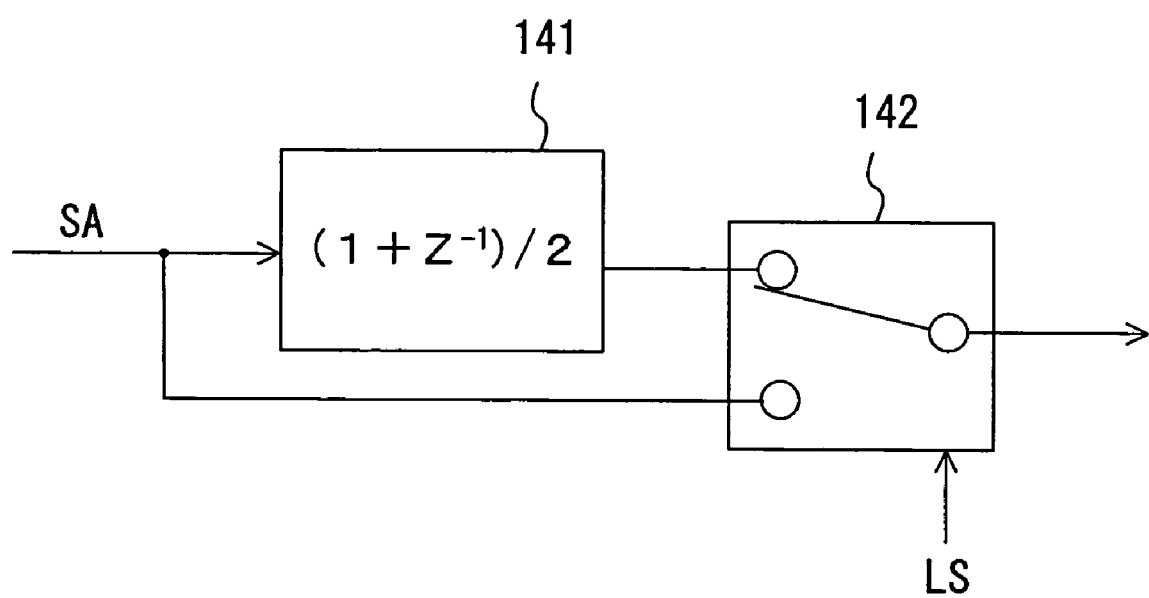
FIG. 15 is a circuit diagram of an address correction circuit.

FIG. 14A is an illustration showing a pixel mixture pattern, together with the center of gravity GA of pixels mixed, obtained when horizontal transfer is performed during the interval of vertical transfer of charges to be mixed. FIG. 14B is an illustration showing a pixel mixture pattern, together with the center of gravity GB of pixels mixed, obtained when no horizontal transfer is performed during the interval of vertical transfer of charges to be mixed. FIG. 15 is a circuit diagram of an address correction circuit (address correction section).

As shown in FIGS. 14A and 14B, data obtained as a result of pixel mixture as shown in FIG. 13 corresponds to the position of the center of gravity of pixels mixed. Accordingly, the position of the center of gravity is deviated by 0.5 pixels between the two different pixel mixture patterns. To solve this problem, the imaging signal processing circuit 126 in FIG. 11 is provided with the address correction circuit of FIG. 15, for example, to perform correction according to the pixel mixture pattern.

The address correction circuit of FIG. 15 includes an adder 141 and a selector 142. The adder 141 adds an input signal SA and a signal input before the input signal SA by one pixel, to obtain the average thereof, and outputs the result to the selector 142. When a signal obtained by mixing pixel charges in the pattern shown in FIG. 14A is input into the adder 141, the resultant output signal has the center of gravity of pixels at a position left by 0.5 pixels from the center of gravity of pixels of the signal currently input. This position is the same horizontally as the center of gravity GB of pixels obtained in the pattern shown in FIG. 14B. The selector 142 selects the output of the adder 141 when the line corresponds to the pattern in FIG. 14A or the input of the adder 141 when the line corresponds to the pattern in FIG. 14B, according to a line switch signal LS, and outputs the result.

Alternatively, the addition may be made between a signal, at a given time, obtained by mixing pixel charges in the pattern shown in FIG. 14B and a signal input after the above signal by one pixel.

As described above, in this embodiment, the CCD sensor 10, capable of reading charges in all pixels independently, can change its drive method according to the imaging mode. That is, the "all pixel independent readout mode" is adopted when a high-precision image is necessary, such as when a still image is taken, or the "pixel mixture readout mode" is adopted when dynamic resolution is necessary, such as when moving images are taken, to increase the frame rate.

Figure 16A:
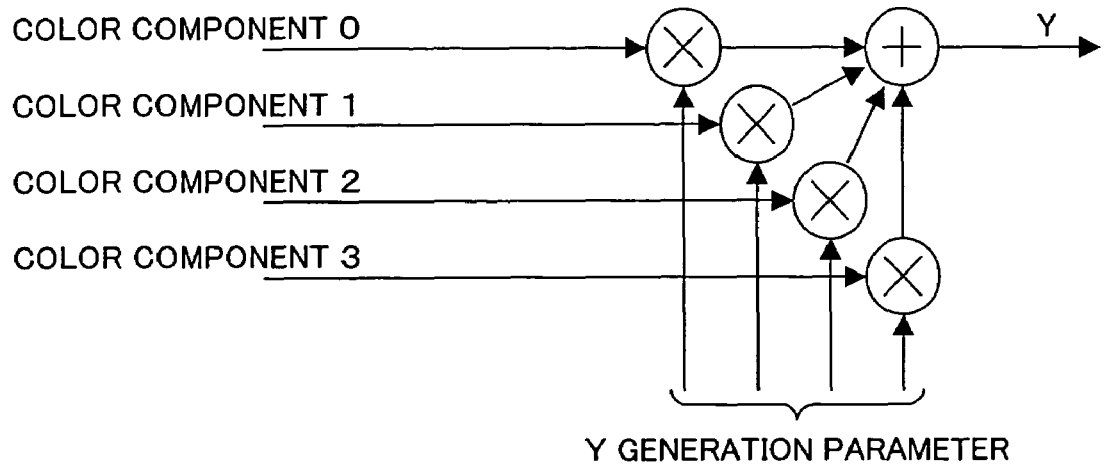
FIG. 16A is a circuit diagram of a luminance signal generation circuit.
Figure 16B:
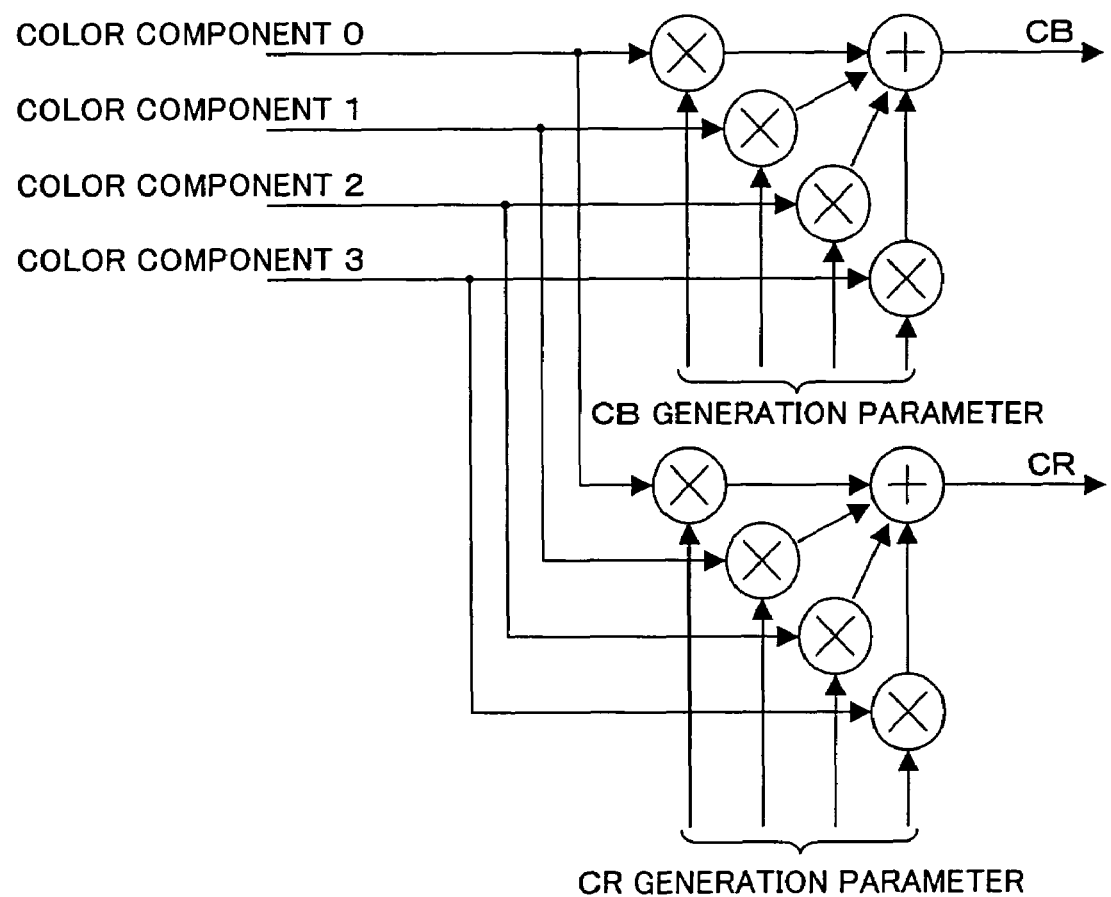
FIG. 16B is a circuit diagram of a color-difference signal generation circuit.

FIG. 16A is a circuit diagram of a luminance signal generation circuit (signal generation section), and FIG. 16B is a circuit diagram of a color-difference signal generation circuit (signal generation section). In this embodiment, the pixel signals read from the CCD sensor during the drive in the "all pixel independent readout mode" are R, G and B, while pixel signals read during the drive in the "pixel mixture readout mode" are MG, CY, YE and G. Accordingly, the imaging signal processing circuit 126 in FIG. 11 includes signal generation circuits as shown in FIGS. 16A and 16B responsive to both the complementary color signals and the primary color signals.

For example, in the pixel mixture readout mode, in which color components 0 to 3 are MG, CY, YE and G, respectively, the coefficients of the respective terms of the following expressions are given to the luminance signal generation circuit and the color-difference signal generation circuit as parameters for generating Y, CB and CR.

$$Y=MG+CY+G+YE$$

$$CB=MG+CY-G-YE$$

$$CR=MG+YE-G-CY$$

In the all pixel independent readout mode, in which the color components 0 to 3 are R, G, G and B, respectively, the coefficients of the respective terms of the following expressions are given to the luminance signal generation circuit and the color-difference signal generation circuit as parameters for generating Y, CB and CR.

$$Y=0.3R+0.29(G+G)+0.11B$$

$$CB=-0.3R-0.29(G+G)+0.89B$$

$$CR=0.7R+0.29(G+G)-0.11B.$$

As described above, with the luminance signal generation circuit of FIG. 16A and the color-difference signal generation circuit of FIG. 16B, the luminance signal and the color-difference signals can be generated from signals output from a solid-state image pickup device having a complementary color filter or a solid-state image pickup device having a primary color filter, whichever is provided. Accordingly, it is possible to provide a camera that can accept both a solid-state image pickup device having a complementary color filter and a solid-state image pickup device having a primary color filter.

Embodiment 2

In Embodiment 2, an interlaced scan CCD sensor will be described as a solid-state image pickup device.

Figure 17:
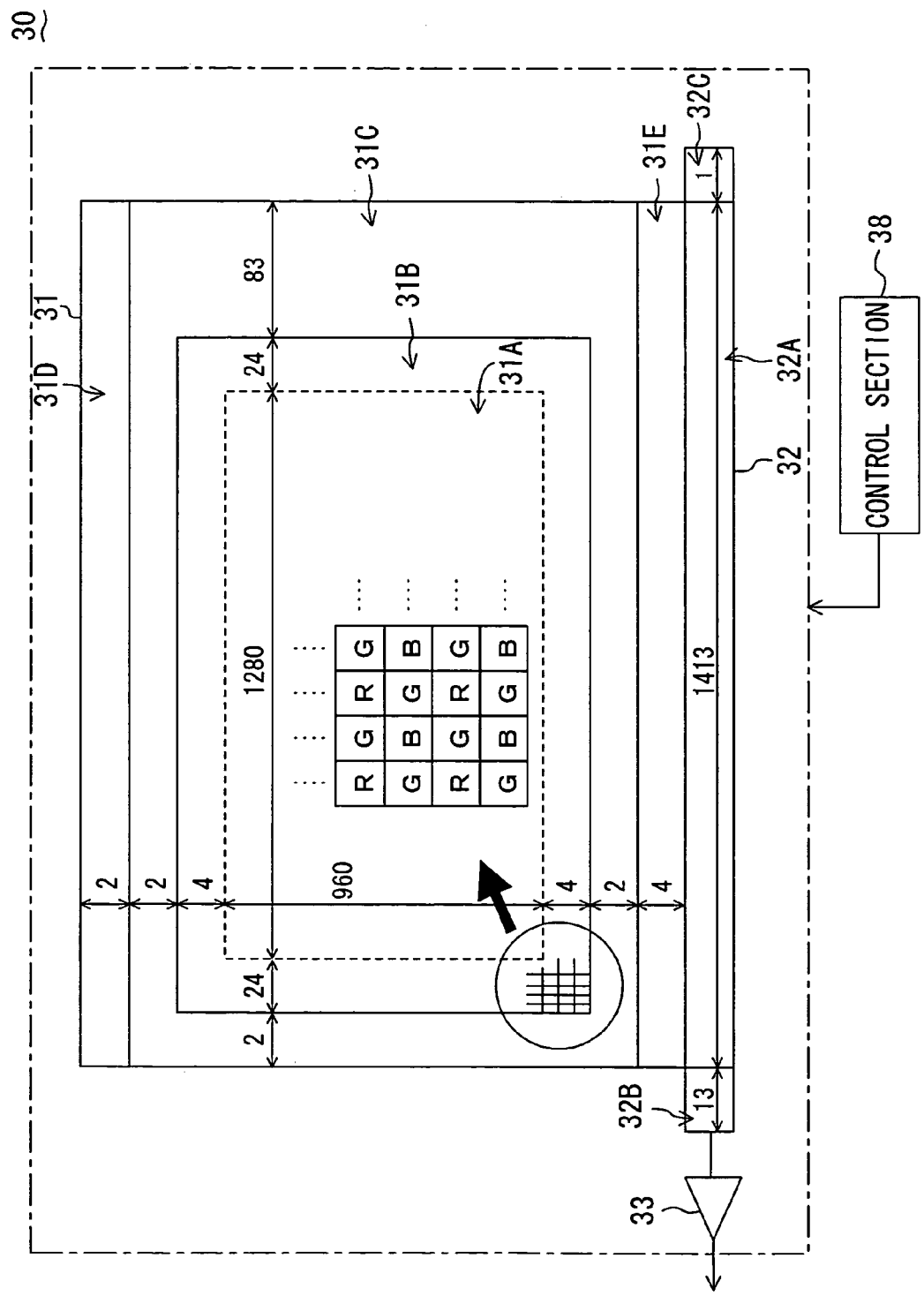
FIG. 17 is an illustration showing a configuration of a CCD sensor of Embodiment 2 of the present invention.

FIG. 17 is an illustration showing a configuration of a CCD sensor 30 of Embodiment 2 of the present invention. The CCD sensor 30 of FIG. 17 includes a pixel section 31, a horizontal transfer section 32, a charge detection section 33, vertical transfer sections (not shown in FIG. 17) and a control section 38.

The pixel section 31 includes an effective pixel region 31A, a transient region 31B, an optical black region 31C and vertical dummy regions 31D and 31E. The effective pixel region 31A has photodiodes as optoelectronic transducers arranged in an array of 1280 (horizontal)×960 (vertical). One photodiode constitutes one pixel. The regions 31A to 31E of the pixel section 31 are substantially the same in arrangement and the number of pixels as the regions 11A to 11E of the pixel section 11 of the CCD sensor 10 of FIG. 1, respectively. The transient region 31B and the optical black region 31C have photodiodes.

Figure 18:
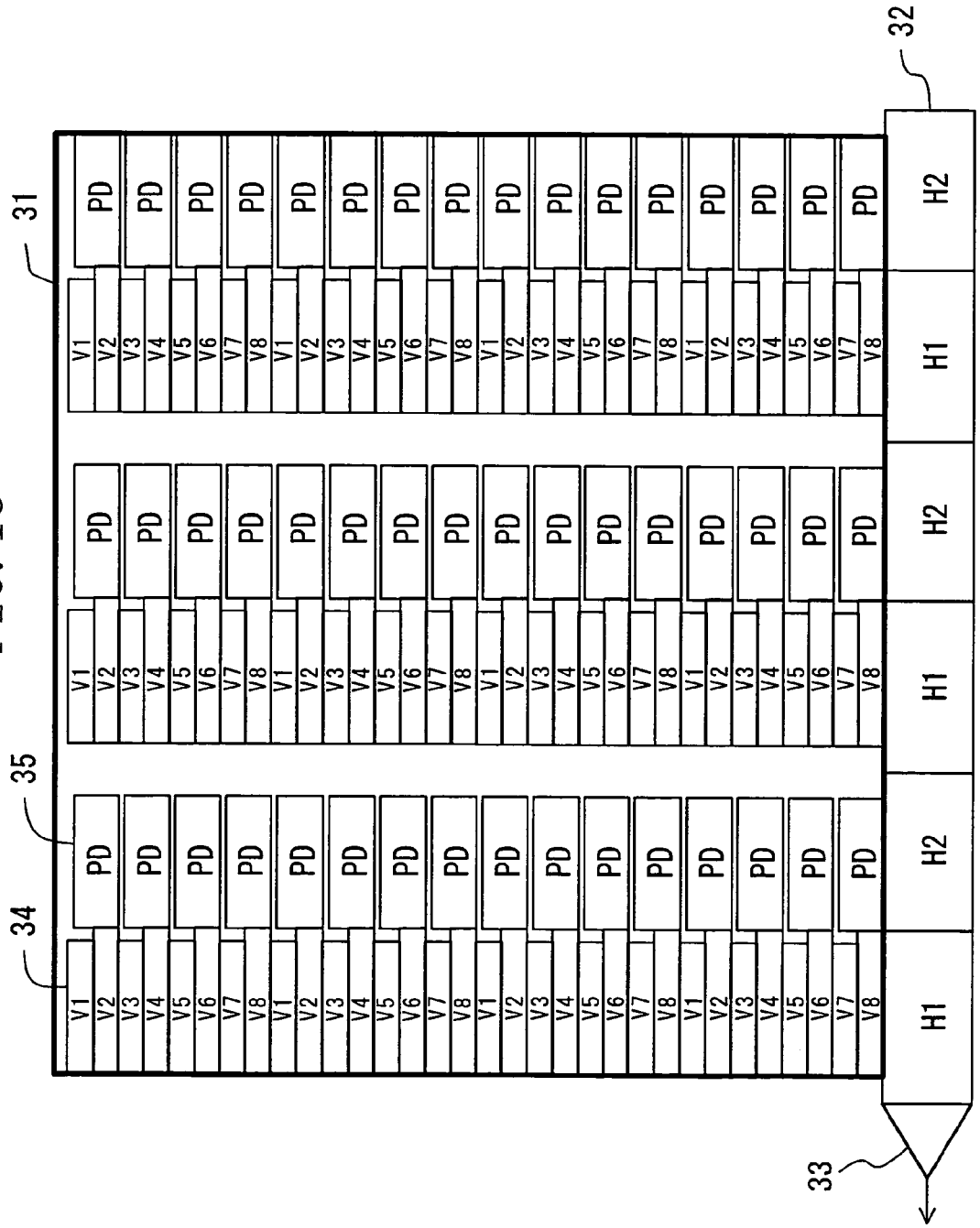
FIG. 18 is a plan view of a configuration of the CCD sensor of FIG. 17.

FIG. 18 is a plan view of a configuration of the CCD sensor 30 of FIG. 17. As shown in FIG. 18, the pixel section 31 of the CCD sensor 30 has photodiodes 35 as optoelectronic transducers for respective pixels. The CCD sensor 30 has vertical transfer sections 34 placed for the respective columns of pixels, and the photodiodes 35 are connected to the corresponding vertical transfer sections 34.

Each of the vertical transfer sections 34 has electrodes, two for each row of pixels, and any of drive pulses V1, V2, V3, V4, V5, V6, V7 and V8 is applied to each of the electrodes. The horizontal transfer section 32 has electrodes, two for each vertical transfer section 34 (that is, each column of pixels), and any of two-phase drive pulses H1 and H2 is applied to each electrode.

The control section 38 in FIG. 17 outputs the drive pulses V1 to V8 to the vertical transfer section 34 as a charge read signal and vertical transfer signals, and outputs the drive pulses H1 and H2 to the horizontal section 32 as horizontal transfer signals.

In FIG. 18, only a configuration of part of the pixel portion is shown for simplification. Actually, the vertical transfer sections 34 of the same number as the number of columns of photodiodes 35 are placed.

The operation of the CCD sensor 30 in the all pixel independent readout mode will be described. Readout from all pixels independently to obtain a still image is substantially the same as that performed with a normal interlaced scan CCD, which will therefore be described only briefly.

In the first field, the control section 38 applies high voltage (about 15 V) read pulses to the vertical transfer sections 34 as the drive pulses V2 and V6, to read charges from the photodiodes 35 into the vertical transfer sections 34. Subsequently, the control section 38 applies transfer pulses having a voltage lower than the read pulses to the vertical transfer sections 34 as the drive pulses V1 to V8, to transfer charges read from photodiodes 35 of one row in the pixel section 31 into the horizontal transfer section 32 simultaneously in each horizontal scanning period. The control section 38 also applies a clock of about 24.5 MHz to the horizontal transfer section 32 as the drive pulses H1 and H2, to transfer the charges transferred into the horizontal transfer section 32 in the forward direction. The charge detection section 33, receiving the charges transferred from the horizontal transfer section 32, converts the charges to signal voltages or signal currents to be output as imaging signals.

Likewise, in the next field, the control section 38 applies high voltage (about 15 V) read pulses to the vertical transfer sections 34 as the drive pulses V4 and V8, to read signal charges from the rows of pixels in which charges were left unread in the first field, and the signals are output from the charge detection section 33 in the same manner.

As described above, in readout of all pixels, the vertical transfer sections 34 read signal charges obtained by photoelectric conversion in the photodiodes 35 in the odd-numbered rows or the even-numbered rows every field, and transfer the read charges vertically toward the horizontal transfer section 32. The horizontal transfer section 32 transfers the signal charges transferred from the vertical transfer sections 34 sequentially in the horizontal direction to be output to the charge detection section 33. The frame rate of this readout is about 1/15 second, for example.

The operation of the CCD sensor 30 in the pixel mixture readout mode will be described. In this embodiment, the pixel mixture refers to accumulating charges from photodiodes of some pixels to obtain the sum of the charges. In the following description, assume that imaging signals obtained from the CCD sensor 30 are displayed on a monitor of the NTSC system.

Figure 19:
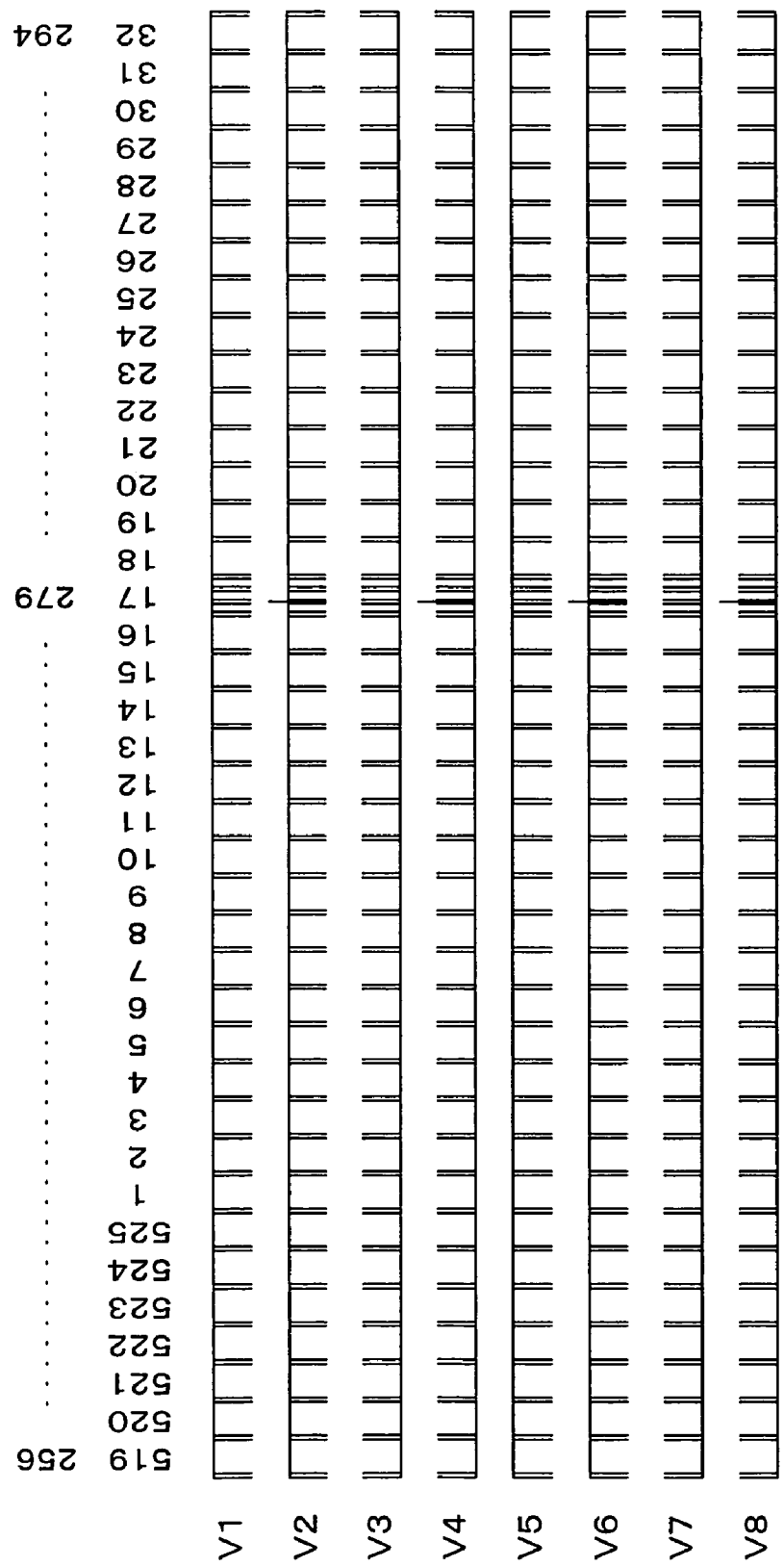
FIG. 19 is a timing chart of an example of drive pulses applied to vertical transfer sections in FIG. 18.

FIG. 19 is a timing chart of an example of the drive pulses V1 to V8 applied to the vertical transfer sections 34 in FIG. 18. The numbers shown in the upper part of FIG. 19 are serial numbers of the horizontal scanning periods in one frame in the NTSC system. The drive pulses V1 to V8 are signals applied to the electrodes of the vertical transfer sections 34.

Figure 20:
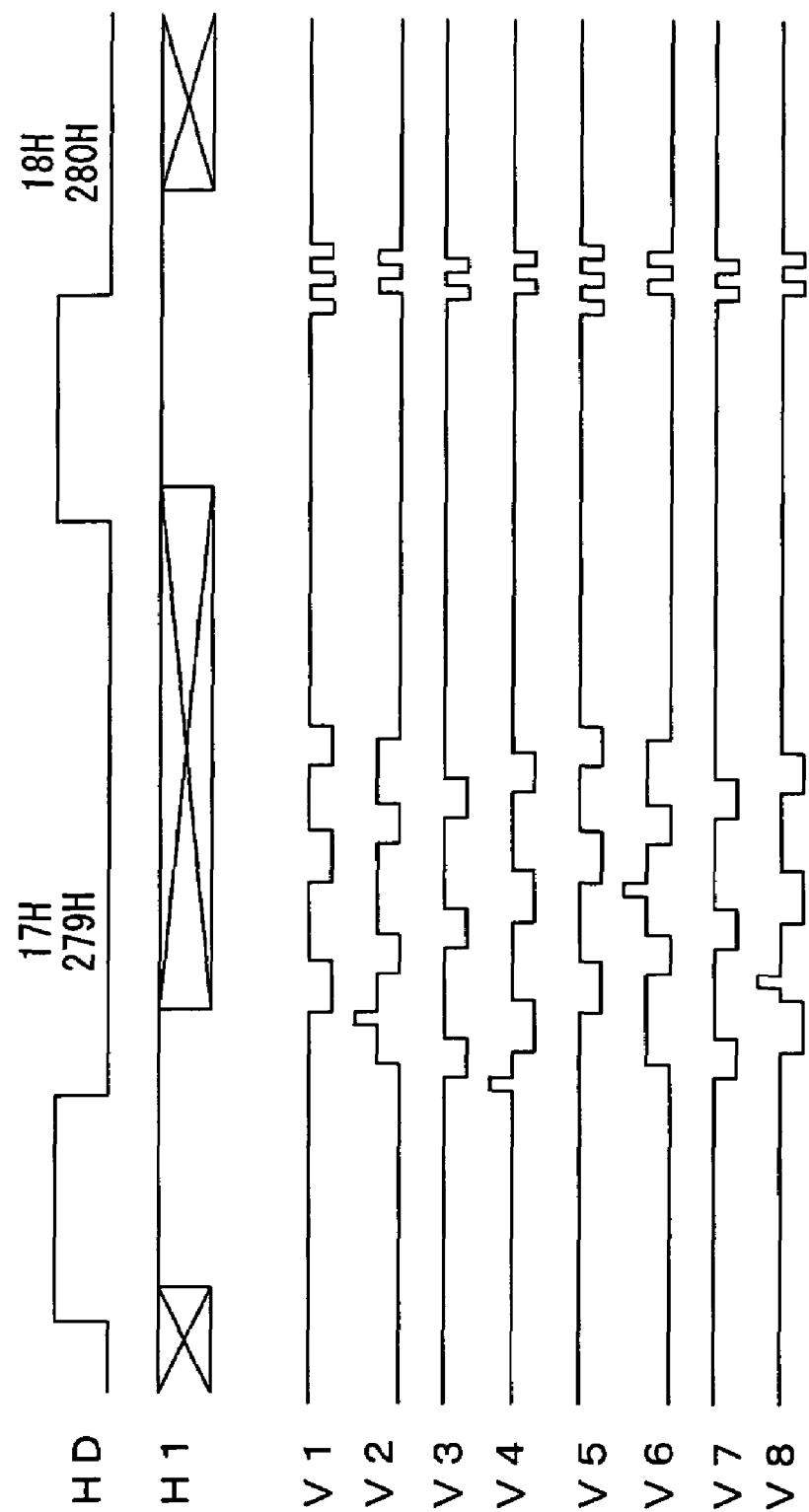
FIG. 20 is a partial enlarged timing chart of FIG. 19.

FIG. 20 is a partial enlarged timing chart of FIG. 19, showing the drive pulses V1 to V8 applied to the vertical transfer sections 34 by the control section 38 in the horizontal scanning periods 17H and 18H or 279H and 280H. FIG. 20 shows an example of the drive pulses. In reality, considering the fact that some read pulses can be applied simultaneously, it is possible to reduce the kind of drive pulses and shorten the time required for the readout.

Figure 21:
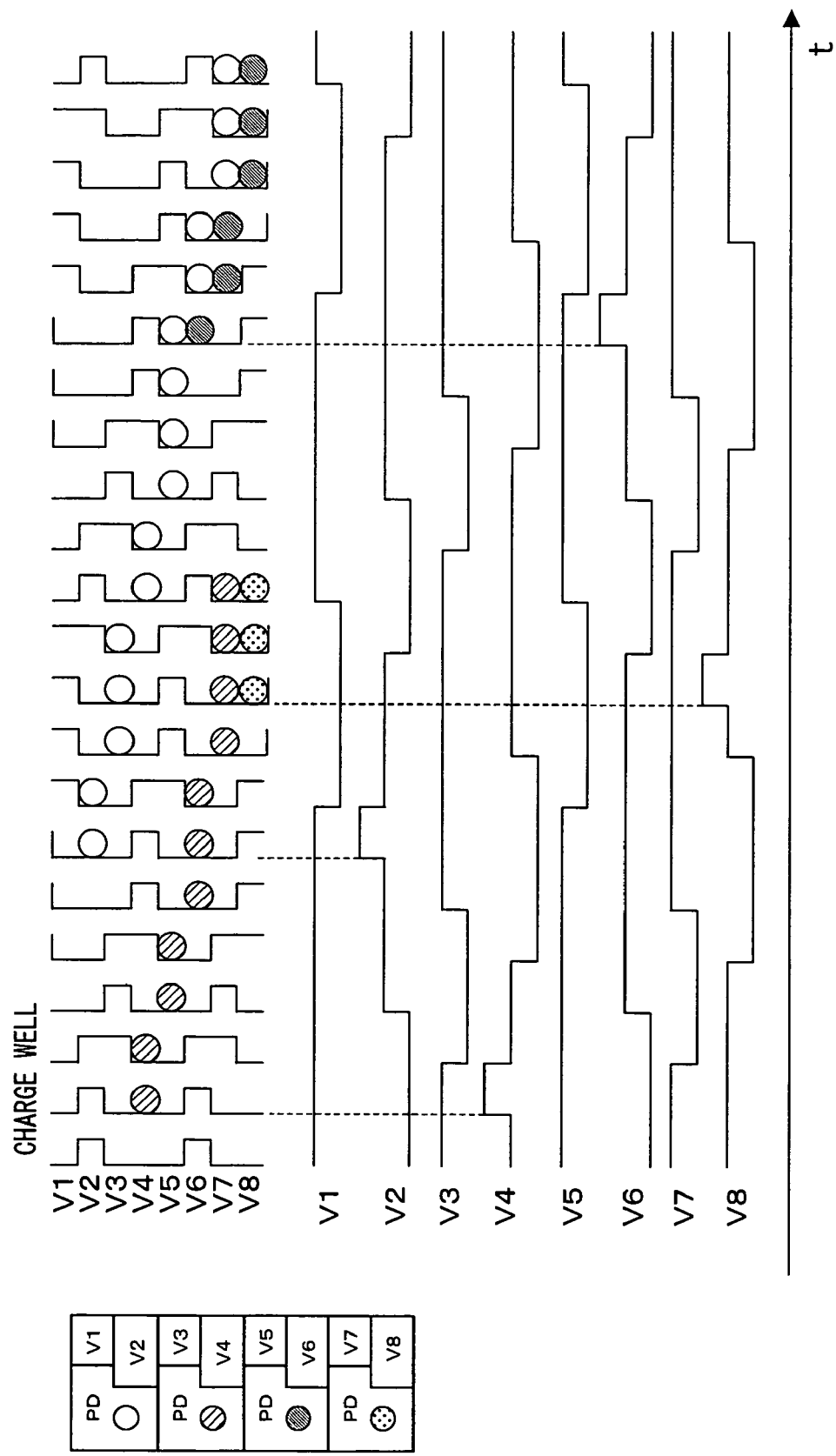
FIG. 21 is an illustration showing transfer of signal charges in a vertical transfer section in FIG. 18 observed when the drive pulses shown in FIG. 20 are used.
Figure 22:
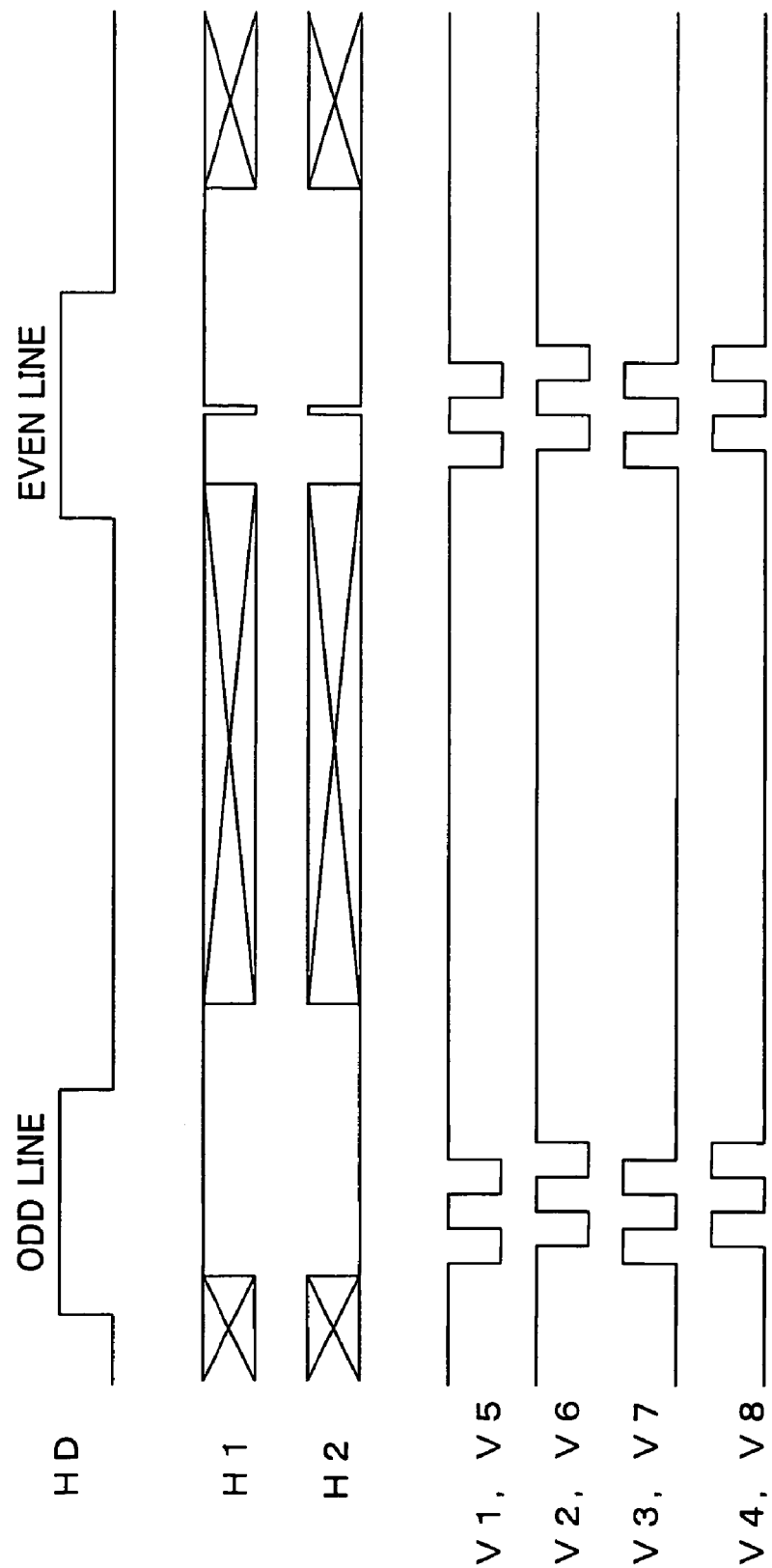
FIG. 22 is a partial enlarged timing chart of FIG. 19 showing periods other than those shown in FIG. 20.

FIG. 21 is an illustration showing transfer of signal charges in a vertical transfer section 34 observed when the drive pulses V1 to V8 shown in FIG. 20 are applied. FIG. 22 is a partial enlarged timing chart of FIG. 19 during periods other than those shown in FIG. 20.

First, the operation of the CCD sensor 30 in the odd fields will be described. As shown in FIGS. 19 and 20, the control section 38 applies a read pulse to the vertical transfer sections 34 as the drive pulse V4 in the horizontal scanning period 17H, to read charges from the photodiodes 35 connected to the electrodes to which the drive pulse V4 is applied into the vertical transfer sections 34. With this read, as shown in FIG. 21, each of the read charges stays in a charge well near the electrode to which the drive pulse V4 is applied.

Subsequently, the control section 38 changes the drive pulses V1 to V8, to allow the read charge to be transferred toward the horizontal transfer section 32 by four gates of the vertical transfer section 34, that is, two rows of photodiodes. As shown in FIG. 21, the read charge shifts to a charge well near the electrodes to which the drive pulses V7 and V8 are applied.

The control section 38 then applies a read pulse as the drive pulse V8, to read charges from the photodiodes 35 connected to the electrodes to which the drive pulse V8 is applied into the vertical transfer sections 34. With this read, each charge read with the drive pulse V4 is mixed with each charge read with the drive pulse V8.

During the transfer of the charges read with the drive pulse V4, the control section 38 applies a read pulse to the vertical transfer sections 34 as the drive pulse V2, to read charges from the photodiodes 35 connected to the electrodes to which the drive pulse V2 is applied into the vertical transfer sections 34. With this read, as shown in FIG. 21, each of the read charges stays in a charge well near the electrode to which the drive pulse V2 is applied.

Subsequently, the control section 38 changes the drive pulses V1 to V8, to allow the read charge to be transferred toward the horizontal transfer section 32 by four gates of the vertical transfer section 34, that is, two rows of photodiodes. As shown in FIG. 21, the read charge shifts to a charge well near the electrodes to which the drive pulses V5 and V6 are applied.

The control section 38 then applies a read pulse as the drive pulse V6, to read charges from the photodiodes 35 connected to the electrodes to which the drive pulse V8 is applied into the vertical transfer sections 34. With this read, each charge read with the drive pulse V2 is mixed with each charge read with the drive pulse V6.

In the horizontal scanning period 19H and the periods thereafter, as shown in FIG. 22, the control section 38 applies transfer pulses to the vertical transfer sections 34 as the drive pulses V1 to V8 two times each during each horizontal blanking interval. With this application, the vertical transfer sections 34 transfer charges read from the photodiodes 35 vertically toward the horizontal transfer section 32 by four rows in each horizontal scanning period.

In the even-numbered horizontal scanning periods, the control section 18 performs the transfer operation in the following manner. As shown in FIG. 22, in addition to the vertical transfer by four rows, the control section 38 applies the drive pulses H1 and H2 for forward transfer to the horizontal transfer section 32 at a time point between the first and second transfer pulses of the two-time transfer pulses applied to the vertical transfer sections 34 in each horizontal blanking interval. This causes transfer of charges in the horizontal transfer section 32 toward the charge detection section 33 by one stage.

As a result of the above operation, signal charges from pixels in the i-th row to (i+3)th row are output in each even-numbered scanning period. Specifically, at each stage of the horizontal transfer section 32, mixed are the charge read from the pixel in the i-th row and the k-th column, the charge read from the pixel in the (i+1)th row and the (k+1)th column, the charge read from the pixel in the (i+2)th row and the k-th column, and the charge read from the pixel in the (i+3)th row and the (k+1)th column. That is, the charges from the four pixels are mixed in a zigzag pattern as shown in FIG. 13.

In the odd-numbered horizontal scanning periods, the control section 38 performs the transfer operation in the following manner. As shown in FIG. 22, although the control section 38 performs the vertical transfer of charges by four rows as in the even-numbered horizontal scanning periods, the control section 38 applies no transfer pulse to the horizontal transfer section 32 between the two transfer pulses applied to the vertical transfer sections 34 in each horizontal blanking interval. Therefore, in this case, charges read from four pixels in the i-th to (i+3)th rows and the k-th column are mixed at each stage of the horizontal transfer section 32.

The mixed signal charges are sequentially transferred in the horizontal transfer section 32 in the horizontal effective period, to be output to the charge detection section 33. In this way, the horizontal transfer section 32 outputs signal charges read from pixels in four rows each sequentially starting from the side of the pixel section 31 closer to the horizontal transfer section 32.

Specifically, the horizontal transfer section 32 outputs signal charges read from four rows in the vertical dummy region 31E in the horizontal scanning period 17H, and then outputs signal charges read from a total of four rows, two rows in the optical black region 31C and two rows in the transient region 31B closer to the horizontal transfer section 32, in the horizontal scanning period 18H. The horizontal transfer section 32 further outputs signal charges read from a total of four rows, the remaining two rows in the transient region 31B and the first and second rows in the effective pixel region 31A counted from the side closer to the horizontal transfer section 32, in the horizontal scanning period 19H, and then outputs signal charges read from four rows, the third to sixth rows in the effective pixel region 31A counted from the side closer to the horizontal transfer section 32, in the horizontal scanning period 20H. In the horizontal scanning period 21H and the periods thereafter, signal charges from pixels in the seventh row and the rows thereafter are output by four rows in each horizontal scanning period.

The operation of the CCD sensor 30 in the even fields is the same as that in the odd fields described above except for the following points. The control section 38 applies the read pulses to the vertical transfer sections 34 in the horizontal scanning period 279H, instead of the horizontal scanning period 17H. Also, in the horizontal scanning period 280H, signal charges from only two rows in the vertical dummy region 31E are output.

In the horizontal scanning period 282H and the periods thereafter, the horizontal transfer section 32 outputs signal charges read from four rows to the charge detection section 33 in each horizontal scanning period. As a result, the combination of four rows of pixels from which signal charges are output in one horizontal scanning period is deviated by two rows between the odd fields and the even fields.

Specifically, the horizontal transfer section 32 outputs signal charges read from a total of four rows, the remaining two rows in the vertical dummy region 31E and two rows in the optical black region 31C, in the horizontal scanning period 281H, and then outputs signal charges read from four rows in the transient region 31B on the side closer to the horizontal transfer section 32 in the horizontal scanning period 282H. The horizontal transfer section 32 further outputs signal charges read from the first to fourth rows in the effective pixel region 31A counted from the side closer to the horizontal transfer section 32 in the horizontal scanning period 283H. In the horizontal scanning period 284H and the periods thereafter, signal charges from the fifth row and the rows thereafter are output by four rows in each horizontal scanning period.

Figure 23:
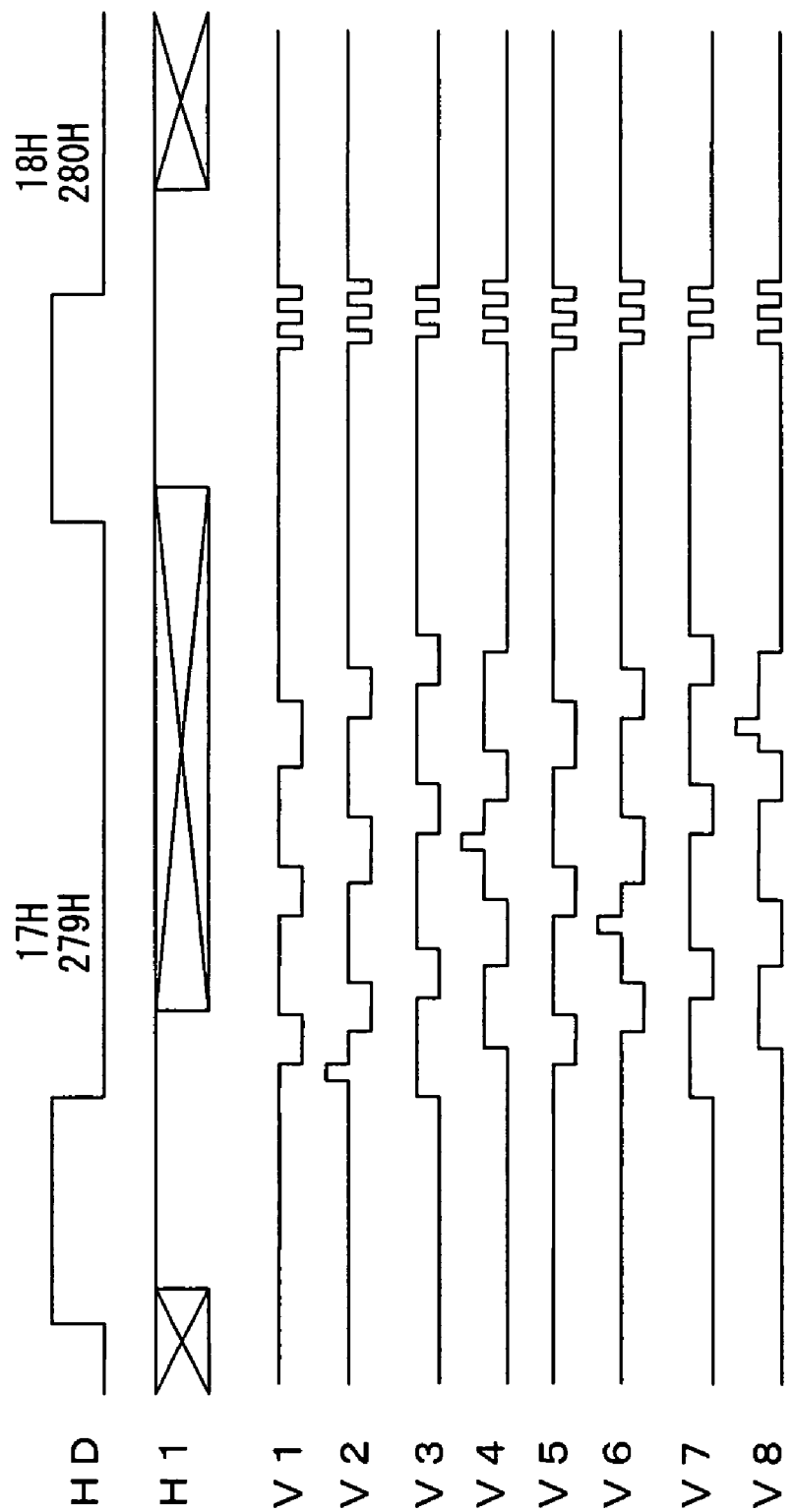
FIG. 23 is a timing chart of another example of drive pulses applied to the vertical transfer sections in FIG. 18.
Figure 24:
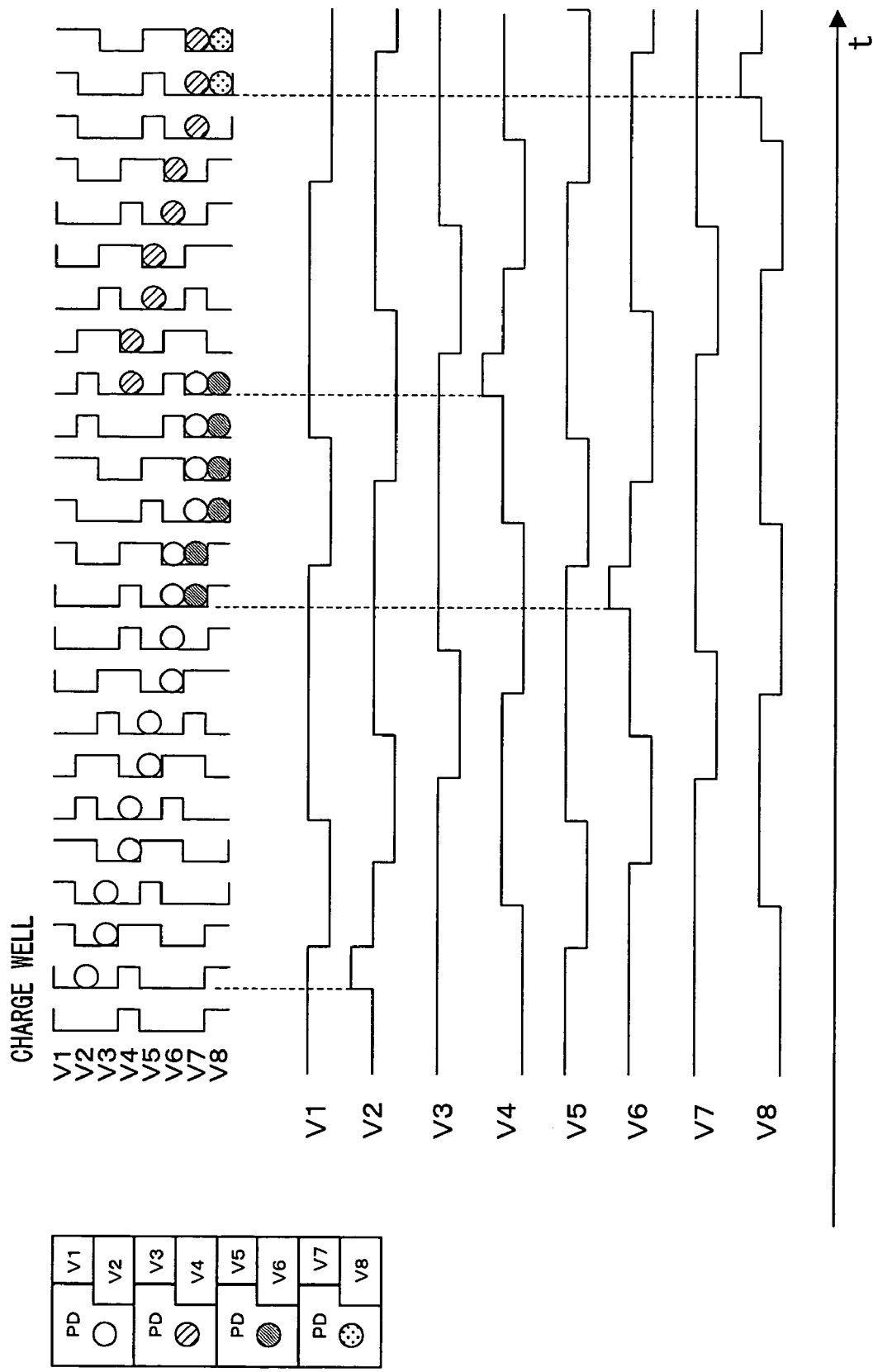
FIG. 24 is an illustration showing transfer of signal charges in a vertical transfer section in FIG. 18 observed when the drive pulses shown in FIG. 23 are used.

FIG. 23 is a timing chart of another example of the drive pulses V1 to V8 applied to the vertical transfer sections 34 in FIG. 18. FIG. 24 is an illustration showing transfer of signal charges in a vertical transfer section 34 in FIG. 18 observed when the drive pulses shown in FIG. 23 are applied. The charges accumulated in the photodiodes 35 may be read using the drive pulses V1 to V8 in FIG. 23 in place of the drive pulses V1 to V8 in FIG. 20.

Referring to FIG. 24, in the horizontal scanning period 17H, a read pulse is applied to the vertical transfer sections 34 as the drive pulse V2, to read charges from the photodiodes 35 connected to the electrodes to which the drive pulse V2 is applied into the vertical transfer sections 34. Thereafter, a read pulse is applied as the drive pulse V4.

As a result, charges from four pixels are mixed in a pattern horizontally inverted from the zigzag pattern shown in FIG. 13. Specifically, at each stage of the horizontal transfer section 32, mixed are the charge read from the pixel in the i-th row and the (k+1)th column, the charge read from the pixel in the (i+1)th row and the k-th column, the charge read from the pixel in the (i+2)th row and the (k+1)th column, and the charge read from the pixel in the (i+3)th row and the k-th column.

The operations for the odd fields and the even fields described above are repeated alternately, to thereby obtain 4-pixel mixed luminance signals in real time as interlaced signals of the NTSC system.

Figure 25:
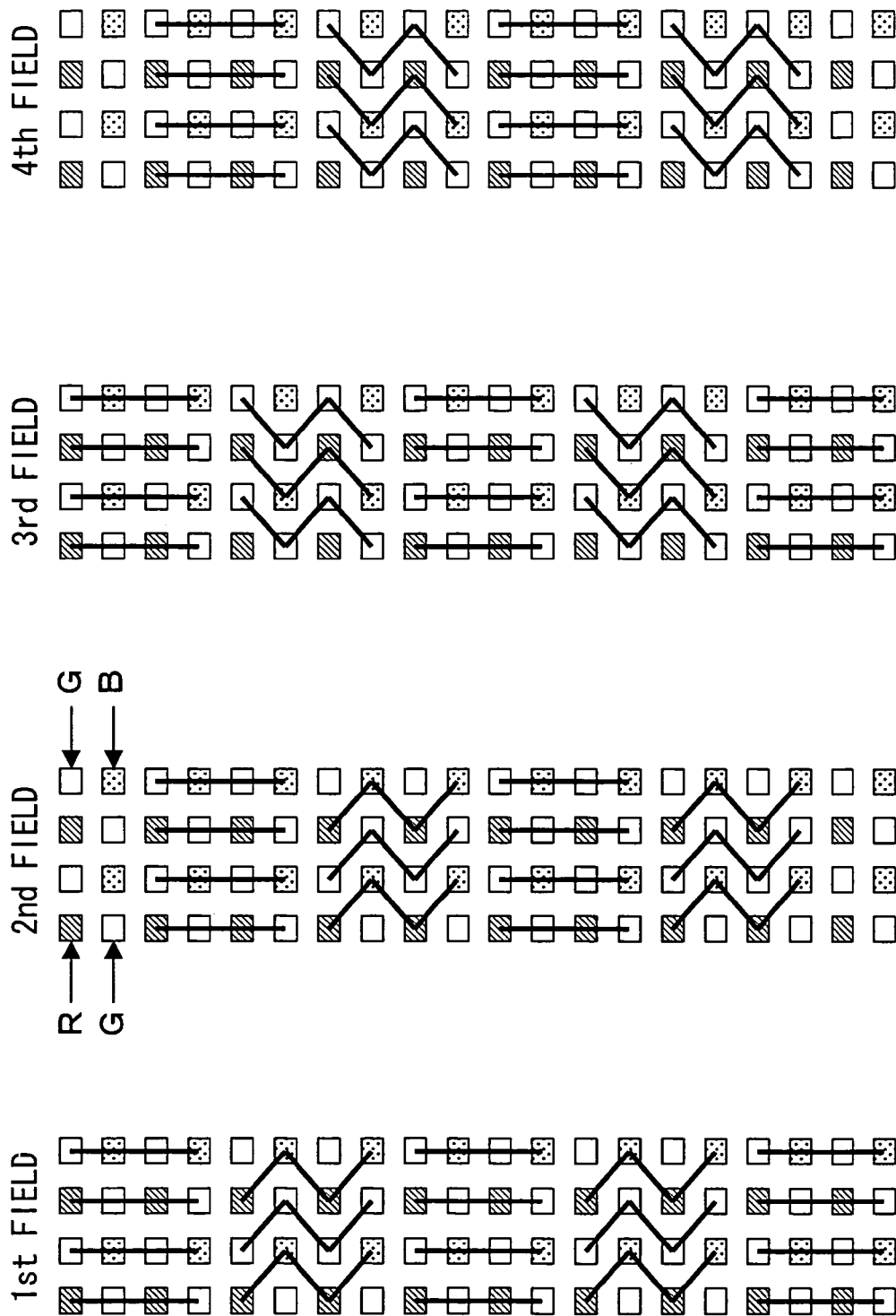
FIG. 25 is an illustration showing an example of change of the combination of pixels from which charges are mixed.
Figure 26:
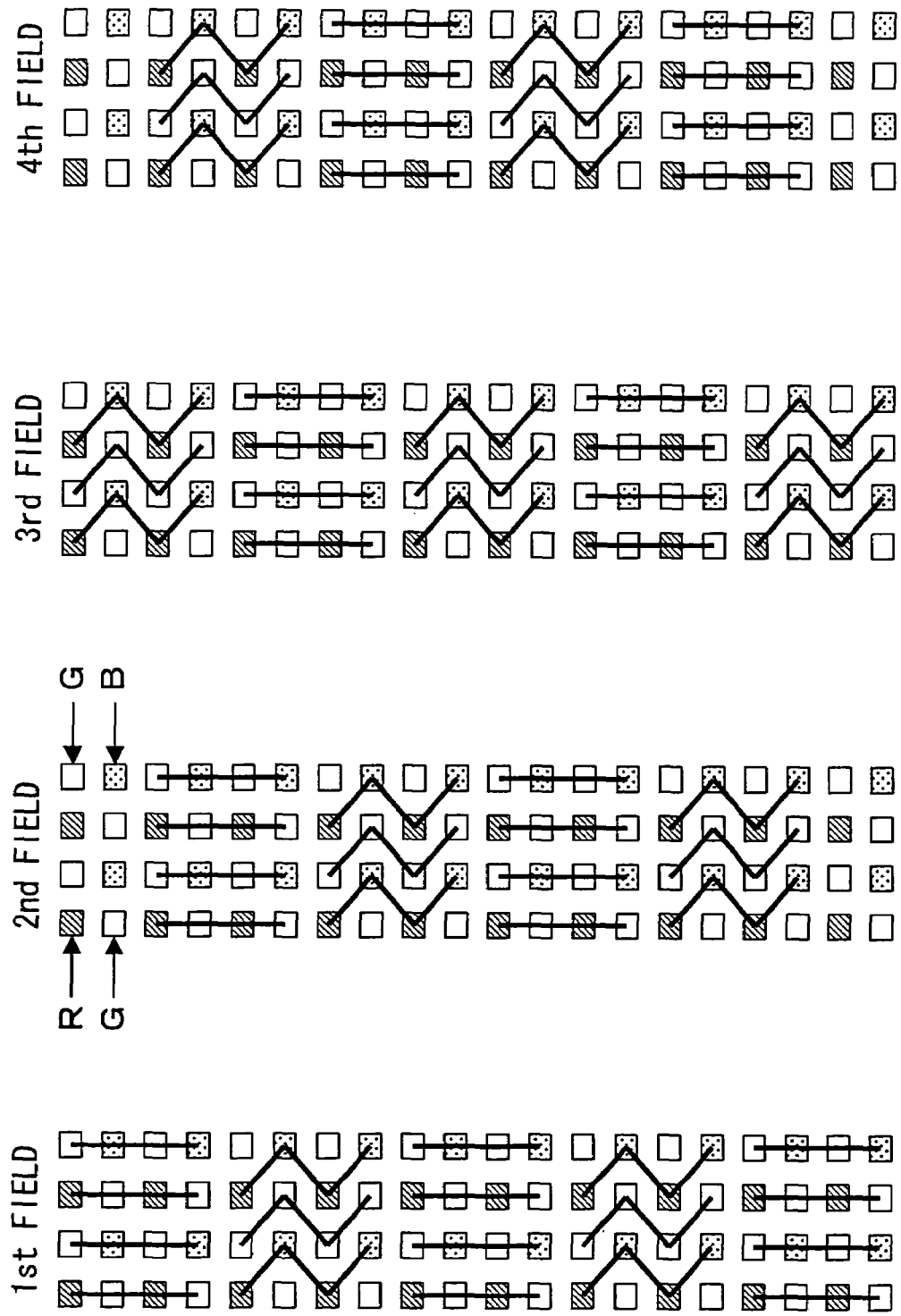
FIG. 26 is an illustration showing another example of change of the combination of pixels from which charges are mixed.

FIGS. 25 and 26 are illustrations showing an example of change of the combination of pixels from which charges are mixed. In the above description, the combination of pixels was changed depending on whether the field is an odd field or an even field. Alternatively, the combination of pixels may be changed depending on whether the field is any of four fields, the first, second, third or fourth field.

In FIG. 25, the zigzag pattern used in the third and fourth fields is the one horizontally inverted from the zigzag pattern in the first and second fields. To obtain this operation, the drive pulses V1 to V8 shown in FIG. 20 may be adopted in the first and second fields, while the drive pulses V1 to V8 shown in FIG. 23 may be adopted in the third and fourth fields. In FIG. 26, the zigzag pattern and the linear pattern in the first and second fields are exchanged with each other in the third and fourth fields.

The combination shown in FIG. 25 has a merit that a color pseudo-signal is less easily generated in a color CCD. The combination shown in FIG. 26 has a merit that the dynamic resolution enhances. Thus, the combination of pixels may be selected depending on the image characteristics on which importance is placed. Switching between these combinations is easy. That is, the direction and the number of times of horizontal transfer performed during the plurality of times of vertical transfer may be changed every field. This change of the combination of pixels every field can also be adopted in Embodiment 1.

The case that the CCD sensor 30 is a color CCD sensor having a color filter is substantially the same as that for the CCD sensor 10 of FIG. 1. The description thereof is therefore omitted here.

As described above, in this embodiment, the number of pixels in the vertical direction can be reduced without thinning the pixels also in the interlaced scan CCD.

The CCD sensor 30 of FIG. 17 may be used as the CCD sensor 116 of the digital still camera of FIG. 11.

The CCD sensor 30 may further include the address correction circuit of FIG. 15.

Embodiment 3

In Embodiment 3, a metal oxide semiconductor (MOS) sensor, in particular, a complementary MOS (CMOS) sensor will be described as a solid-state image pickup device.

Figure 27:
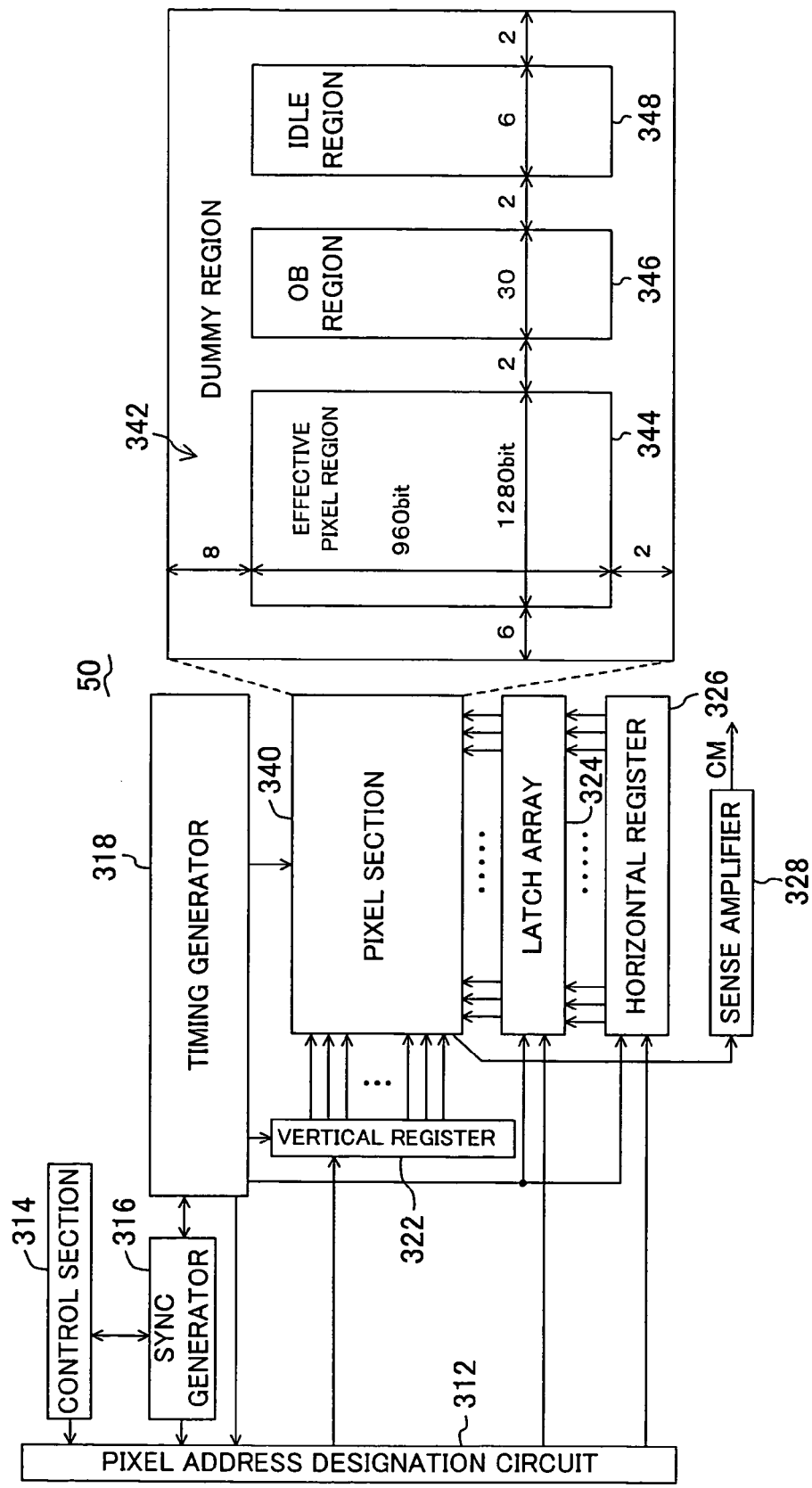
FIG. 27 is a block diagram of a configuration of a CMOS sensor of Embodiment 3 of the present invention.

FIG. 27 is a block diagram of a configuration of a CMOS sensor 50 of Embodiment 3 of the present invention. The CMOS sensor 50 of FIG. 27 includes a pixel address designation circuit 312, a control section 314, a sync generator 316, a timing generator 318, a vertical register (row address selection section) 322, a latch array 324, a horizontal register (column address selection section) 326, a sense amplifier 328 and a pixel section 340.

The pixel section 340 includes an effective pixel region 344, an optical black region 346 and an idle region 348. The effective pixel region 344 has photodiodes as optoelectronic transducers arranged in an array of 1280 (horizontal)×960 (vertical). One diode constitutes one pixel.

Figure 28:
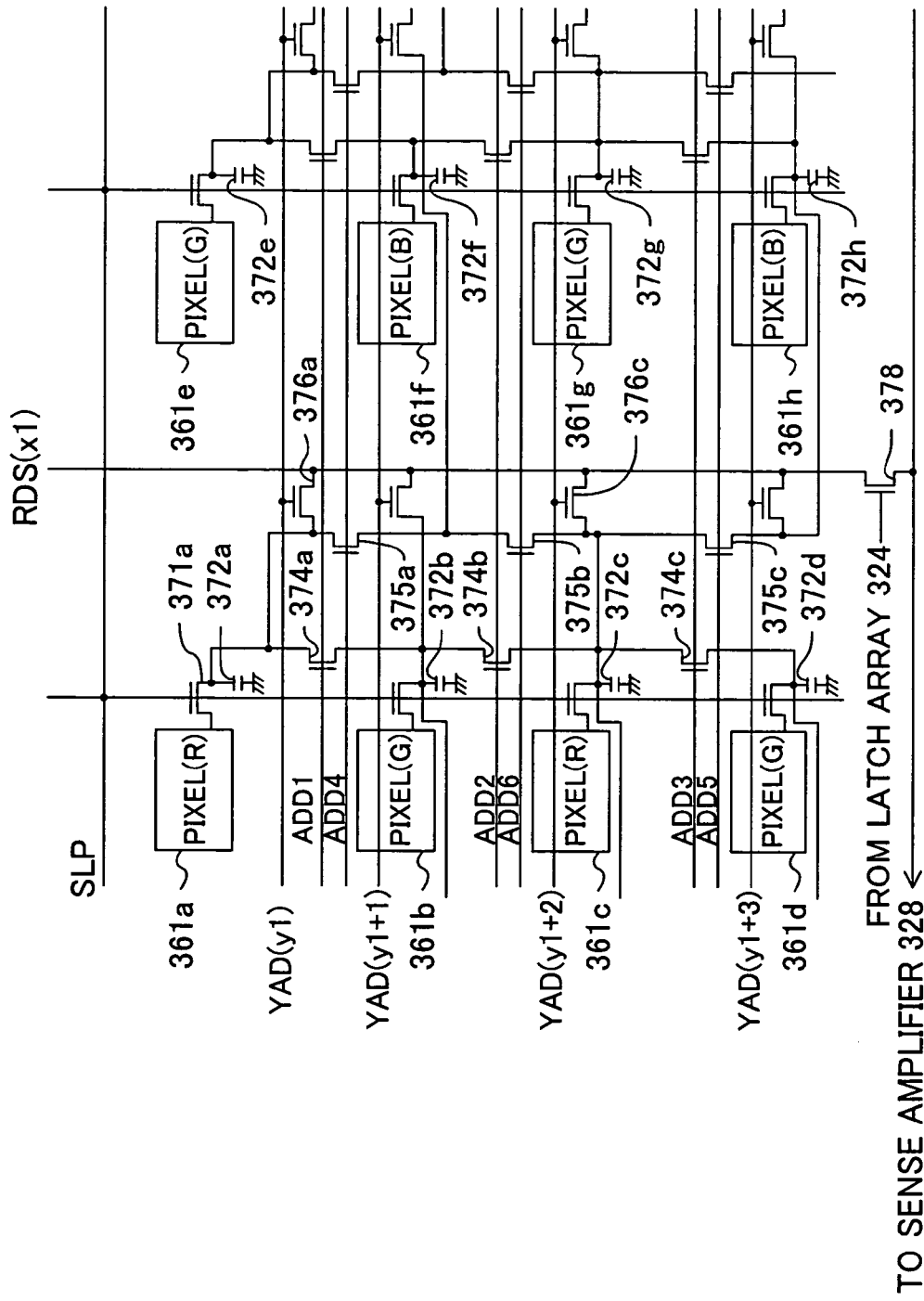
FIG. 28 is a circuit diagram showing a configuration of part of a pixel section in FIG. 27.

FIG. 28 is a circuit diagram showing part of the pixel section 340 in FIG. 27. Referring to FIG. 28, the pixel section 340 includes pixels 361a and 361c each having a red filter element, pixels 361*b*, 361*d*, 361*e* and 361*g* each having a green filter element, and pixels 361*f* and 361*h* each having a blue filter element. The portion of FIG. 28 is repeated vertically and laterally to constitute the pixel section 340.

Figure 29:
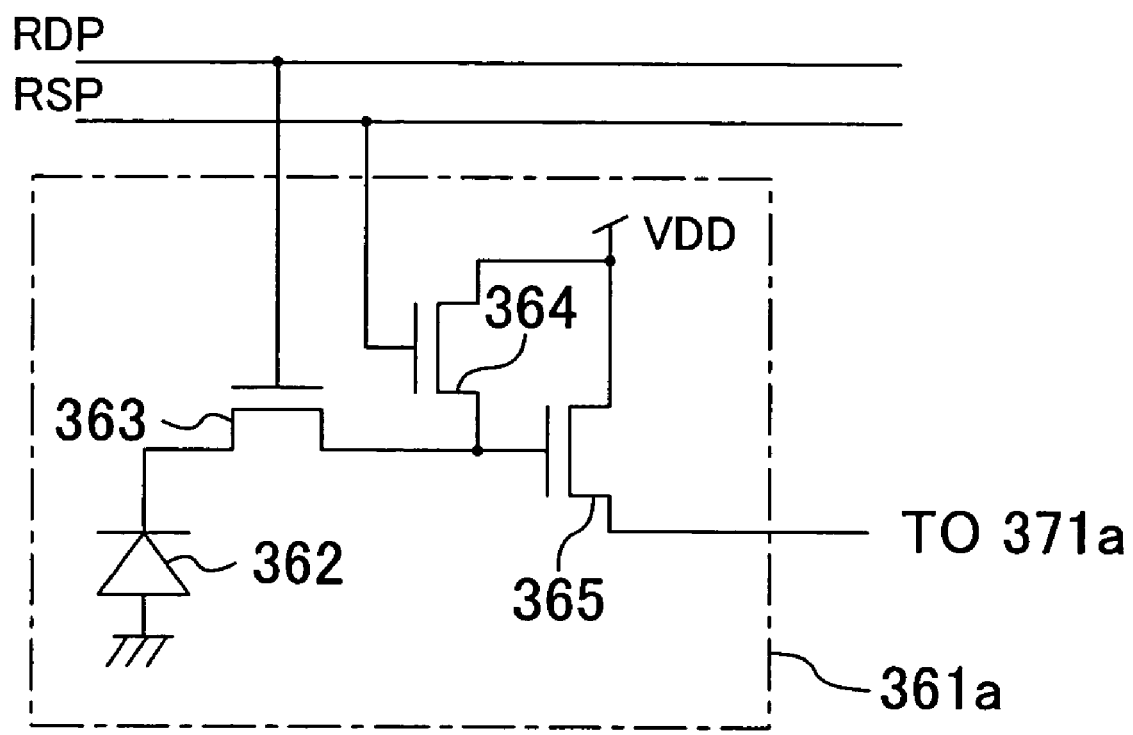
FIG. 29 is a circuit diagram showing the configuration of a pixel.

FIG. 29 is a circuit diagram of a configuration of the pixel 361*a* in FIG. 28. The pixel 361*a* includes a photodiode 362 and transistors 363, 364 and 365. The other pixels have substantially the same configuration. Note that in FIG. 28, lines for a reset pulse RSP and a read pulse RDP are omitted.

Figure 30A:
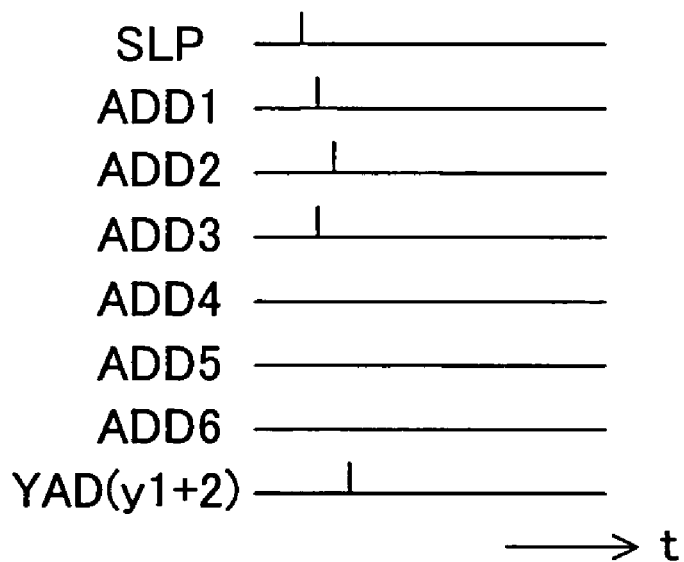
FIG. 30A is a graph showing signals applied to the pixel section in FIG. 27 when the average of outputs of pixels selected linearly is obtained.
Figure 30B:
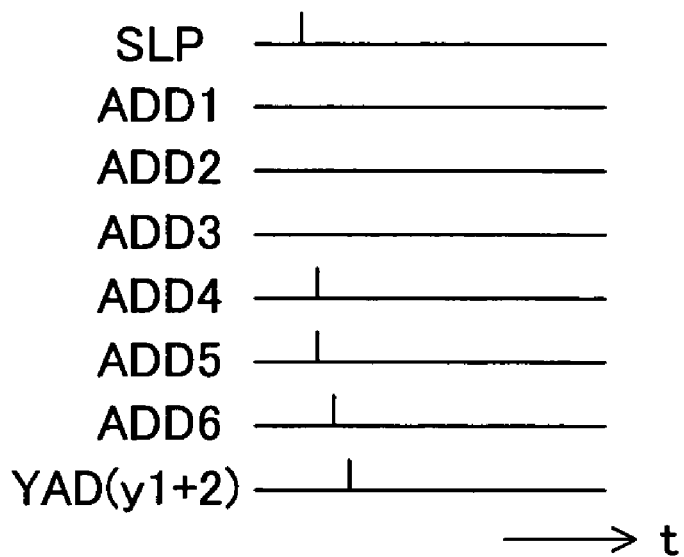
FIG. 30B is a graph showing signals applied to the pixel section in FIG. 27 when the average of outputs of pixels selected zigzag is obtained.

FIG. 30A is a graph showing signals applied to the pixel section 340 in FIG. 27 when the average of outputs of pixels selected linearly is obtained. FIG. 30B is a graph showing signals applied to the pixel section 340 in FIG. 27 when the average of outputs of pixels selected zigzag is obtained.

The operation of the CMOS sensor 50 in the case of all pixel independent readout will be described briefly, which is substantially the same as that of a normal CMOS sensor.

First, the timing generator 318 applies the reset pulse RSP to the gate of the transistor 364 of each pixel, to reset the pixel. Once the photodiode 362 receives light and a predetermined time passes after the light reception, the timing generator 318 applies the read pulse RDP to the gate of the transistor 363 and also applies a pixel selection pulse SLP to the gate of a transistor 371*a* and the like. With this application of the signals, a charge corresponding to the amount of light received by the photodiode of each pixel is stored in a capacitor 372*a* or the like corresponding to the pixel.

The pixel address designation circuit 312 outputs a row address to the vertical register 322 to designate the read start position. The vertical register 322 activates a row address selection signal YAD(y1) corresponding to the designated row address. The pixel address designation circuit 312 outputs a column address to the horizontal register 326 to designate the read start position. The horizontal register 326 activates a transistor 378 corresponding to the designated column address via the latch array 324, to select a read signal RDS(x1) corresponding to the column address, and outputs the read signal to the sense amplifier 328. The sense amplifier 328 amplifies the input signal to a level required, and outputs the resultant signal CM.

The timing generator 318 applies a timing signal to the horizontal register 326, to allow the horizontal register 326 to select read signals from different columns sequentially to complete readout of the read signals from all the columns. Once readout from pixels of one row is completed, the timing generator 318 makes the pixel address designation circuit 312 activate a row address selection signal YAD(y1+1) corresponding to the next row address. The above operation is repeated thereafter to complete readout of signals from the pixels of one screen.

Hereinafter, the operation in the case of pixel mixture readout will be described. In this embodiment, the pixel mixture refers to obtaining a signal representing the average of outputs of photodiodes of some pixels as a signal corresponding to the sum of the outputs. First, the operation in the odd-numbered horizontal scanning periods in the odd fields will be described with reference to FIG. 30B. The operation is the same as that in the all pixel independent readout described above until the timing generator 318 applies the read pulse RDP to the gate of the transistor 363 and also applies the image selection pulse SLP to the gate of the transistor 371*a* and the like.

Thereafter, the timing generator 318 applies an addition pulse ADD4 to the gate of a transistor 375*a*. This makes the potential of the capacitor 372*a* equal to the potential of a capacitor 372*f*. In other words, a potential corresponding to the average of the outputs of the pixel 361*a* and the pixel 361*f* is obtained.

Roughly simultaneously with the above application, the timing generator 318 applies an addition pulse ADD5 to the gate of a transistor 375*c*. In this case, also, a potential corresponding to the average of the outputs of the pixel 361*c* and the pixel 361*h* is obtained at a capacitor 372*c* and a capacitor 372*h*.

The timing generator 318 then applies an addition pulse ADD 6 to the gate of a transistor 375*b*. This makes the potential of the capacitor 372*c* and the potential of the capacitor 372*f* equal to each other. In this way, a potential corresponding to the average of the outputs of the pixels 361*a*, 361*f*, 361*c* and 361*h* is obtained.

The pixel address designation circuit 312 outputs a row address y1+2 to the vertical resister 322. The vertical resister 322 activates a row address selection signal YAD(y1+2) corresponding to this row address, to cause the potential of the capacitor 372*c* to be read to a read signal line as the read signal RDS(x1).

The pixel address designation circuit 312 outputs a column address to the horizontal register 326 to designate the read start position. The horizontal register 326 activates the transistor 378 corresponding to the designated column address via the latch array 324, to select the read signal RDS(x1) corresponding to the column address, and outputs the read signal to the sense amplifier 328. The sense amplifier 328 amplifies the input signal to a level required, and outputs the resultant signal CM.

The timing generator 318 applies a timing signal to the horizontal register 326, to allow the horizontal register 326 to select read signals from different columns sequentially to complete readout of the read signals from all the columns.

In the even-numbered horizontal scanning periods, readout for four rows located next to the portion shown in FIG. 28, for example, is performed. Since the configuration is substantially the same as that shown in FIG. 28, description will be made with reference to FIG. 28, together with FIG. 30A.

The operation is the same as that in the all pixel independent readout until the timing generator 318 applies the read pulse RDP to the gate of the transistor 363 and also applies the image selection pulse SLP to the gate of the transistor 371*a* and the like.

Thereafter, the timing generator 318 applies an addition pulse ADD1 to the gate of a transistor 374*a*. This makes the potential of the capacitor 372*a* equal to the potential of a capacitor 372*b*. In other words, a potential corresponding to the average of the outputs of the pixel 361*a* and the pixel 361*b* is obtained.

Roughly simultaneously with the above application, the timing generator 318 applies an addition pulse ADD3 to the gate of a transistor 374*c*. In this case, also, a potential corresponding to the average of the outputs of the pixel 361*c* and the pixel 361*d* is obtained at the capacitors 372*c* and 372*d*.

The timing generator 318 then applies an addition pulse ADD 2 to the gate of a transistor 374*b*. This makes the potential of the capacitor 372*b* and the potential of the capacitor 372*c* equal to each other. In this way, a potential corresponding to the average of the outputs of the pixels 361*a*, 361*b*, 361*c* and 361*d* is obtained.

The subsequent operation is substantially the same as that in the odd-numbered horizontal scanning periods, except that the pixel address designation circuit 312 outputs row addresses larger in number by four than those in the odd-numbered horizontal scanning periods.

In the odd fields, the combination of four rows related to the signal output in one horizontal scanning period is deviated by two rows from that in the odd fields.

As described above, the CMOS sensor 50 obtains either a signal corresponding to the sum of outputs from four pixels in the i-th row and the k-th column, in the (i+1)th row and the (k+1)th column, in the (i+2)th row and the k-th column, and in the (i+3)th row and the (k+1)th column selected zigzag, or a signal corresponding to the sum of outputs from four pixels in the i-th to (i+3)th rows and the k-th column selected linearly, every continuous four rows, depending on whether the horizontal blanking interval is odd-numbered or even-numbered.

A Bayer color filter may be provided for the pixel section 340. In this case, the CMOS sensor 50 outputs the separated primary colors R, G, B as they are during the all color independent readout, and outputs the complementary signals MG, CY, YE and G obtained by mixing the primary color signals during the pixel mixture readout.

As described above, in the CMOS sensor 50, the pixel mixture readout can achieve a high frame update rate because a plurality of pixels are read simultaneously, although being inferior in resolution to the all pixel independent readout. Therefore, the MOS sensor 50 may be used in place of the CCD 116 in the digital still camera shown in FIG. 11. In this case, as in the case of using the CCD, the pixel mixture readout can be adopted during monitoring, while the all pixel independent readout is adopted during taking a still image. Thus, a highly practical system is realized.

In Embodiments 1 to 3, a 4-pixel mixed signal was obtained every four continuous rows. Alternatively, for two or larger even number of continuous rows, signals may be obtained by mixing pixels of this even number. A specific example of this will be described in Embodiment 4 to follow.

Embodiment 4

In Embodiment 4, a progressive scan CCD sensor is used as a solid-state image pickup device, and signals are obtained by mixing two continuous pixels each.

FIG. 31 is an illustration showing a configuration of a CCD sensor 70 of Embodiment 4 of the present invention. The CCD sensor 70 of FIG. 31 includes a pixel section 71, a horizontal transfer section 72, a charge detection section 73, vertical transfer sections (not shown in FIG. 31) and a control section 78. The pixel section 71 includes an effective pixel region 71A, a transient region 71B, an optical black region 71C and vertical dummy regions 71D and 71E.

The CCD sensor 70 has substantially the same configuration as the CCD sensor 10 described in Embodiment 1, except that in the CCD sensor 70, the effective pixel region 71A has photodiodes as optoelectronic transducers arranged in an array of 640 (horizontal)×480 (vertical). The other regions are substantially the same as the counterparts of the CCD sensor 10 although the number of pixels is different, and the horizontal transfer section 72 and the charge detection section 73 are roughly the same as those described in Embodiment 1. The description of these regions and sections are therefore omitted here.

In Embodiment 4, the way of mixing pixels and the timing of the drive pulses are different from those in Embodiment 1. Except for these points, the operation is substantially the same as that described in Embodiment 1. As will be described later, the way of mixing pixels in this embodiment is especially effective for a CCD sensor having a comparatively small effective pixel region.

Like the CCD sensor 10 of Embodiment 1, the CCD sensor 70 has the all pixel independent readout mode and the pixel mixture readout mode. Hereinafter, the operation of the CCD sensor 70 in the pixel mixture readout mode will be described. Assume that imaging signals obtained from the CCD sensor 70 are displayed on a monitor of the NTSC system.

Figure 32:
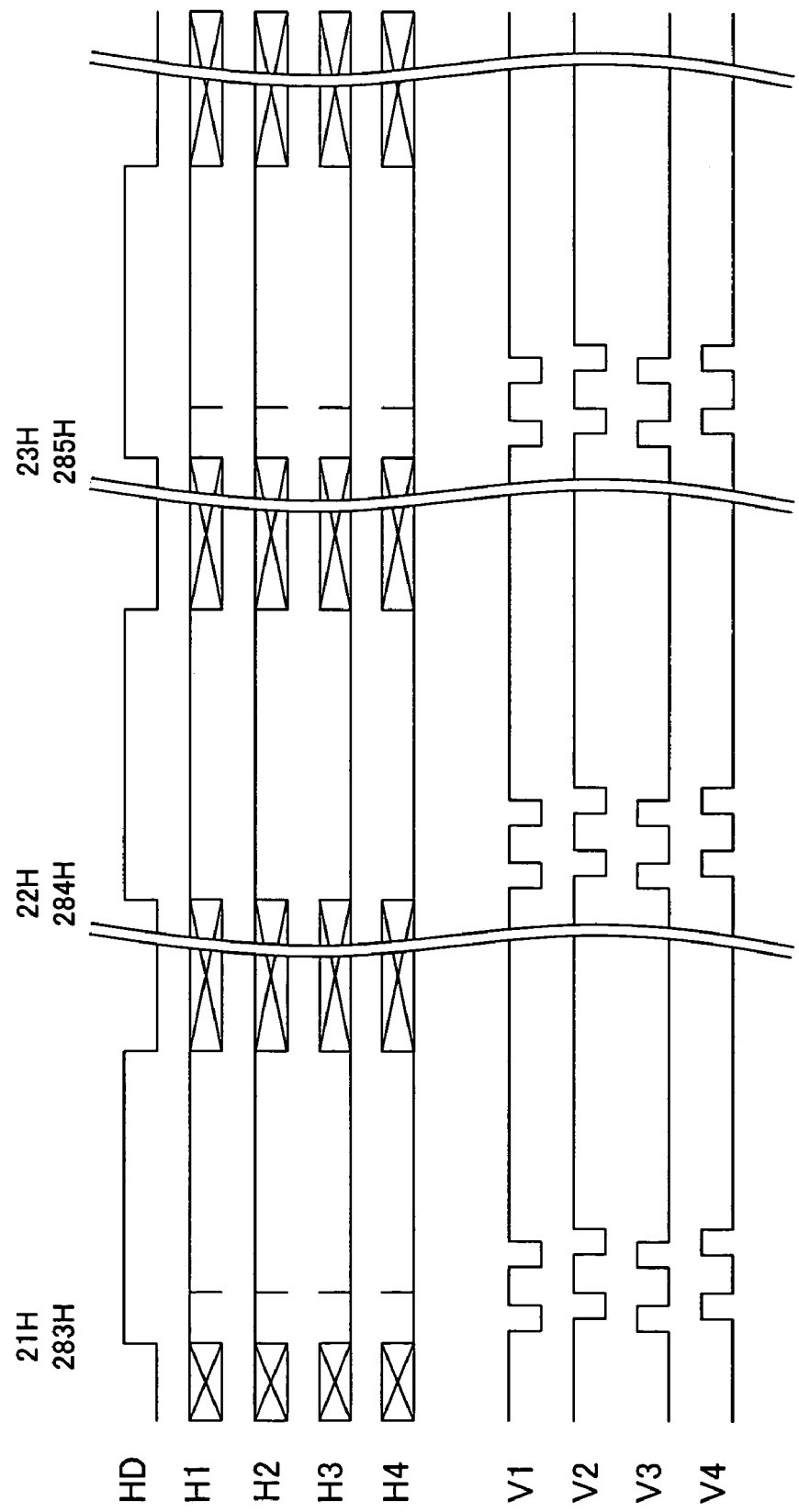
FIG. 32 is a detailed timing chart of signals applied to the CCD sensor of FIG. 31.

The timings of signals in the odd and even fields of the CCD sensor 70 of FIG. 31 are roughly the same as those shown in FIGS. 6 and 7, respectively. FIG. 32 is a detailed timing chart of signals used in the CCD sensor 70 of FIG. 31, showing drive pulses H1 to H4 applied to the horizontal transfer section 72 and drive pulses V1 to V4 applied to the vertical transfer sections in the horizontal scanning periods 21H to 23H or 283H to 285H.

Figure 33:
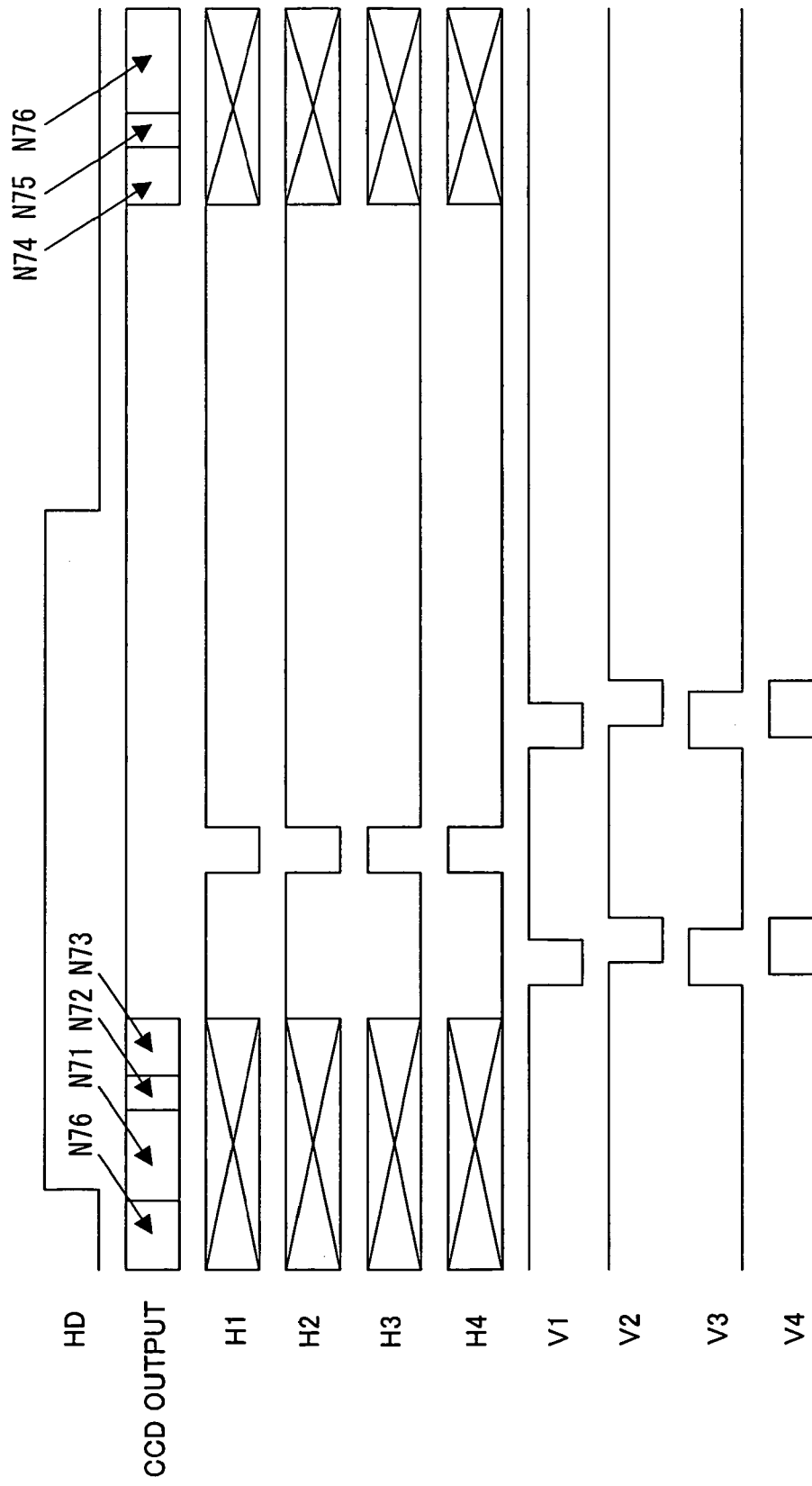
FIG. 33 is a timing chart showing the waveforms of signals in an odd-numbered horizontal scanning period in FIG. 32.
Figure 34:
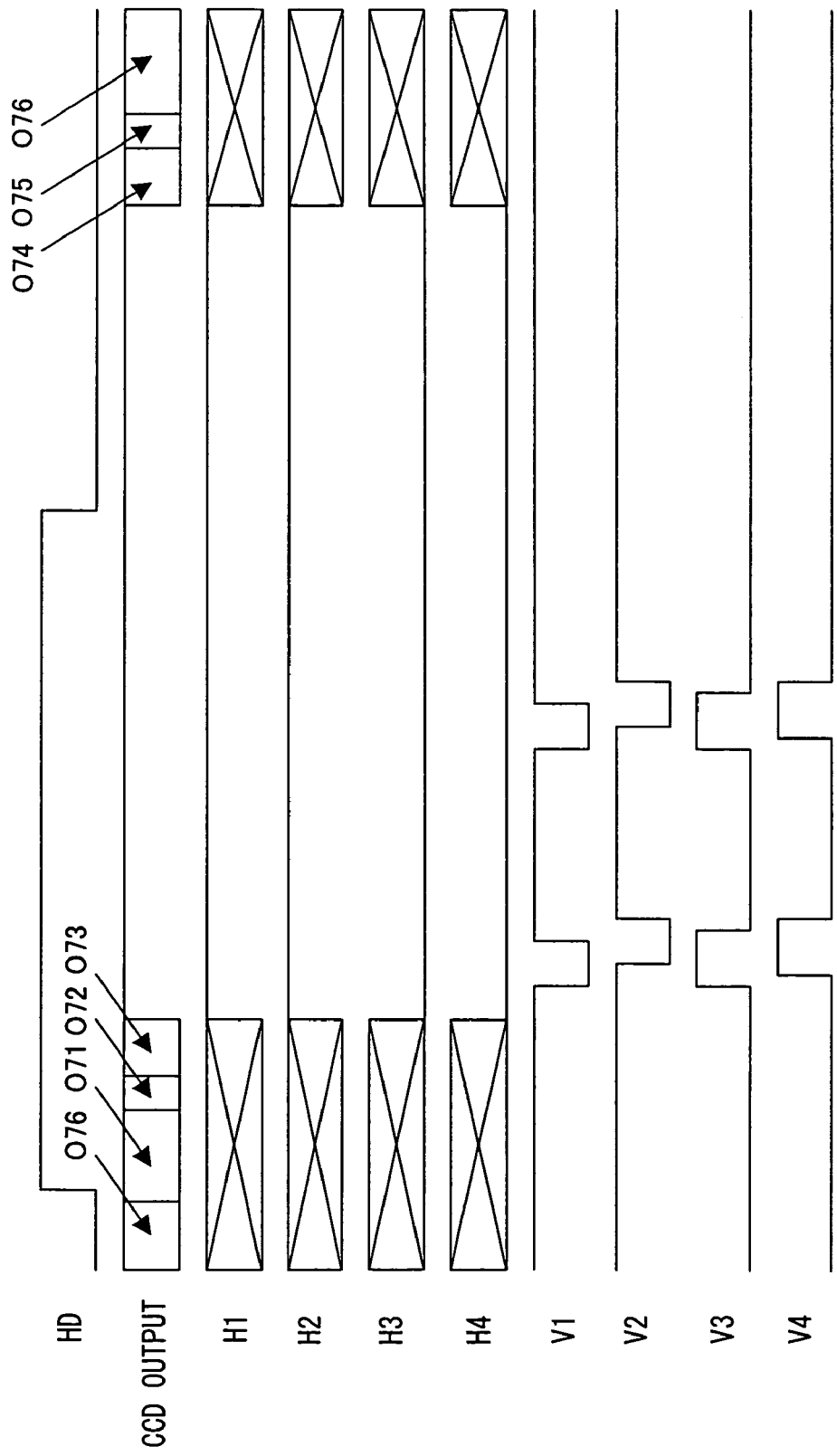
FIG. 34 is a timing chart showing the waveforms of signals in an even-numbered horizontal scanning period in FIG. 32.

FIG. 33 is a timing chart showing the waveforms of the signals in an odd-numbered horizontal scanning period in FIG. 32. FIG. 34 is a timing chart showing the waveforms of the signals in the even-numbered horizontal scanning period in FIG. 32. FIGS. 33 and 34 also show a signal output from the charge detection section 73 as the CCD output.

The operation of the CCD sensor 70 in the odd fields will be described. As shown in FIG. 6, the control section 78 applies a read pulse to the vertical transfer sections as the drive pulse V1 in the horizontal scanning period 18H. With application of the read pulse, charges are read from all photodiodes into the vertical transfer sections. In the next horizontal scanning period 19H and the periods thereafter, the control section 78 applies transfer pulses (vertical transfer signals) to the vertical transfer sections as the drive pulses V1 to V4 two times each during each horizontal blanking interval (horizontal retrace blanking interval) as shown in FIG. 32. With application of these transfer pulses, the charges read from the photodiodes are transferred vertically toward the horizontal transfer section 72 by two rows in each horizontal scanning period.

In the odd-numbered horizontal scanning periods, the control section 78 performs the transfer operation in the following manner. As shown in FIG. 33, in addition to the vertical transfer by two rows, the control section 78 applies the drive pulses H1 to H4 for forward transfer to the horizontal transfer section 72 at a time point between the first and second transfer pulses applied to the vertical transfer sections in each horizontal blanking interval. This causes transfer of signal charges in the horizontal transfer section 72 toward the charge detection section 73 by one stage (that is, by one column).

The above operation results in mixing of the charge read from the pixel in the i-th row and the k-th column and the charge read from the pixel in the (i+1)th row and the (k+1)th column at each stage of the horizontal transfer section 72. That is, charges from two photodiodes selected obliquely are added. The mixed signal charges are sequentially transferred in the horizontal transfer section 72 during the effective period other than the horizontal blanking interval of each horizontal scanning period, to be output to the charge detection section 73.

In FIG. 33, an output N76 represents a signal obtained from signal charges of a total of 648 bits, that is, eight bits in the transient region 71B and 640 bits read from the photodiodes of the 640 columns in the effective pixel region 71A. Outputs N71, N72, N73, N74 and N75 respectively represent signals as those described above in relation to the outputs N1 to N5 in FIG. 9.

As described above, the CCD sensor 70 adds signal charges read from pixels in two rows each sequentially starting from the side of the pixel section 71 closer to the horizontal transfer section 72, and outputs the added charges as the CCD output in the horizontal scanning periods subsequent to the horizontal scanning period 18H in which the read pulse is applied.

Specifically, the CCD sensor 70 outputs signal charges read from two rows in the vertical dummy region 71E closer to the horizontal transfer section 72 in the horizontal scanning period 19H, and then outputs signal charges read from two rows each sequentially in the subsequent horizontal scanning periods. In the effective pixel region 71A, the CCD sensor 70 outputs signal charges read from two rows each starting from the row closest to the horizontal transfer section 72.

In the even-numbered horizontal scanning periods, the control section 78 performs the transfer operation in the following manner. As shown in FIG. 34, although the control section 78 performs the vertical transfer by two rows as in the odd-numbered horizontal scanning periods, the control section 78 does not apply the drive pulses H1 to H4 for forward or backward transfer to the horizontal transfer section 72 during the application of the two-time transfer pulses to the vertical transfer sections in each horizontal blanking interval. Therefore, no forward or backward horizontal transfer of charges is made in the horizontal transfer section 72.

Accordingly, at each stage of the horizontal transfer section 72, charges read from two pixels in the i-th and (i+1)th rows and the k-th column are mixed or added. The mixed signal charges are sequentially transferred in the horizontal transfer section 72 in the horizontal effective period, to be output to the charge detection section 73.

As described above, the control section 78 outputs the drive pulses V1 to V4 and H1 to H4 so as to obtain either a signal corresponding to the sum of charges read from two pixels in the i-th row and the k-th column and in the (i+1)th row and the (k+1)th column selected obliquely, or a signal corresponding to the sum of charges read from two pixels in the i-th and (i+1)th rows and the k-th column selected linearly in the vertical direction, every two continuous rows, depending on whether the horizontal blanking interval is odd-numbered or even-numbered.

The operation of the CCD sensor 70 in the even fields will be described. As shown in FIG. 7, by applying a read pulse to the vertical transfer sections as the drive pulse V1 in the horizontal scanning period 280H, charges are read from all photodiodes into the vertical transfer sections. In the next horizontal scanning period 281H, transfer pulses are applied to the vertical transfer sections as the drive pulses V1 to V4 one time each during the horizontal blanking interval. With this application, charges read from the photodiodes in one row are transferred vertically toward the horizontal transfer section 72.

The operation of the CCD sensor 70 in the next horizontal scanning period 282H and the periods thereafter is substantially the same as that in the case of the odd fields in both the odd-numbered and even-numbered horizontal scanning periods. Outputs O71, O72, O73, O74, O75 and O76 in FIG. 34 respectively represent signals as those represented by the outputs N71 to N76 in FIG. 33.

In the even fields, the horizontal transfer section 72 outputs signal charges read from only one row in the vertical dummy region 71E to the charge detection section 73 in the horizontal scanning period 281H, the period next to the horizontal scanning period 280H in which the read pulse is applied. In the horizontal scanning period 282H and the periods thereafter, the horizontal transfer section 72 outputs signal charges read from two rows in each horizontal scanning period. As a result, the combination of two rows of photodiodes from which signal charges are output in one horizontal scanning period is deviated by one row vertically between the odd fields and the even fields.

Specifically, the CCD sensor 70 outputs signal charges from the second and third rows in the vertical dummy region 71E counted from the side closer to the horizontal transfer section 72 in the horizontal scanning period 282H. In the subsequent horizontal scanning periods, signal charges are added by two rows each sequentially and output. After the output of signal charges from the fourth row in the transient region 71B counted from the side closer to the horizontal transfer section 72 and the row in the effective pixel region 71A closest to the horizontal transfer section 72, the CCD sensor 70 outputs signal charges from the second row and the rows thereafter in the effective pixel region 71A counted from the side closer to the horizontal transfer section 72 by two rows in each horizontal scanning period.

The operations for the odd fields and the even fields described above are repeated alternately, to thereby obtain 2-pixel mixed CCD sensor outputs as real-time video interlaced signals of the NTSC system.

Hereinafter, the case that the CCD sensor 70 is a color CCD sensor having a color filter will be described. The color filter is a primary color filter made of red (R), green (G) and blue (B) three color filter elements, like the color filter described in Embodiment 1, in which unit arrays each composed of 2 rows×2 columns are arranged in the row and column directions by an arbitrary number (see FIG. 12).

Figure 35:
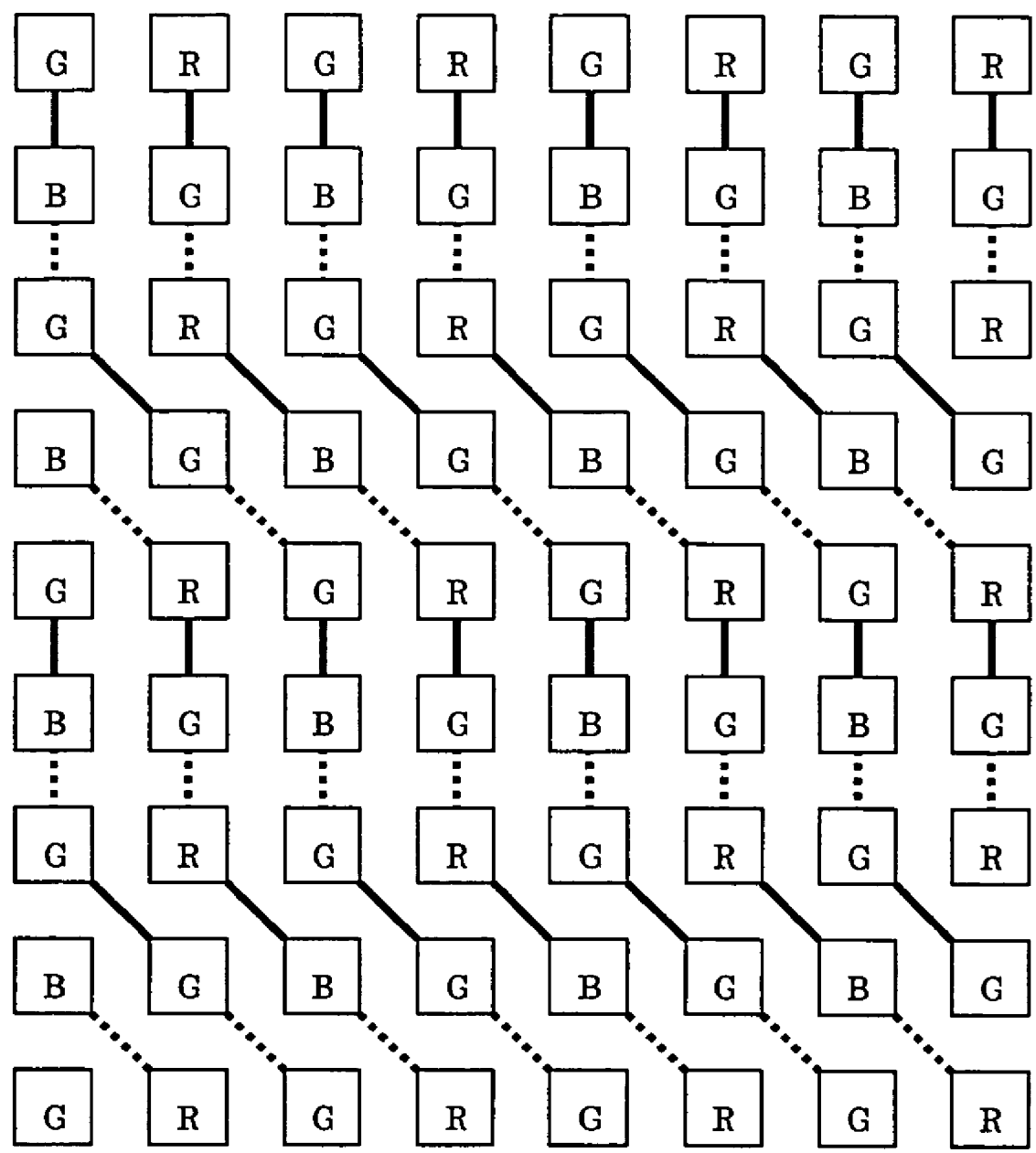
FIG. 35 is an illustration showing pixel mixture in the case of use of the primary color filter of FIG. 12.

FIG. 35 is an illustration showing pixel mixture in the case of use of the primary color filter of FIG. 12. Note that in the following description, the bottom row in the pixel array in FIG. 35 is referred to as the first row.

In the odd fields, signal charges of sets of two pixels connected by the dotted lines in FIG. 35 are mixed and output. Assume that signal charges from pixels in the first and second rows are output in a given odd-numbered horizontal scanning period. In this horizontal scanning period, therefore, the signal charge from the pixel in the first row and the k-th column and the signal charge from the pixel in the second row and the (k+1)th column are mixed. As a result, signals including the color component G and signals including the color components R and B are output dot-sequentially as the output of the CCD sensor 70.

In the even-numbered horizontal scanning period next to the given odd-numbered horizontal scanning period, signal charges from pixels in the third and fourth rows are output. In this horizontal scanning period, therefore, the signal charges from the pixels in the third and fourth rows and the k-th column are mixed. As a result, signals including the color components G and B and signals including the color components G and R are output dot-sequentially as the output of the CCD sensor 70.

In the even fields, signal charges of sets of two pixels connected by the solid lines in FIG. 35 are mixed and output. Signal charges from two rows each, in the combination shifted by one row vertically from that in the odd fields described above, are output in the respective horizontal scanning periods.

Specifically, in a given odd-numbered horizontal scanning period, signal charges from pixels in the second and third rows are output. In this horizontal scanning period, therefore, the signal charge from the pixel in the second row and the k-th column and the signal charge from the pixel in the third row and the (k+1)th column are mixed. As a result, signals including the color component G and signals including the color components R and B are output dot-sequentially as the output of the CCD sensor 70.

In the even-numbered horizontal scanning period next to the given odd-numbered horizontal scanning period, signal charges from pixels in the fourth and fifth rows are output. In this horizontal scanning period, therefore, the signal charges from the pixels in the fourth and fifth rows and the k-th column are mixed. As a result, signals including the color components G and B and signals including the color components G and R are output dot-sequentially as the output of the CCD sensor 70.

From the above, as in the CCD sensor 10 described in Embodiment 1, it is found that the color signal components output from the CCD sensor 70 in the odd-numbered horizontal scanning periods are G and MG (magenta) in both the odd and even fields (see expressions (3) and (4)), and the color signal components output in the even-numbered horizontal scanning periods are YE (yellow) and CY (cyan) in both the odd and even fields (see expressions (1) and (2)). To state differently, the CCD sensor 70 using the primary color filter shown in FIG. 12 outputs signals as those that will be output if a complementary color filter is used. This indicates that a system for complementary color signal processing can also be used. In addition, from these signals representing the complementary colors, two kinds of color-difference signals (2R-G) and (2B-G) can be obtained every other row by conducting color separation processing.

As described above, the CCD sensor 70 of this embodiment, which has a primary color filter of the Bayer array, can provide color-difference line-sequential interlaced color signals by mixing charges from two pixels.

As described above, in the CCD sensor 70 of this embodiment, the number of pixels in the vertical direction of an image can be reduced without thinning the pixels, and substantially the same effect as that obtained in Embodiment 1 can be obtained.

Conventionally used image mixture schemes tend to primarily aim at mixing as many pixels as possible, and thus are not necessarily optimized for sensors having a small number of pixels. For example, in output of signals on a display device of the NTSC system, the numbers of rows and columns to be used for display are defined under the standard. In this case, merely mixing many pixels using a sensor having a small number of pixels will fail to satisfy the standard. This will cause degradation in image quality. Also, a high-quality image is not necessarily attained by merely reducing the number of pixels to be mixed while using a conventional scheme of mixing only data of the same color.

This embodiment is effective for a sensor having a small number of pixels such as an endoscope used in the medical field, for example, in which a high-quality image signal can be obtained at high frame rate without degradation in image quality and sensitivity that may occur in the conventional thinning scheme.

The CCD sensor 70 of FIG. 31 may be used as the CCD sensor 116 of the digital still camera of FIG. 11.

Figure 36A:
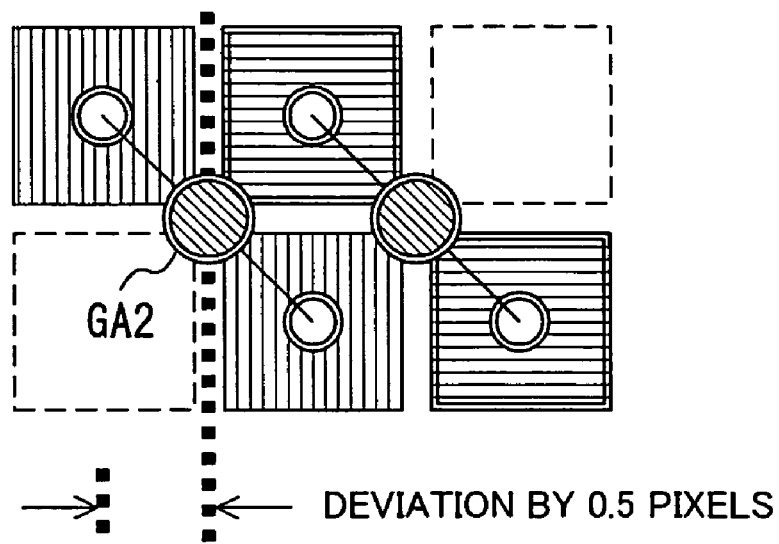
FIG. 36A is an illustration showing a pixel mixture pattern, together with the center of gravity of pixels mixed, observed when horizontal transfer is performed during vertical transfer of charges to be mixed.
Figure 36B:
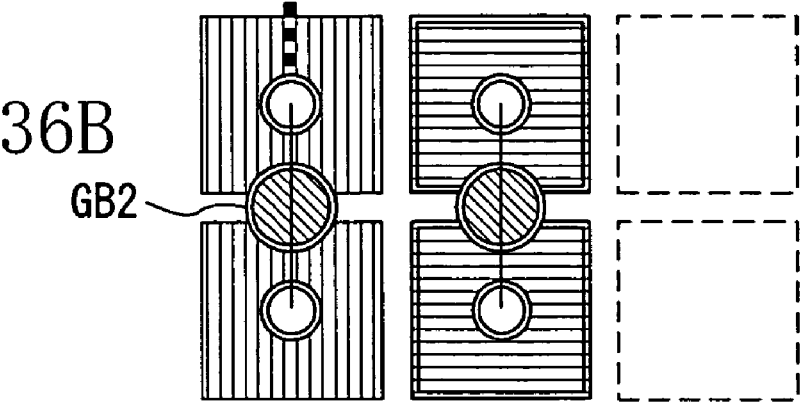
FIG. 36B is an illustration showing a pixel mixture pattern, together with the center of gravity of pixels mixed, observed when no horizontal transfer is performed during vertical transfer of charges to be mixed.

FIG. 36A is an illustration showing a pixel mixture pattern, together with the center of gravity GA2 of pixels mixed, obtained when horizontal transfer is performed during the interval of vertical transfer of charges to be mixed. FIG. 36B is an illustration showing a pixel mixture pattern, together with the center of gravity GB2 of the pixels mixed, obtained when no horizontal transfer is performed during the interval of vertical transfer of charges to be mixed.

As shown in FIGS. 36A and 36B, data obtained as a result of pixel mixture as shown in FIG. 35 corresponds to the position of the center of gravity of two pixels mixed. Accordingly, the position of the center of gravity is deviated by 0.5 pixels between the two different pixel mixture patterns. To solve this problem, the imaging signal processing circuit 126 in FIG. 11 is provided with the address correction circuit of FIG. 15, for example, to perform correction according to the pixel mixture pattern. The address correction circuit of FIG. 15 was described in Embodiment 1, and thus description thereof is omitted here.

Alternatively, the addition may be made between a signal, at a given time, obtained by mixing pixel charges in the pattern shown in FIG. 36B and a signal input after the above signal by one pixel.

As described above, in this embodiment, the CCD sensor 70, capable of reading charges in all pixels independently, can change its drive method according to the imaging mode. That is, the "all pixel independent readout mode" is adopted when a high-precision image is necessary such as when a still image is taken, or the "pixel mixture readout mode" is adopted when dynamic resolution is necessary such as when moving images are taken, to increase the frame rate.

In this embodiment, "forward transfer" is adopted as the horizontal transfer operation performed during the vertical transfer for the oblique pixel mixture (addition). Alternatively, "backward transfer" may be adopted. Otherwise, "forward transfer" and "backward transfer" may be switched every time the horizontal scanning period having the horizontal transfer operation comes. The switching between "forward transfer" and "backward transfer" may be performed between the even fields and the odd fields.

In this embodiment, the progressive scan CCD was described as an example. The pixel mixture can also be performed in a similar manner for an interlaced scan CCD and a MOS sensor.

In the embodiments described above, a signal corresponding to the sum of charges (or outputs) from four pixels selected zigzag, or two pixels selected obliquely, was obtained in each odd-numbered horizontal blanking interval, and a signal corresponding to the sum of charges (or outputs) from four pixels, or two pixels, selected linearly in a same column was obtained in each even-numbered horizontal blanking interval, every four continuous rows or every two continuous rows. The present invention is not limited to this, but either one of the above signals may be obtained every four continuous rows or every two continuous rows.

The operation in the even fields and the operation in the odd fields may be reversed to each other. Likewise, in each field, the operation in the even-numbered horizontal scanning periods and the operation in the odd-numbered horizontal scanning periods may be reversed to each other. The monitor mode is applicable, not only to the NTSC system, but also to various systems such as phase alternation by line (PAL).

When the effective number of rows of pixels of a CCD sensor or a MOS sensor is j1, the number of display lines per field of a monitor is j2, and charges from n pixels are to be mixed (for example, in a CCD sensor, n times of vertical transfer is performed in the horizontal blanking interval of each horizontal scanning period), the following relationship should preferably be satisfied.

$$j1/n \geqq j2 \ (j1, j2 \text{ and n are natural numbers})$$

In the embodiments described above, redundant part of signals used for driving the CCD sensor or the MOS sensor may be eliminated to streamline the sensor.

The CCD sensor or the CMOS sensor may change the number of pixels to be mixed based on a signal input from outside. For example, the system controller 104 in FIG. 11 may supply such a signal to the CCD sensor or the COMS sensor.

For example, in mixture of eight pixels, signal charges from eight pixels in the i-th row and the k-th column, in the (i+1)th row and the (k+1)th column, in the (i+2)th row and the k-th column, in the (i+3)th row and the (k+1)th column, in the (i+4)th row and the k-th column, in the (i+5)th row and the (k+1)th column, in the (i+6)th row and the k-th column, and in the (i+7)th row and the (k+1)th column are read, mixed and output in each odd-numbered horizontal scanning period, and signal charges from eight pixels in the i-th to (n+7)th rows and the k-th column are read, mixed and output in each even-numbered horizontal scanning period.

By providing the capability of changing the number of pixels to be mixed based on the moving speed of an object, the illumination condition and the like, it becomes possible to adjust the resolution, the sensitivity, the frame update rate and the like. Thus, a camera system permitting flexible image taking adaptive to the image pickup conditions can be provided.

The number of pixels to be mixed may be different between the odd-numbered horizontal scanning periods and the even-numbered horizontal scanning periods. For example, signal charges from four pixels in the i-th row and k-th column, in the (i+1)th row and the (k+1)th column, in the (i+2)th row and the k-th column, and in the (i+3)th row and the (k+1)th column may be read, mixed and output in the odd-numbered horizontal scanning periods, while signal charges from eight pixels in the subsequent eight rows and the k-th column may be read, mixed and output in the even-numbered horizontal scanning periods.

In the case described above, a large difference arises in the level of the signal obtained every horizontal scanning period, and thus correction of the signal level is required every horizontal scanning period. In view of this, a gain correction circuit as shown in FIG. 37 is provided for the imaging signal processing circuit 126 in FIG. 11 and the like.

Figure 37:
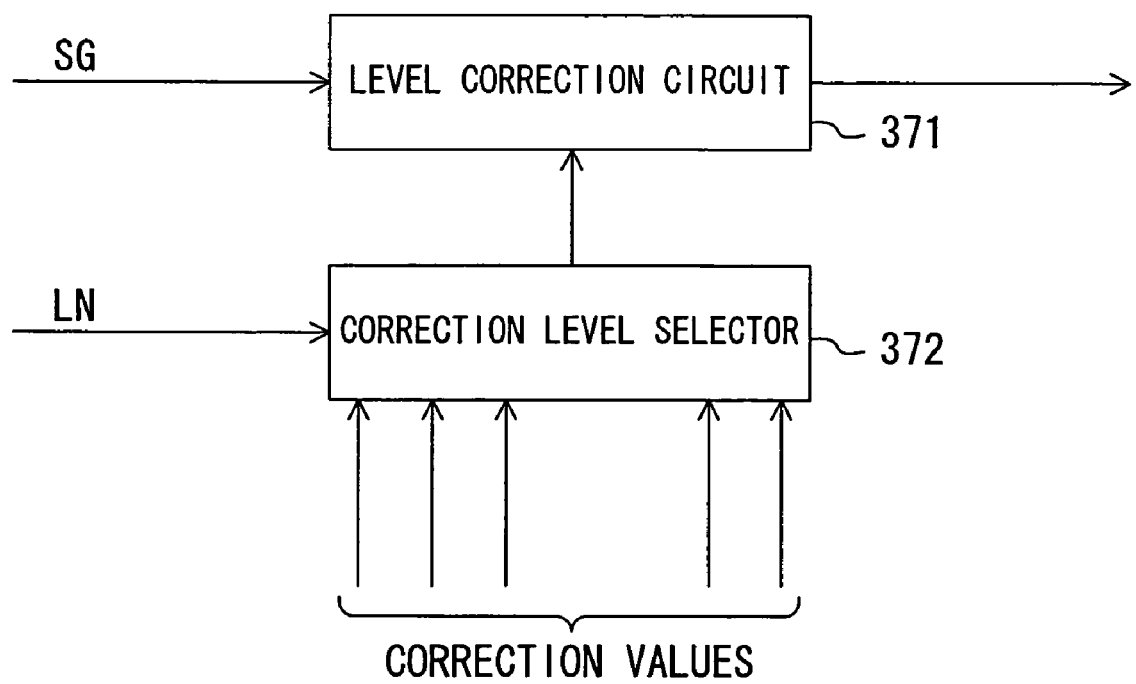
FIG. 37 is a block diagram of a gain correction circuit.
Figure 38:
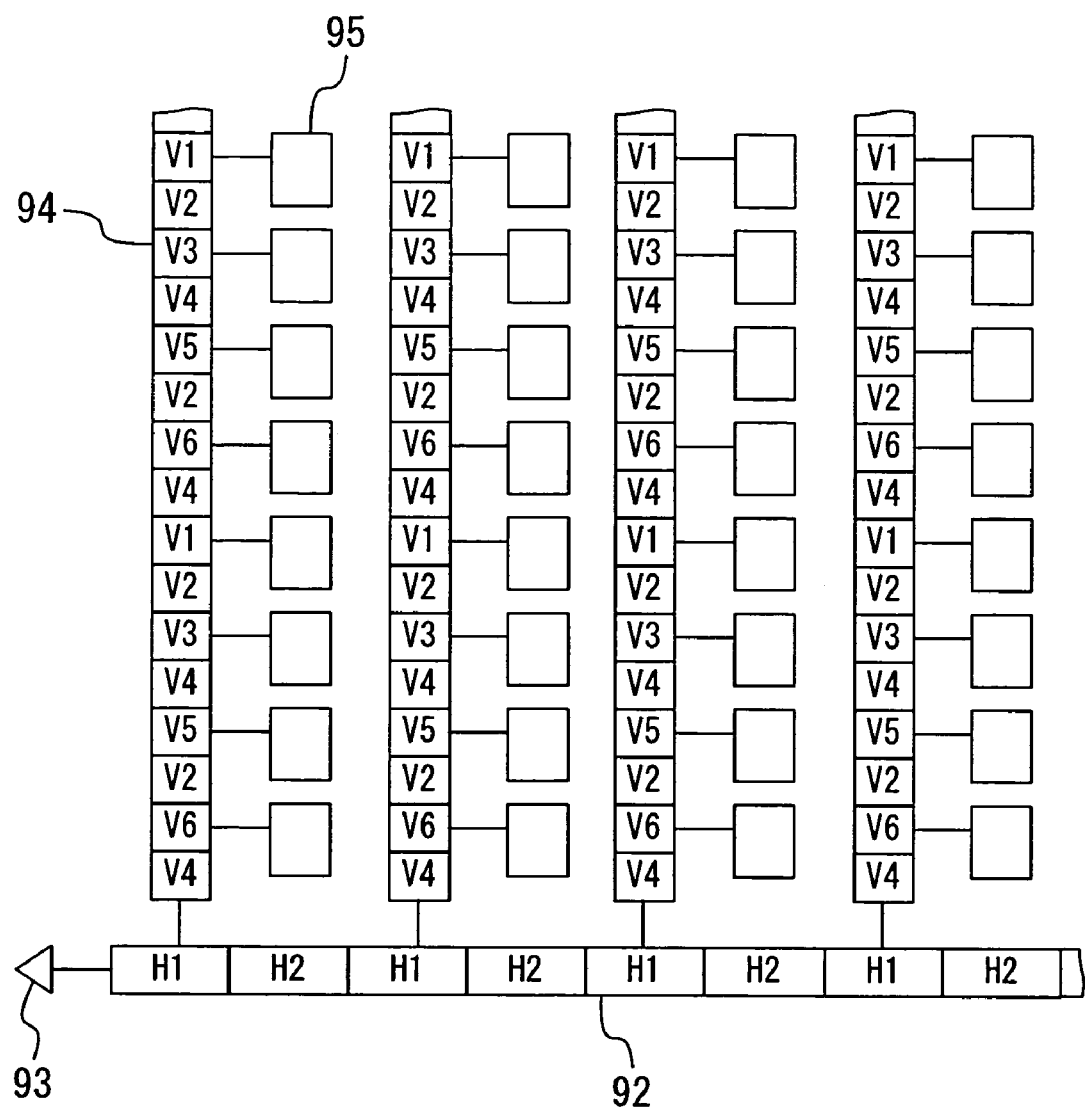
FIG. 38 is a plan view showing a configuration of a conventional solid-state image pickup device.
Figure 39:
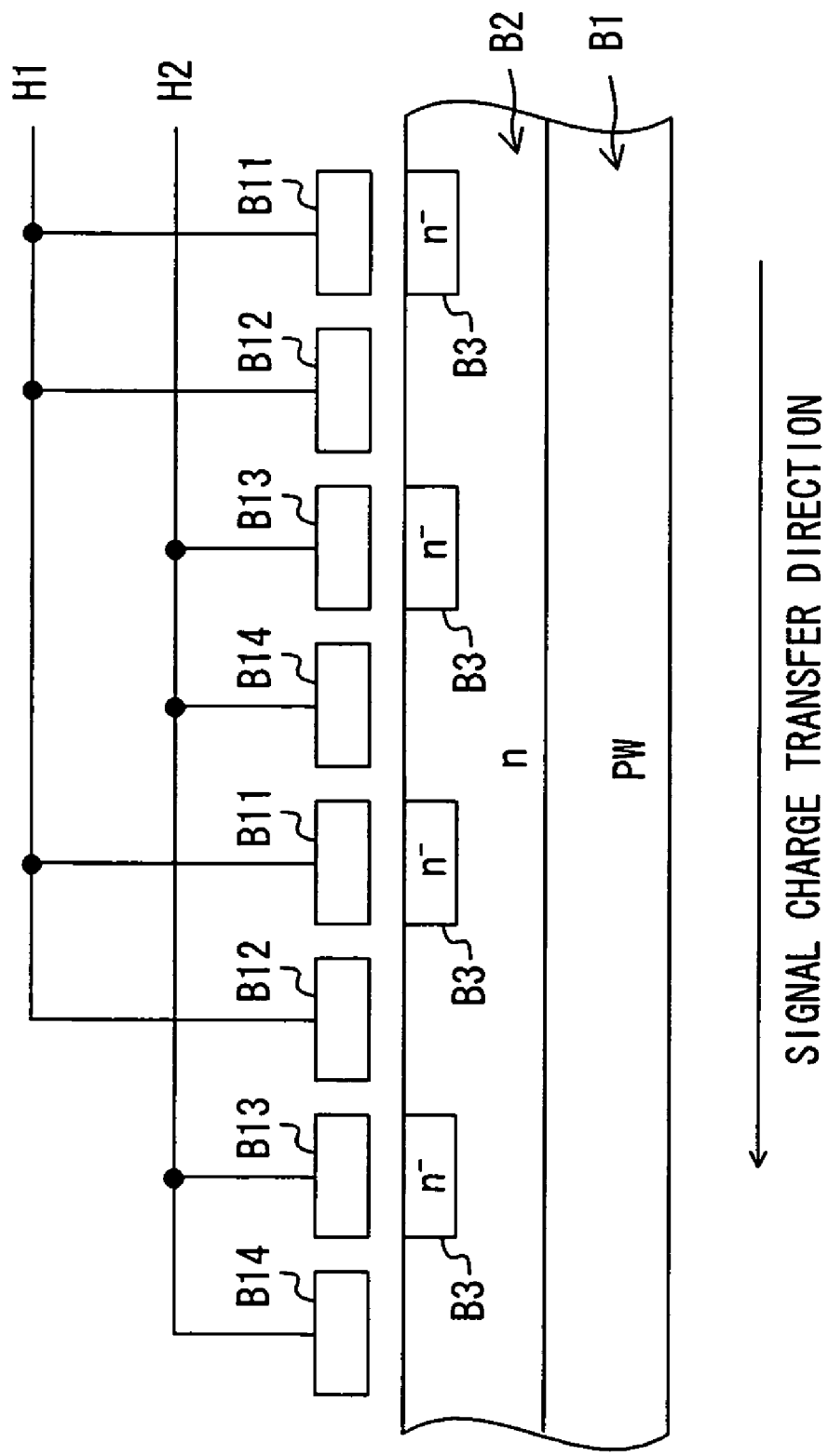
FIG. 39 is a cross-sectional view of a horizontal transfer section in FIG. 38.
Figure 40:
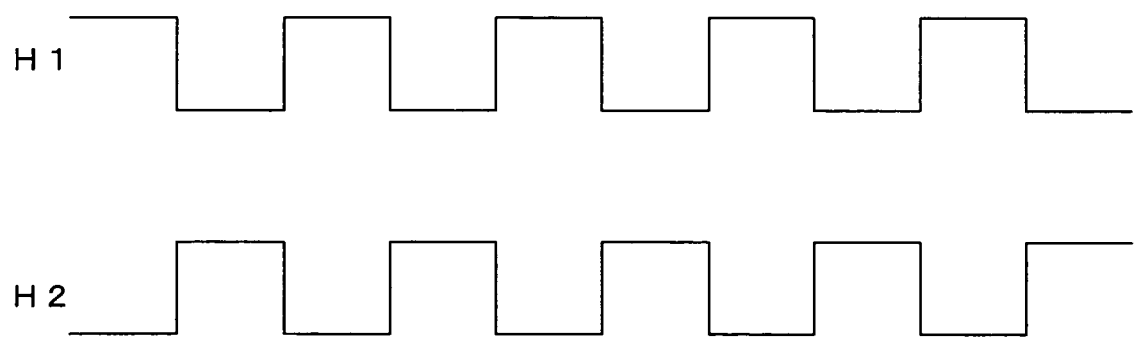
FIG. 40 is a timing chart showing drive pulses applied to the horizontal transfer section in FIG. 38.
Figure 41:
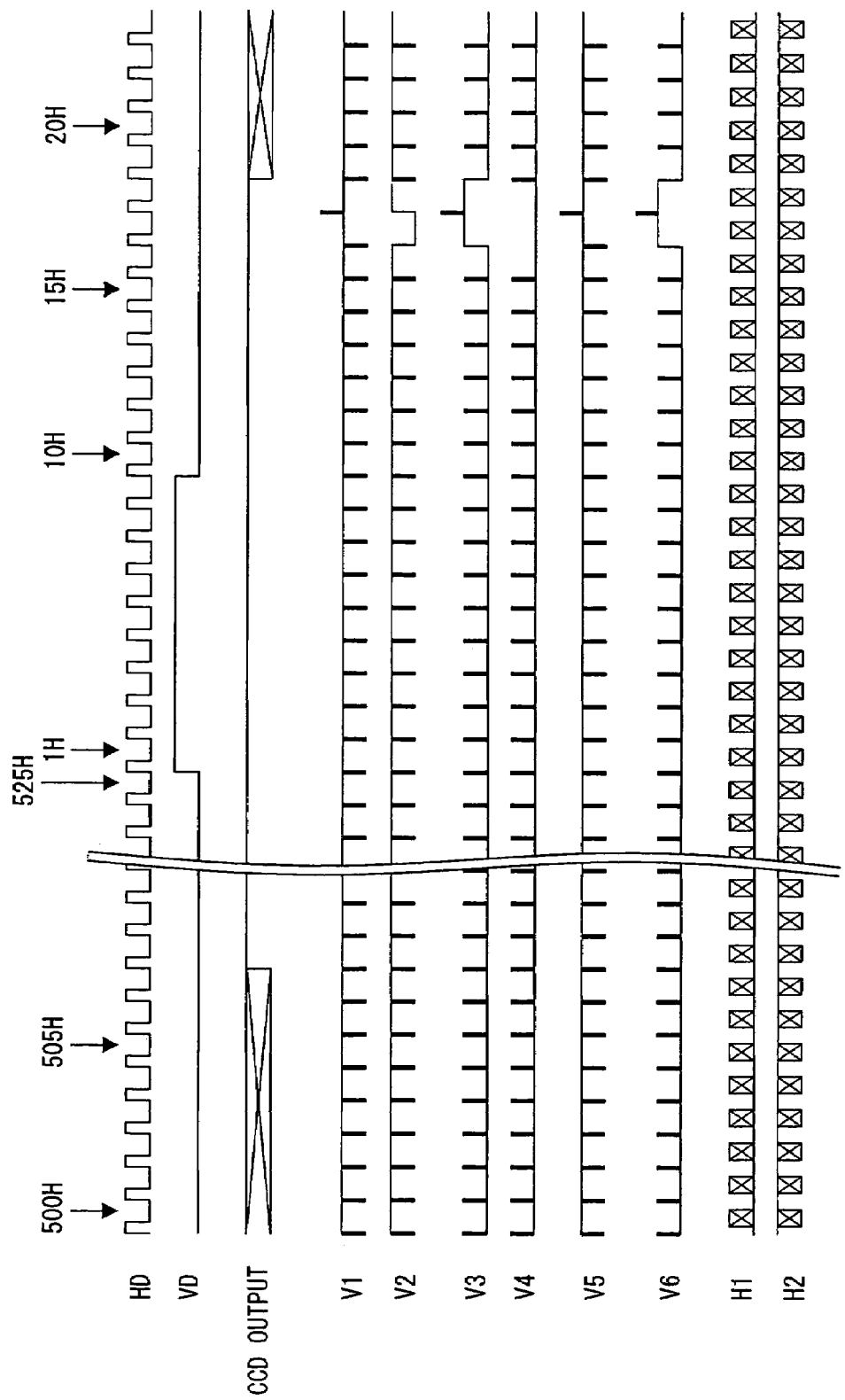
FIG. 41 is a timing chart showing the waveforms of signals for driving the conventional solid-state image pickup device of FIG. 38.

FIG. 37 is a block diagram of the gain correction circuit (gain correction section), which includes a level correction circuit 371 and a correction level selector 372. The level correction circuit 371 receives a signal SG to be corrected, and the correction level selector 372 receives line information LN indicating the number of the horizontal scanning line corresponding to the signal SG from the system controller 104. The correction level selector 372 selects a proper correction value among a plurality of input correction values according to the line information LN, and outputs the selected correction value to the level correction circuit 371. The level correction circuit 371 multiplies the signal SG by the input correction value and outputs the result.

In the case described above, the number of pixels to be mixed was different between the odd-numbered horizontal scanning periods and the even-numbered horizontal scanning periods. Alternatively, the number of pixels to be mixed may be different every horizontal scanning period.

The Bayer array as shown in FIG. 12 was adopted as the array of the color filter elements for the respective pixels in the above examples. Alternatively, any other arrays may be adopted. The color filter may include a color other than the primary colors. For example, in the Bayer unit array (see FIG. 12), one of the two G (green) color filter elements may be replaced with a color other than the primary colors.

As described above, the solid-state image pickup device of the present invention can increase the frame rate without largely degrading the resolution and with the sensitivity maintained at a proper level. Accordingly, the device of the present invention is useful for equipment that requires video signals for a display having a high frame rate and a comparatively small number of pixels, such as a camera with the function of monitor display.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A solid-state image pickup device comprising:
a plurality of optoelectronic transducers arranged in an array in an effective pixel region;
a plurality of vertical transfer sections each for reading charges from optoelectronic transducers belonging to a corresponding column among the plurality of optoelectronic transducers according to a charge read signal and vertically transferring the read charges according to a vertical transfer signal;
a horizontal transfer section for horizontally transferring the charges transferred from the vertical transfer sections according to a horizontal transfer signal;
a charge detection section for converting the charges horizontally transferred from the horizontal transfer section to signal voltages or signal currents and outputting the result; and
a control section which outputs the charge read signal so as to read the charges only one time from each of the plurality of optoelectronic transducers per every field, and outputs the vertical transfer signal and the horizontal transfer signal so as to obtain either a first signal or a second signal every predetermined even number of continuous rows, and to obtain at least one first signal and at least one second signal from two columns adjacent to each other per every field, wherein:
the first signal corresponds to a sum of charges from:
an optoelectronic transducer,
belonging to one column, and
belonging to one of alternately selected rows, and
an optoelectronic transducer,
belonging to a column adjacent to the one column, and
belonging to a row other than the alternately selected rows among the plurality of optoelectronic transducers, and
the second signal corresponds to a sum of charges from:
optoelectronic transducers,
belonging to a same column among the plurality of optoelectronic transducers.

2. The device of claim 1, wherein the control section outputs the charge read signal in a predetermined horizontal scanning period, and
thereafter the control section performs either one of:
first transfer operation of outputting the vertical transfer signal for permitting each of the plurality of vertical transfer sections to perform vertical transfer toward the horizontal transfer section by the predetermined even number of rows in each horizontal blanking interval, and outputting the horizontal transfer signal for permitting the horizontal transfer section to perform horizontal transfer in a direction toward the charge detection section and the opposite direction alternately by one column every time the vertical transfer is performed by one row; and
second transfer operation of outputting the vertical transfer signal for permitting each of the plurality of vertical transfer sections to perform vertical transfer toward the horizontal transfer section by the predetermined even number of rows in each horizontal blanking interval, depending on the horizontal blanking interval.

3. The device of claim 2, wherein as the first transfer operation, the control section outputs the horizontal transfer signal so that the horizontal transfer section performs horizontal transfer by one column in a first direction that is either the direction toward the charge detection section or the opposite direction after the vertical transfer is performed by at least one row, then performs horizontal transfer by one column in a second direction opposite to the first direction after the vertical transfer is next performed by one row, and then performs horizontal transfer by one column in the first direction after the vertical transfer is further performed by one row.

4. The device of claim 2, wherein the control section reverses the direction of the horizontal transfer in the first transfer operation every field.

5. The device of claim 1, wherein the control section uses sets of the predetermined even number of continuous rows deviated by a half of the number of rows every field.

6. The device of claim 1, further comprising a color filter having filter elements corresponding to the respective optoelectronic transducers.

7. The device of claim 6, wherein the color filter is a Bayer color filter.

8. The device of claim 6, wherein the control section can also output the vertical transfer signal so that each of the plurality of vertical transfer sections performs vertical transfer by one row in each horizontal blanking interval.

9. The device of claim 8, further comprising a signal processing section for processing the output of the charge detection section as primary color signals during still-image readout and as complementary color signals during moving-image readout,
wherein the color filter has primary color filter elements.

10. The device of claim 6, further comprising a signal generation section for multiplying color signals obtained as signals output from the charge detection section by respective predetermined coefficients, obtaining the sum of the multiplied values, and outputting the result.

11. The device of claim 1, wherein the control section generates the vertical transfer signal or the horizontal transfer signal based on a signal input from outside.

12. The device of claim 1, further comprising a gain correction section for correcting the level of a given signal output from the charge detection section according to the number of pixels related to the given signal and outputting the result.

13. A camera comprising:
the solid-state image pickup device of claim 1; and
a monitor for displaying a signal output from the solid-state image pickup device.

14. A drive method for a solid-state image pickup device, the device comprising:
a plurality of optoelectronic transducers arranged in an array in an effective pixel region;
a plurality of vertical transfer sections each for reading charges from optoelectronic transducers belonging to a corresponding column among the plurality of optoelectronic transducers and vertically transferring the read charges;
a horizontal transfer section for horizontally transferring the charges transferred from the vertical transfer sections; and
a charge detection section for converting the charges horizontally transferred from the horizontal transfer section to signal voltages or signal currents and outputting the result,
the drive method comprising reading the charges only one time from each of the plurality of optoelectronic transducers per every field, conducting either one of a first step and a second step every predetermined even number of continuous rows of the optoelectronic transducers, and conducting at least one first step and at least one second step from two columns adjacent to each other per every field, wherein:
the first step comprises obtaining a signal corresponding to a sum of charges from: an optoelectronic transducer,
belonging to one column, and
belonging to one of alternately selected rows, and
an optoelectronic transducer,
belonging to a column adjacent to the one column, and
belonging to a row other than the alternately selected rows, among the plurality of optoelectronic transducers; and
the second step comprises obtaining a signal corresponding to sum of charges from:
optoelectronic transducers,
belonging to a same column among the plurality of optoelectronic transducers.

15. The method of claim 14, further comprising:
reading charges from the plurality of optoelectronic transducers in a predetermined horizontal scanning period, as a read step;
performing vertical transfer toward the horizontal transfer section by the predetermined even number of rows in each horizontal blanking interval, and performing horizontal transfer in a direction toward the charge detection section and the opposite direction alternately by one column every time the vertical transfer is performed by one row, as a first transfer step; and
performing vertical transfer toward the horizontal transfer section by the predetermined even number of rows in each horizontal blanking interval, as a second transfer step,
wherein after the read step, either the first transfer step or the second transfer step is performed depending on the horizontal blanking interval.

16. The device of claim 1, further comprising a signal processing section for adding a given signal output from the charge detection section and a signal output before or after the given signal by one pixel and outputting the result.

17. The device of claim 1, wherein the control section outputs the charge read signal, the vertical transfer signal and the horizontal transfer signal so as to obtain the first and the second signal periodically.

18. The device of claim 17, wherein the control section outputs the charge read signal, the vertical transfer signal and the horizontal transfer signal so as to obtain the first and the second signal alternately.

19. The device of claim 6, further comprising a signal processing section for processing the output of the charge detection section as primary color signals during still-image readout and as complementary color signals during moving-image readout,
wherein the color filter has primary color filter elements.

20. The device of claim 1, wherein
the control section is configured to output the vertical transfer signal and the horizontal transfer signal so that the charges from the optical transducers belonging all columns in a same row contribute either one of the first signal and the second signal in the effective pixel region per field.

21. The device of claim 6, wherein
the charges corresponding to at least two different colors of the filter elements of the color filter are mixed in the horizontal transfer section.

* * * * *